(12) United States Patent
Moon et al.

(10) Patent No.: US 10,959,253 B2
(45) Date of Patent: Mar. 23, 2021

(54) TRANSMISSION METHOD AND APPARATUS USING NUMEROLOGY AND SCHEDULING METHOD AND APPARATUS USING NUMEROLOGY

(71) Applicant: ELECTRONICS AND TELECOMMUNICATIONS RESEARCH INSTITUTE, Daejeon (KR)

(72) Inventors: Sung-Hyun Moon, Daejeon (KR); Cheulsoon Kim, Daejeon (KR); Ji Hyung Kim, Daejeon (KR); Juho Park, Daejeon (KR); Jun Hwan Lee, Seoul (KR); Minhyun Kim, Busan (KR); Junghoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/310,517

(22) PCT Filed: Jul. 5, 2017

(86) PCT No.: PCT/KR2017/007185
§ 371 (c)(1),
(2) Date: Dec. 17, 2018

(87) PCT Pub. No.: WO2018/008981
PCT Pub. Date: Jan. 11, 2018

(65) Prior Publication Data
US 2019/0357239 A1    Nov. 21, 2019

(30) Foreign Application Priority Data

Jul. 5, 2016 (KR) .................. 10-2016-0085049
Jul. 21, 2016 (KR) .................. 10-2016-0092852
(Continued)

(51) Int. Cl.
*H04W 72/12* (2009.01)
*H04L 5/00* (2006.01)
(Continued)

(52) U.S. Cl.
CPC ....... *H04W 72/1263* (2013.01); *H04L 1/1642* (2013.01); *H04L 5/0094* (2013.01); *H04W 72/042* (2013.01); *H04W 76/27* (2018.02)

(58) Field of Classification Search
CPC ... H04L 1/1642; H04L 5/0051; H04L 5/0094; H04L 27/2607; H04L 5/0007;
(Continued)

(56) References Cited

U.S. PATENT DOCUMENTS 9,389,572 B2    7/2016 Zhu et al.
2011/0103406 A1    5/2011 Cai et al.
(Continued)

OTHER PUBLICATIONS

KT Corp. et al., "Discussion on NR numerology", R1-165525, 3GPP TSG RAN WG1 Meeting #85, Nanjing, China, May 30, 2016.
(Continued)

*Primary Examiner* — Kan Yuen
(74) *Attorney, Agent, or Firm* — LRK Patent Law Firm

(57) ABSTRACT

A transmission method of a base station is provided. The base station generates a physical channel or a physical signal using a physical resource block (PRB) that is a resource allocation unit in a frequency domain. The base station transmits the physical channel or the physical signal.

14 Claims, 44 Drawing Sheets

| (30) | Foreign Application Priority Data | |
|---|---|---|
| Aug. 17, 2016 | (KR) | 10-2016-0104473 |
| Sep. 30, 2016 | (KR) | 10-2016-0126983 |
| May 15, 2017 | (KR) | 10-2017-0060139 |
| Jul. 4, 2017 | (KR) | 10-2017-0085055 |

(51) Int. Cl.
*H04W 72/04* (2009.01)
*H04W 76/27* (2018.01)
*H04L 1/16* (2006.01)

(58) Field of Classification Search
CPC ... H04L 5/0037; H04L 5/0044; H04L 5/0053; H04W 72/042; H04W 72/0453; H04W 72/1263; H04W 76/27; H04W 24/08
See application file for complete search history.

(56) References Cited

U.S. PATENT DOCUMENTS

| 2013/0010685 A1* | 1/2013 | Kim | H03M 13/271 |
| | | | 370/315 |
| 2013/0028150 A1 | 1/2013 | Ma et al. | |
| 2014/0044085 A1* | 2/2014 | Hong | H04L 5/0037 |
| | | | 370/329 |
| 2015/0055632 A1 | 2/2015 | Gou et al. | |
| 2015/0222404 A1 | 8/2015 | Jeong et al. | |
| 2015/0263839 A1 | 9/2015 | He et al. | |
| 2015/0373725 A1 | 12/2015 | Oh et al. | |
| 2016/0080121 A1 | 3/2016 | Kim et al. | |
| 2017/0339673 A1* | 11/2017 | Choi | H04W 84/12 |
| 2018/0007673 A1* | 1/2018 | Fwu | H04W 4/70 |
| 2018/0241499 A1* | 8/2018 | Einhaus | H04L 5/0044 |
| 2019/0150132 A1* | 5/2019 | Bala | H04W 72/042 |
| | | | 370/329 |

OTHER PUBLICATIONS

ZTE et al., "Frequency multiplexing of different numerologies", R1-164273, 3GPP TSG RAN WG1 Meeting #85, Nanjing, China, May 14, 2016.
LG Electronics et al., "WF on Supporting different Numerologies in a NR carrier", R1-165837, 3GPP TSG RAN WG1 Meeting #85, Nanjing, China, May 30, 2016.
Search Report, dated Oct. 20, 2017, for International Application No. PCT/KR2017/007185.
Written Opinion dated Oct. 20, 2017, for International Application No. PCT/KR2017/007185.

\* cited by examiner

- Two anchor FRBs -

- One anchor FRB -

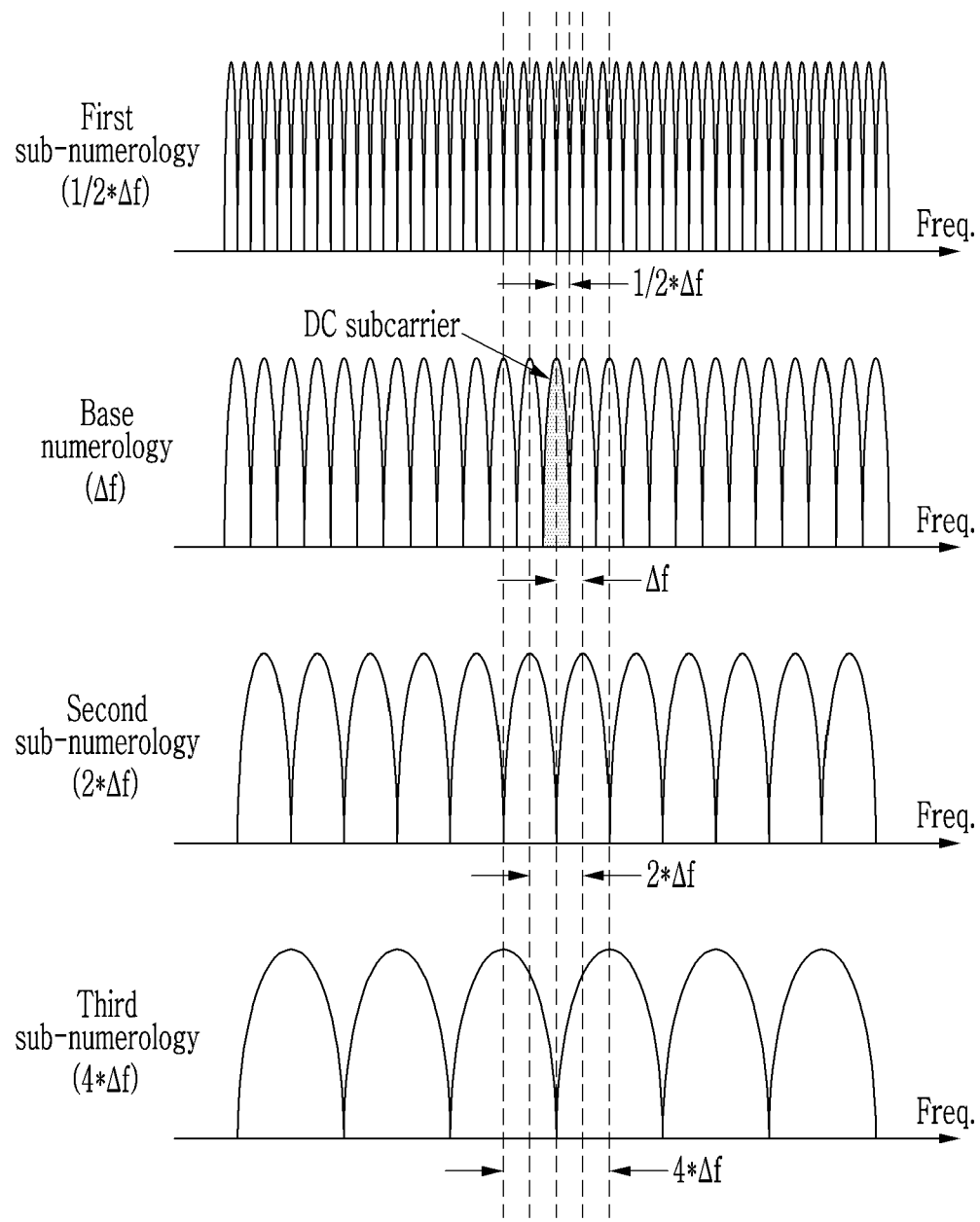

- DC subcarrier for all numerologies -

- Even number of base PRBs -

- Even number of PRBs (2*N) -

- Odd number of PRBs (2*N+1) -

TRANSMISSION METHOD AND APPARATUS USING NUMEROLOGY AND SCHEDULING METHOD AND APPARATUS USING NUMEROLOGY

CROSS-REFERENCE TO RELATED APPLICATIONS

The present application is a U.S. National Phase entry from International Application No. PCT/KR2017/007185, filed Jul. 5, 2017, which claims priority to Korean Patent Application Nos. 10-2016-0085049, filed Jul. 5, 2016, 10-2016-0092852, filed Jul. 21, 2016, 10-2016-0104473, filed Aug. 17, 2016, 10-2016-0126983, filed Sep. 30, 2016, 10-2017-0060139, filed May 15, 2017, and 10-2017-0085055, filed Jul. 4, 2017, the disclosures of which are incorporated by reference herein in their entireties.

BACKGROUND

1. Technical Field

The present invention relates to a transmission method and apparatus using a numerology and a scheduling method and apparatus using a numerology.

2. Description of Related Art

Mobile communication systems since long term evolution (LTE) represented by 5th generation (5G) need to meet various technical requirements for providing high-rate data transmission and wide application services and scenarios that have received much attention from the past. Accordingly, the 3rd generation partnership project (3GPP) is developing a new mobile communication standard that meets requirements of international mobile telecommunications (IMT)-2020. The name of the new mobile communication standard is a new radio (NR). A main application scenario of the NR includes provision of ultrahigh-rate data transmission(e.g., enhanced mobile broadband (eMBB)), provision of high reliability and low latency (e.g., ultra-reliable low latency communication (URLLC)), and provision of large-scale terminal connectivity (e.g., massive machine type communication (mMTC)).

The NR uses a broad frequency range including a millimeter wave band for remarkably improving a data rate. A band from 1 GHz or less to 100 GHz is considered as the candidate frequency range of the NR. International telecommunication union (ITU) is investigating 24.25 to 86 GHz band as the candidate frequency range for IMT-2020.

The system supporting various services and frequency ranges like the NR can have to scale the numerology used to form a physical signal waveform. For example, in case of orthogonal frequency division multiplexing (OFDM)-based system, a subcarrier spacing suitable for channel characteristics of a transmission frequency band may be used. For example, a subcarrier spacing of 15 kHz may be used in a band of below 6 GHz, and a subcarrier spacing of 120 kHz may be used in a band of above 6 GHz. In addition, even though the frequency band is same, different numerologies may be used according to characteristics of provided services. For example, in the below 6 GHz, a subcarrier spacing of 15 kHz may be used for the eMBB transmission and a subcarrier spacing of 60 kHz may be used for the URLLC transmission.

Accordingly, a method for supporting flexible transmission and reception using various numerologies is required.

SUMMARY

The present invention has been made in an effort to provide a method and apparatus for supporting flexible transmission and reception using various numerologies.

Further, the present invention has been made in an effort to provide a method and apparatus for supporting flexible resource allocation (or scheduling) within a next generation communication system.

In addition, the present invention has been made in an effort to provide a method and an apparatus for transmitting a signal or a channel using a plurality of numerologies within one carrier.

An exemplary embodiment of the present invention provides a transmission method of a base station. The transmission method of a base station may include: generating a physical channel or a physical signal using a physical resource block (PRB) that is a resource allocation unit in a frequency domain; and transmitting the physical channel or the physical signal.

Subcarrier spacings for a plurality of numerologies may be defined differently.

The number of subcarriers belonging to a first PRB to which a first numerology is applied among the plurality of numerologies may be equal to the number of subcarriers belonging to a second PRB to which a second numerology is applied among the plurality of numerologies.

A boundary of the first PRB may be aligned to a boundary of the second PRB.

At least one of the subcarriers belonging to the first PRB may be aligned to at least one of the subcarriers belonging to the second PRB.

A bandwidth of the first PRB may be $2^N$ times (N is an integer) of a bandwidth of the second PRB.

A first direct current (DC) subcarrier for the first numerology and a second DC subcarrier for the second numerology may exist.

A location of the first DC subcarrier may be the same as a location of the second DC subcarrier.

The first numerology may be a numerology applied to a downlink synchronization signal used for an initial access among the plurality of numerologies.

On the basis of the first PRB, the number of PRBs included in one carrier may be an even number regardless of a system bandwidth.

Another exemplary embodiment of the present invention provides a scheduling method of a base station. The scheduling method of a base station may include: configuring a physical resource block (PRB) group for a first terminal; configuring a numerology for a PRB group, which is configured for the first terminal among a plurality of numerologies defined by a subcarrier spacing and a cyclic prefix (CP) length, for the first terminal; and scheduling at least one of a plurality of PRBs, which are included in the PRB group for the first terminal, for the first terminal.

The plurality of PRBs included in the PRB group configured for the first terminal may be continuous in the frequency domain.

The PRB group configured for the first terminal may be plural and the plurality of PRB groups may include a first PRB group and a second PRB group.

The configuring of the numerology for the first terminal may include configuring a first numerology for the first PRB group among the plurality of numerologies for the first terminal and configuring a second numerology for the second PRB group among the plurality of numerologies for the first terminal.

A PRB group configured for the first terminal may be plural, and the plurality of PRB groups may include a first PRB group and a second PRB group scheduled for the first terminal through the same downlink control information (DCI).

When the same numerology is applied to the first PRB group and the second PRB group, an index allocated to a last PRB among a plurality of PRBs included in the first PRB group may be the same as an index allocated to a last PRB among a plurality of PRBs included in the second PRB group.

When the same numerology is applied to the first PRB group and the second PRB group, indices allocated to a plurality of PRBs included in the second PRB group may be based on an index allocated to a last PRB among a plurality of PRBs included in the first PRB group.

The scheduling method may further include: transmitting a PRB bundle index indicating a PRB bundle including the at least one PRB to the first terminal through downlink control information (DCI).

The number of PRBs included in the PRB group configured for the first terminal may be determined depending on a numerology applied to the PRB group configured for the first terminal.

The scheduling method may further include: configuring a PRB group, which is different from the PRB group configured for the first terminal, for a second terminal; and configuring a numerology, which is different from the numerology for the PRB group configured for the first terminal among the plurality of numerologies, for the second terminal for the PRB group configured for the second terminal The plurality of numerologies may include a first numerology and a second numerology.

The number of PRBs included in a first PRB group to which the first numerology is applied may be equal to the number of PRBs included in a second PRB group to which the second numerology is applied.

Yet another exemplary embodiment of the present invention provides a transmission method of a base station, including: generating a first downlink synchronization signal used for an initial access; and transmitting the first downlink synchronization signal.

A first sequence set for the first downlink synchronization signal may be different from a second sequence set for a second downlink synchronization signal used for a purpose different from the initial access.

The generating of the first downlink synchronization signal may include: generating the first downlink synchronization signal using a second polynomial different from a first polynomial for the second downlink synchronization signal.

The generating of the first downlink synchronization signal may include: generating the first downlink synchronization signal using the same polynomial as a polynomial for the second downlink synchronization signal and a cyclic shift value different from a cyclic shift value for the second downlink synchronization signal.

The transmission method may further include: transmitting the second downlink synchronization signal through a first numerology among a plurality of numerologies defined by a subcarrier spacing and a cyclic prefix (CP) length.

The transmitting of the first downlink synchronization signal may include transmitting the first downlink synchronization signal through the first numerology.

The transmitting of the first downlink synchronization signal may include transmitting the first downlink synchronization signal through a second numerology different from the first numerology among the plurality of numerologies.

Advantageous Effects

According to an exemplary embodiment of the present invention, it is possible to provide the method and apparatus for supporting or performing flexible transmission and reception using various numerologies.

In addition, according to an exemplary embodiment of the present invention, it is possible to provide the method and apparatus for supporting or performing flexible resource allocation (scheduling) within a next generation communication system.

BRIEF DESCRIPTION OF THE DRAWINGS

FIG. 8a and FIG. 8b are diagrams a disposition of a DC subcarrier based on a method A121 and a method A122 according to an exemplary embodiment of the present invention.

DETAILED DESCRIPTION OF THE INVENTION

Figure 1A:
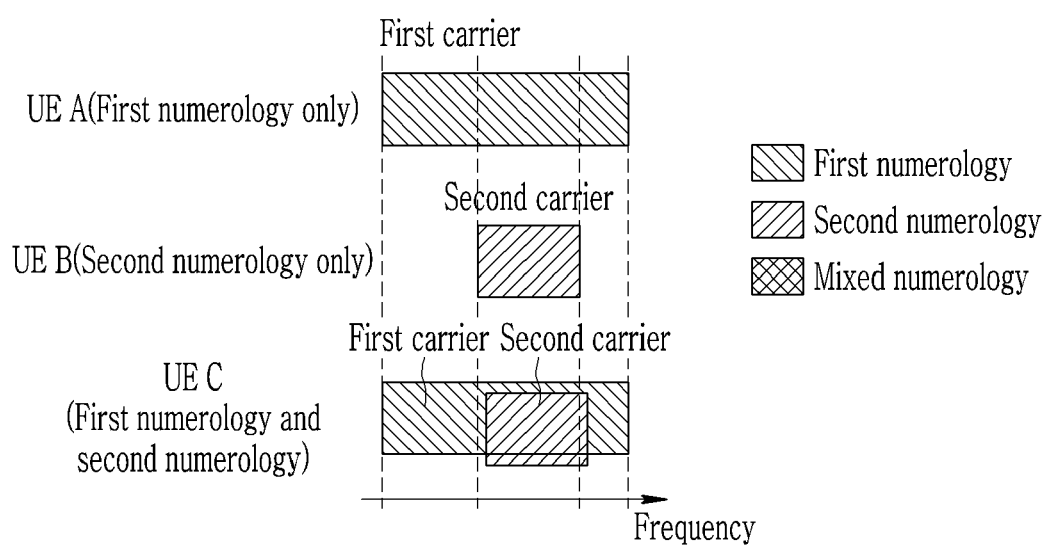
FIG. 1a, FIG. 1b, FIG. 1c, FIG. 1d, FIG. 1e, FIG. 1f, and FIG. 1g are diagrams illustrating a method for supporting terminals having heterogeneous numerology capability in the same frequency range according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the present specification.

In the present specification, the overlapping description of the same components will be omitted.

Further, in the present specification, it is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a terminal may refer to a mobile terminal, a mobile station, an advanced mobile station, a high reliability mobile station, a subscriber station, a portable subscriber station, an access terminal, user equipment (UE), a machine type communication device (MTC), and the like and may also include all or some of the functions of the mobile terminal, the advanced mobile station, the high reliability mobile station, the subscriber station, the portable subscriber station, the access terminal, the user equipment, the MTC, and the like.

Further, in the present specification, a base station (BS) may refer to an advanced base station, a high reliability base station (HR-BS), a nodeB, an evolved node B (eNodeB, eNB), a new radio (NR) nodeB (e.g., gNB), an access point, a radio access station, a base transceiver station, a mobile multihop relay (MMR)-BS, a relay station serving as a base station, a high reliability relay station serving as a base station, a repeater, a macro base station, a small base station, a femto base station, a home node B (HNB), a home eNB (HeNB), a pico base station, a micro base station, and the like and may also include all or some of functions of the advanced base station, the HR-BS, the node B, the eNB, the gNB, the access point. the radio access station, the base transceiver station, the MMR-BS, the relay station, the high reliability relay station, the repeater, the macro base station, the small base station, the femto base station, the HNB, the HeNB, the pico base station, the micro base station and the like.

Hereinafter, a method and an apparatus for supporting resource allocation in a wireless communication system will be described. In detail, a method and an apparatus for transmitting a signal through a plurality of numerologies within one carrier will be described.

In a system (e.g., NR system) using a cyclic prefix (CP)-based OFDM, the numerology is basically defined by a subcarrier spacing and a CP length. In the present specification, time domain symbol may be an OFDM symbol. However, this is only an example, and therefore even when the time domain symbol is a symbol different from the OFDM symbol, an exemplary embodiment of the present invention may be applied.

Table 1 shows an example of a scalable numerology construction for the OFDM system.

In detail, Table 1 shows a case where a total of five numerologies are defined. Each subcarrier spacing of numerologies A to E is 15 kHz, 30 kHz, 60 kHz, 120 kHz, and 240 kHz. An OFDM symbol length is reduced in inverse proportion to the subcarrier spacing as going from numerology A to numerology E. A CP overhead is about 6.7% for all numerologies. Accordingly, the CP length is defined in proportion to the OFDM symbol length.

Establishing a power-of-two multiple relationship among the subcarrier spacings of the numerology A to the numerology E is appropriate to reduce the complexity of the NR system implementation or is appropriate to efficiently support an operation of using a plurality of heterogeneous numerologies. The numerology A of Table 1 is the same as the numerology used for a unicast transmission of the LTE. Accordingly, it may be advantageous in a coexistence with an LTE carrier on the same frequency band when the numerology A is used.

TABLE 1

|  | numer-ology A | numer-ology B | numer-ology C | numer-ology D | numer-ology E |
| --- | --- | --- | --- | --- | --- |
| Subcarrier spacing | 15 kHz | 30 kHz | 60 kHz | 120 kHz | 240 kHz |
| The number of OFDM symbols within 1 ms | 14 | 28 | 56 | 112 | 224 |
| CP length | 4.76 us | 2.38 us | 1.19 us | 0.60 us | 0.30 us |

One numerology may basically be used for one cell (or one carrier), and may also be used for a specific time-frequency resource within one carrier. Heterogeneous numerologies may be used for different operating frequency bands and may also be used to support different types of services within the same frequency band and/or the same carrier. As an example of the latter, the numerology A of Table 1 may be used for an enhanced mobile broadband (eMBB) service of a band of below 6 GHz, and the numerology C may be used for ultra-reliable low latency communication (URLLC) service of a band of below 6 GHz. Meanwhile, to support a massive machine type communication (mMTC) or a multimedia broadcast multicast services (MBMS) service, a numerology having a subcarrier spacing smaller than that of a base numerology may be used. For this, when the subcarrier spacing of the base numerology is 15 kHz, a subcarrier spacing of 7.5 kHz or 3.75 kHz may be considered.

Hereinafter, a method and an apparatus for supporting flexible resource allocation in a wireless communication system will be described. Hereinafter, a method and an apparatus for transmitting a signal through a plurality of numerologies within one carrier will be described. For convenience of description, the present invention will be described herein with reference to an NR-based wireless communication system as an example. However, this is only an example, and therefore the present invention is not limited thereto and may be applied to various wireless communication systems. In addition, in the present specification, some terms, some units, and some concepts of the LTE system may be likewise applied to the NR system. For example, the minimum unit of resource allocation of the NR system is a resource element (RE), and one resource element corresponds to one OFDM symbol along the time domain and one subcarrier along the frequency domain. As another example, a subframe length and a radio frame length of the NR system may be 1 ms and 10 ms like the LTE system. Meanwhile, a physical resource block (PRB) in the LTE system means a two-dimensional resource allocation unit consisting of 14 time domain symbols and 12 subcarriers in case of a subcarrier spacing of 15 kHz. However, in the present specification, the PRB is used as a resource allocation unit in the frequency domain which is irrelevant to the time domain. A method for composing a PRB will be described below in detail.

In the NR system, a slot may be defined as a scheduling unit in the time domain for uplink and downlink data. A slot length may be defined as an integer number of consecutive OFDM symbols, separately from a subframe length. In addition, in the NR system, a minislot may be defined as a minimum scheduling unit having a length shorter than the slot length. For example, the minislot may be used for time division multiplexing (TDM) utilization in a band of above 6 GHz, partial slot transmission in an unlicensed band or a coexisting band with the LTE, URLLC transmission requiring low latency, and the like. To support various usage examples, a length of the minislot and a starting position of the minislot transmission may be flexibly defined as far as possible. For example, if it is assumed that the number of OFDM symbols per slot is M, the number of OFDM symbols per minislot may be configured within a range from 1 to M−1, and the starting position of minislot-based transmission may be defined to be any OFDM symbol within a slot.

In case of downlink, the slot may include one physical downlink control channel (PDCCH) region and a data region similar to a subframe of the LTE system. In the PDCCH region and the data region, a signal may be transmitted or may not be transmitted. Generally, the PDCCH region and the data region are divided into different time resources (and/or different frequency resources).

For convenience, in the present specification, NR signals and NR channels are divided into a first signal set and a second signal set. The first signal set includes a signal and a channel mainly used to allow a base station or a terminal to acquire initial synchronization of uplink (UL) and downlink (DL), and the second signal set includes other signals and channels. For example, the first signal set may include a downlink synchronization signal, a physical broadcast channel (PBCH), and/or a beam reference signal (BRS) in case of the downlink, and the first signal set may include a physical random access channel (PRACH) in the case of the uplink. The first signal set may also be used for purposes other than uplink and downlink synchronization acquisition. For example, the downlink synchronization signal may be used for time and frequency synchronization tracking or radio resource management (RRM) measurement of a terminal in a radio resource control (RRC) connected state (e.g., terminal in an RRC CONNECTED mode). In some cases, the second signal set may be classified into a 2-1-th signal set and a 2-2-th signal set. The 2-1-th signal set is a set of signals and channels common to several terminals, and the 2-2-th signal set is a set of signals and channels which are UE-specific. For example, the 2-1-th signal set may include a common search space of the PDCCH, a physical downlink shared channel (PDSCH) on which broadcast information (e.g., system information) is carried, and the like. In addition, hereinafter, the transmission of the first signal set and the second signal set means a transmission of all or some of the signals and the channels included in the corresponding set.

In the LTE system, all terminals other than a low-cost terminal (e.g., bandwidth-reduced low-complexity (BL)/coverage enhanced (CE) UE) commonly support a sampling rate of up to 30.72 MHz and supports a maximum system bandwidth (e.g., 20 MHz) per carrier and supports fast Fourier transform (FFT)/inverse FFT (IFFT) of up to 2048 size. However, the NR system supports a plurality of numerologies, and therefore capability of a terminal may be subdivided. The capability of the NR terminal may be defined based on the maximum sampling rate. For example, the capability of the terminal supporting bandwidths (BWs)

of up to 40 MHz, 160 MHz, and 640 MHz may be respectively defined as the maximum sampling rate of 61.44 MHz, 4*61.44 MHz, and 16*61.44 MHz. In this case, the terminal may perform a transmission using various combinations of subcarrier spacings and FFT/IFFT sizes within a range that does not exceed the sampling rate.

Alternatively, the capability of the NR terminal may be defined based on the numerology set supported by a terminal. For example, there may be a terminal supporting all numerologies and a terminal supporting only some of the numerologies of the NR system. The capability of the terminal supporting only some of the numerologies may be further subdivided. In this case, the terminal may be defined to support the same numerology set for the transmission of the first signal set and the second signal set.

Alternatively, the capability of the NR terminal may be distinguished according to whether the terminal may transmit and receive data simultaneously using a plurality of numerologies. For example, there may be a terminal that may simultaneously transmit (and/or receive) a plurality of second signal sets to which different numerologies are applied and a terminal that may not simultaneously transmit (or receive) them. The capability of the terminal capable of simultaneously transmitting (and/or receiving) a plurality of second signal sets, to which different numerologies are applied, within the NR carrier may be similar to that of a terminal capable of supporting carrier aggregation to which different numerologies are applied. Further, there may be a terminal that may simultaneously transmit (and/or receive) the first signal set and the second signal set to which different numerologies are applied and a terminal that may not simultaneously transmit (or receive) them. The terminal may transmit capability information to the base station. The capability of the low-cost terminal for the mMTC service may be defined separately from the above-mentioned capability.

Meanwhile, the terminal supporting the URLLC may be divided into a terminal requiring both of an eMBB service and an URLLC service and a terminal requiring only the URLLC service. An example of the former can be a terminal supporting a tactile Internet service (e.g., virtual reality (VR), augmented reality (AR), game, eLearning, etc.), and an example of the latter can be a terminal mounted in a factory automation robot, an operation robot, and the like.

As another example, a terminal equipped in an autonomous vehicle may basically require the URLLC service, and a terminal providing a multimedia service in a vehicle may simultaneously require the URLLC service and the eMBB service. At this point, a category or capability for URLLC dedicated terminal may be defined. Alternatively, the URLLC dedicated terminal is not explicitly distinguished from the eMBB terminal, and may be defined by the method for distinguishing capability as described above. For example, the URLLC dedicated terminal may support a small system bandwidth or a small number of numerologies. Alternatively, the URLLC dedicated terminal may not support a function of simultaneously transmitting (and/or receiving) a plurality of numerologies.

[Numerology Type]

Two numerology types may be defined within one NR carrier. One of the two numerology types is a primary numerology, and the other is a secondary numerology. The primary numerology and the secondary numerology may be defined in view of a terminal, and may be different by terminal. This is similar to a concept in which the primary cell and the secondary cell is defined as terminal specific (e.g., UE-specific) in the LTE system. The primary numerology may be a numerology used when a terminal (e.g., terminal in an RRC_IDLE state) that is not in the RRC connected state initially accesses the NR carrier or a numerology configured as the primary numerology from the base station during the initial access process. Alternatively, the primary numerology may be a numerology configured as a primary numerology from the base station when a terminal is in an RRC connected state (e.g., terminal in an RRC_CONNECTED state). Alternatively, the primary numerology may be a numerology used to allow the terminal to perform a specific function in addition to the initial access. For example, at least the primary numerology may be used for synchronization tracking of the terminal in the RRC connected state, radio resource management (RRM) measurement, PDCCH monitoring, and/or system information block (SIB) reception, and the like. An uplink primary numerology and a downlink primary numerology may be distinguished from each other. For example, the terminal may consider the numerology used to receive the downlink synchronization signal and the PBCH as the downlink primary numerology, and may be configured with the uplink primary numerology from the base station. Alternatively, only in the case of the downlink, the primary numerology may be defined. The remaining numerologies other than the primary numerology among the numerologies configured to the terminal may be defined as the secondary numerology.

[NR Carrier Type]

The carrier of the LTE system has an own unique cell identifier (ID), and is identically defined or configured for all the terminals other than the low-cost terminal. That is, parameters or components (e.g., system bandwidth, center frequency, numerology, PRB composition, and the like) defining a carrier are equally applied to terminals. Meanwhile, in the NR system, one carrier may support a plurality of numerologies. In this case, the NR carrier may be broadly designed as two types (e.g., first type NR carrier and second type NR carrier).

The first type NR carrier is a type in which a structure and an operation of a standalone NR carrier are defined by one representative numerology and other numerologies may be additionally configured in some or all of resources. In this case, the first type NR carrier may not be operated as a standalone carrier using only the additionally configured numerology. Hereinafter, in the first type NR carrier, the representative numerology is called a base numerology, and the numerology that may be additionally configured is called a sub numerology. For example, the base numerology may be numerology applied to a downlink synchronization signal that is used for an initial access.

While the primary numerology and the secondary numerology are classification from the terminal perspective, the base numerology and the sub numerology are classification from the cell (or the system) perspective. In the case of the first type NR carrier, a terminal in an RRC_IDLE state that is to be initially accessed to the NR carrier needs to support at least the base numerology of the corresponding NR carrier. In addition, in the case of the first type NR carrier, all the terminals in the RRC_CONNECTED state may use the base numerology as the primary numerology.

The second type NR carrier is a type capable of performing standalone carrier operations for each numerology when the NR carrier consists of a plurality of numerologies. Or, even if the NR carrier consists of one numerology, a partial frequency part(s) of a carrier may compose a standalone carrier(s). Hereinafter, a standalone carrier composed by each numerology (or partial frequency part) are referred as a self-carrier to be distinguished from a second type NR carrier. That is, one second type NR carrier includes one or a plurality of self-carriers, in which each self-carrier may perform a standalone carrier operation. For example, when the NR carrier consists of the first numerology and the second numerology, the NR carrier may be operated as a standalone NR carrier (e.g., first self-carrier) only by a portion where the first numerology is used, and may be operated as a standalone NR carrier (e.g., second self carrier) only by a portion where the second numerology is used. When the NR carrier is a carrier supporting an initial access, a terminal may use one of the first numerology and the second numerology to initially access the NR carrier. In addition, the terminal may use one of the first numerology and the second numerology as the primary numerology to perform the transmission with the NR carrier. That is, the primary numerology may be differently configured for each terminal within a second type NR carrier.

The features of the first type NR carrier and the second type NR carrier may be simultaneously applied within one NR carrier. For example, when the NR carrier consists of the first numerology, the second numerology, and a third numerology, the first numerology and the second numerology each supports the standalone carrier operation, and the NR carrier may not be operated as the standalone carrier only by the third numerology. In this case, the first numerology and the second numerology may be used as the primary numerology or the secondary numerology, and the third numerology may be used only as the secondary numerology. The present invention considers a first type NR carrier, a second type NR carrier, and a carrier having a form in which the two types are mixed.

FIGS. 1a to 1g are diagrams illustrating a method for supporting terminals having heterogeneous numerology capability in the same frequency region according to an exemplary embodiment of the present invention. FIGS. 1a to 1g illustrate methods for supporting a plurality of terminals having different numerology capabilities in the same frequency region. In FIGS. 1a to 1g, it is assumed that a terminal (UE A) supports only a first numerology, a terminal (UE B) supports only a second numerology, a terminal (UE C) supports both of the first numerology and the second numerology. For example, the first numerology may have a subcarrier spacing of 15 kHz, and a second numerology may have a subcarrier spacing of 60 kHz. For example, the terminal (UE A) may be a terminal supporting only an eMBB service, the terminal (UE B) may be a terminal supporting only an URLLC service, and the terminal (UE C) may be a terminal supporting both of the eMBB service and the URLLC service.

FIG. 1a to 1d and FIG. 1g illustrate a method for supporting a terminal (UE A) and terminal (UE B) by different NR carriers. As illustrated in FIGS. 1a to 1d and FIG. 1g, the terminal (UE A) is connected to a first carrier to perform a transmission through the first numerology, and the terminal (UE B) is connected to a second carrier to perform a transmission through the second numerology. In detail, FIGS. 1a to 1d illustrate a case where a frequency range of the second carrier is included in a frequency range of the first carrier. At this time, all of the overlapping frequency range may be used for the transmission of the first carrier and the second carrier. This is features different from the LTE system. The transmission of the first carrier and the second carrier in the overlapping frequency region may be multiplexed by methods of frequency division multiplexing (FDM), time division multiplexing (TDM), code division multiplexing (CDM), spatial division multiplexing (SDM), and the like. That is, the signals of the terminal (UE A) and the terminal (UE B) in the overlapping frequency region may be transmitted by the multiplexing methods described above.

Figure 1B:
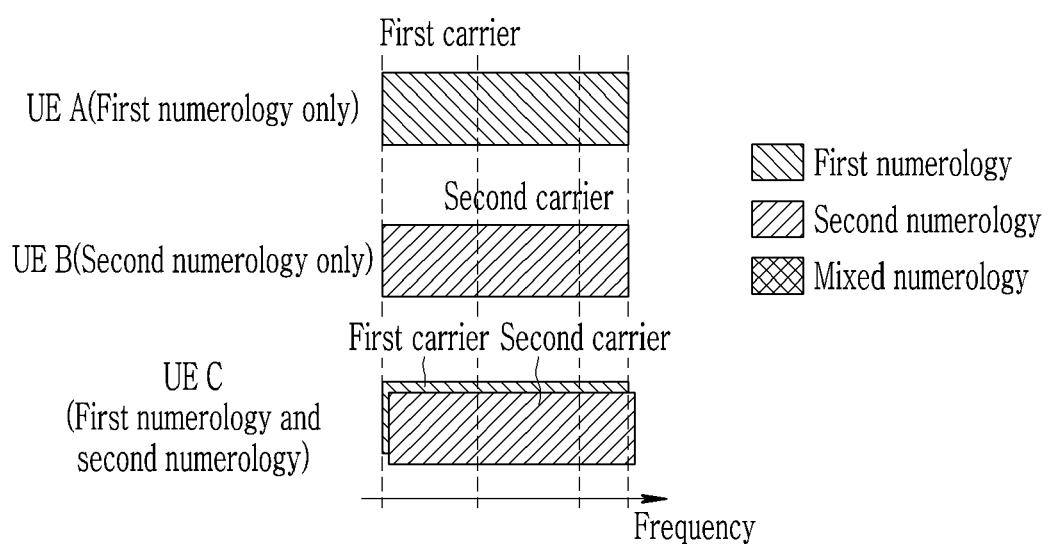
Figure 1C:
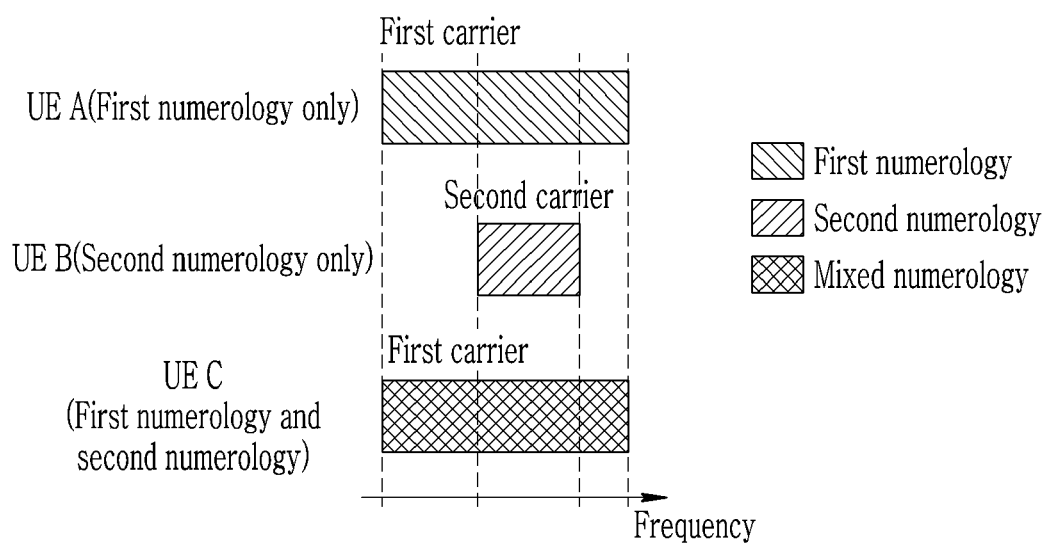
Figure 1D:
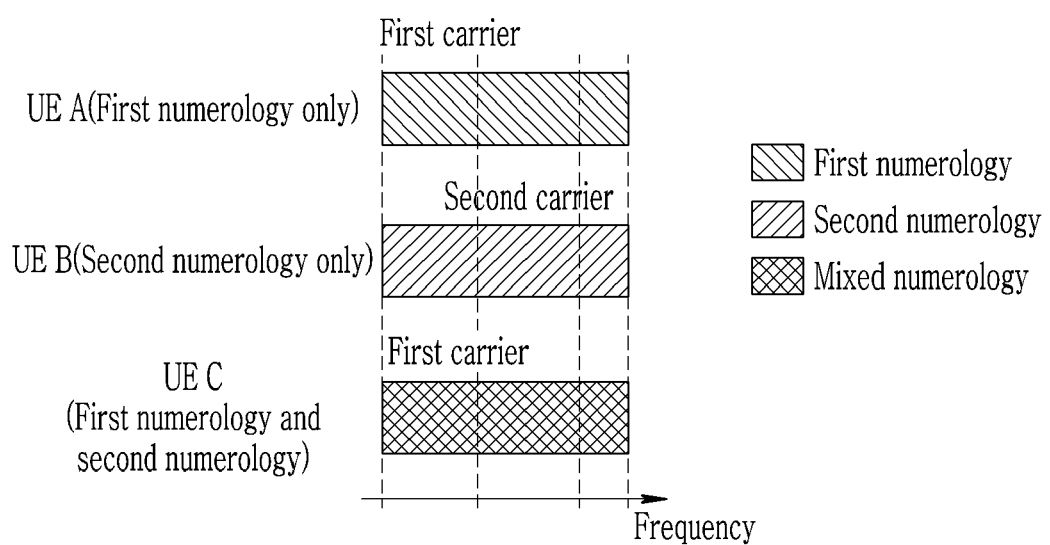

FIGS. 1a and 1c illustrate the case where some of the frequency region of the first carrier overlaps the second carrier, and FIGS. 1b and 1d illustrate the case where the frequency region of the first carrier is the same as the frequency region of the second carrier.

Meanwhile, as the method for supporting a first numerology and a second numerology for a terminal (UE C), a method (e.g., FIGS. 1a and 1b) for aggregating a first carrier and a second carrier and a method (e.g., FIGS. 1c and 1d) for supporting a first numerology and a second numerology (e.g., supporting mixed numerology) within one carrier (e.g., first carrier) may be used. The former method (e.g., FIGS. 1a and 1b) needs not use a plurality of numerologies within one carrier, and therefore has a merit of simple design. However, the terminal needs to perform operations, such as synchronization acquisition and RRM measurement, for each carrier, and therefore there is a problem in that the former method (e.g., FIGS. 1a and 1b) has higher complexity than the latter method (e.g., FIGS. 1c and 1d). When the latter method (e.g., FIGS. 1c and 1d) is used, a specific frequency region may be configured as the first carrier for the terminal (UE C) and may be configured as the second carrier for the terminal (UE B).

Figure 1E:
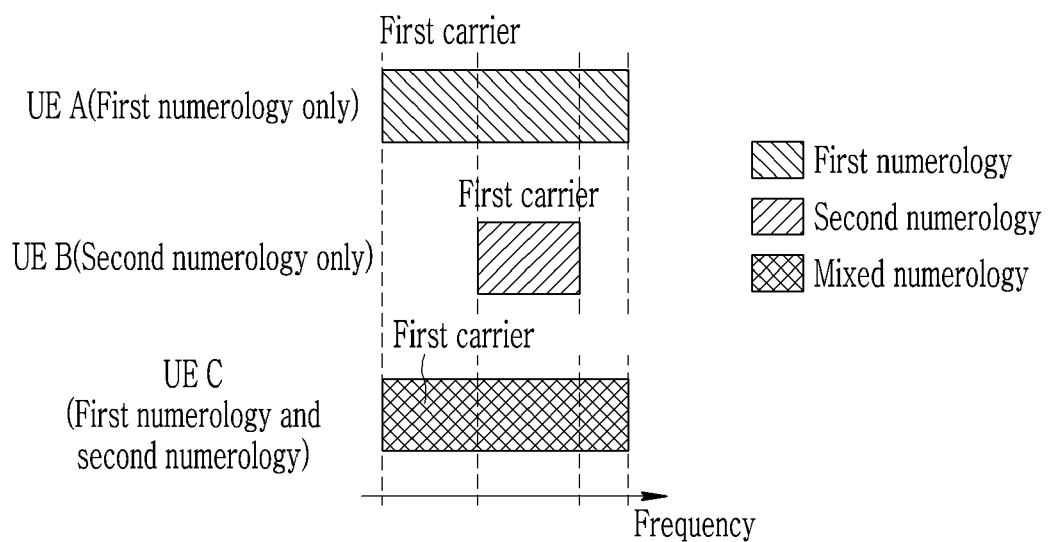
Figure 1F:
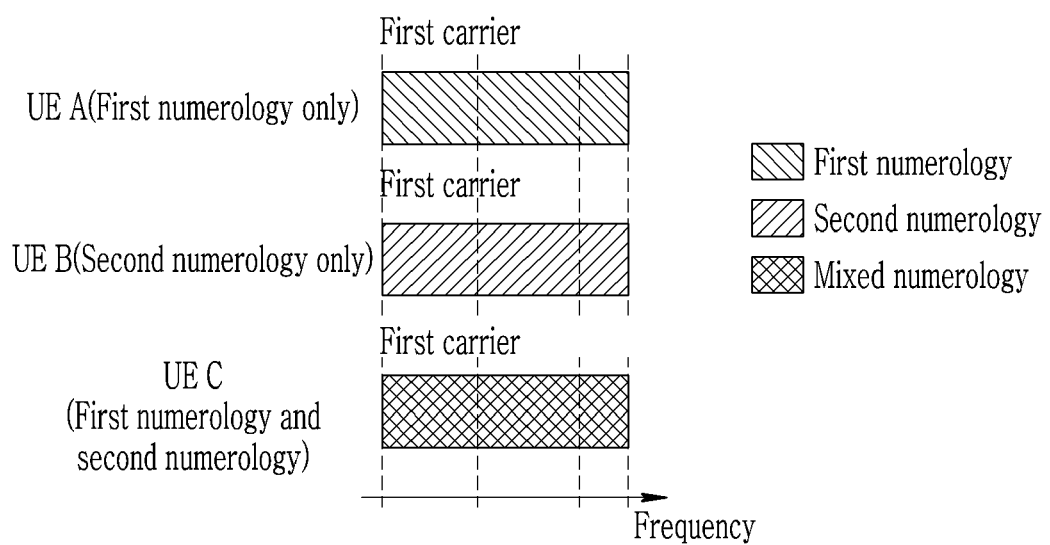
Figure 1G:
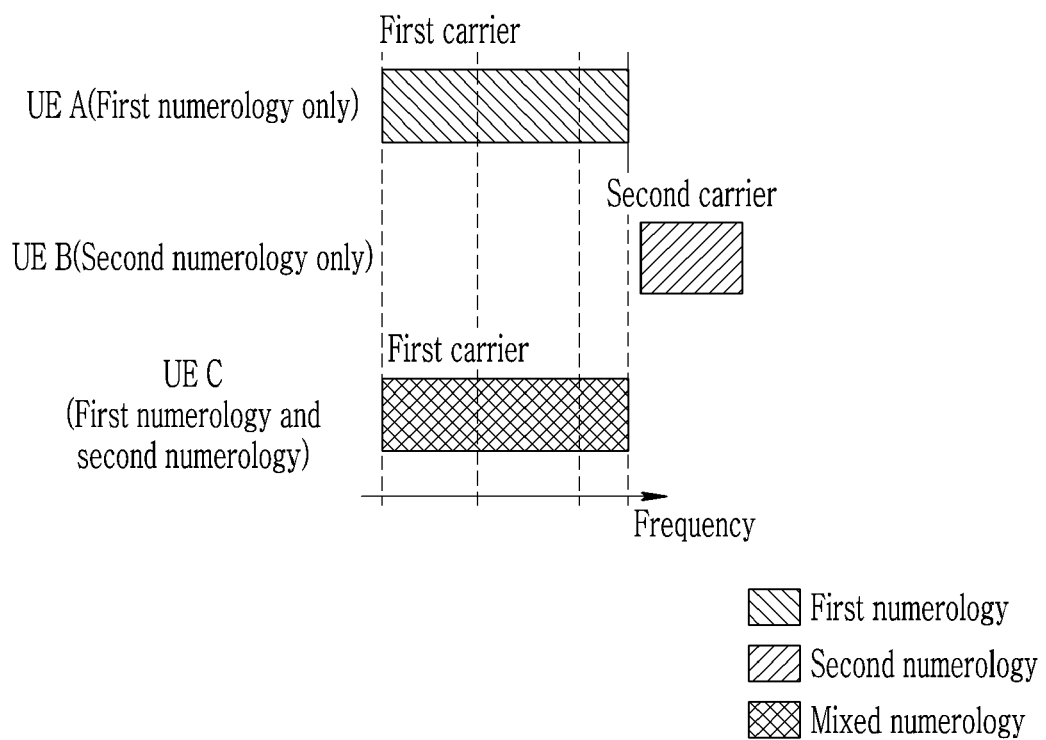

FIG. 1g illustrates the case where the frequency range of the second carrier is not included in the frequency range of the first carrier. That is, the method illustrated in FIG. 1g is a method that does not support the terminal (UE B) within the frequency range of the first carrier. In this case, the first carrier may be a first type NR carrier using the first numerology as the base numerology. The terminal (UE A) and the terminal (UE C) support the first numerology, and therefore may be connected to the first carrier. However, the terminal (UE B) supports only the second numerology, and therefore the terminal (UE B) may not perform the transmission only by the first carrier. The base station additionally configures the second numerology in the first carrier (i.e., configuring the second numerology as the sub numerology), and therefore may use both of the first numerology and the second numerology (e.g., use the mixed numerology) for the transmission with the terminal (UE C).

The method illustrated in FIG. 1e and 1f is a method that supports a terminal (UE A) and a terminal (UE B) by the same carrier (e.g., first carrier). This may correspond to the case where the first carrier is a second type NR carrier. That is, the terminal (UE A) is connected to the first carrier to perform the transmission using only the first numerology, and the terminal (UE B) is connected to the first carrier to perform only the second numerology. The primary numerology of the terminal (UE A) and the terminal (UE B) is the first numerology and the second numerology, respectively. In this case, FIG. 1e illustrates the case where the frequency range of the first numerology belonging to the first carrier and the frequency range of the second numerology belonging to the first carrier are different. In detail, FIG. 1e illustrates the case where the entire frequency region of the NR carrier and the frequency regions for each numerology may be different. FIG. 1f illustrates the case where the frequency range of the first numerology and the frequency range of the second numerology are the same.

Meanwhile, in the case of FIGS. 1c and 1d, to make the first carrier and the second carrier efficiently coexist within the overlapping frequency region, the second numerology signal region of the first carrier and the second carrier may have an inclusion relation with each other. That is, the second numerology signal region commonly defined is configured within the first carrier for the terminal (UE C) and may be configured as the second carrier for the terminal (UE B). For this purpose, the first carrier may be the second type NR carrier. That is, when the first numerology signal region and the second numerology signal region of the first carrier are each operated as a standalone carrier, the second numerology signal region of the first carrier may be configured within the first carrier for the terminal (UE C) and configured as the second carrier for the terminal (UE B). In this case, a criterion distinguishing a carrier may be a cell identifier (ID). In the above case, the method illustrated in FIGS. 1c and 1d may not be distinguished from the method illustrated in FIGS. 1e and 1f in terms of the physical layer.

[FRB]

To use the plurality of numerologies within the NR carrier, the system bandwidth (or available bandwidth other than the guard band of both ends of the system bandwidth) may be divided into a plurality of frequency resource blocks (FRB). Hereinafter, a method for defining a FRB so that a sum of FRBs is a system bandwidth is referred to as 'method A100', and a method for defining a FRB so that a sum of FRBs is an available bandwidth (i.e., transmission region (transmission region of OFDM subcarriers) other than a guard band of both ends of a system bandwidth) is referred to as 'method A101'. It may be defined so that there is no intersection between the FRBs.

The FRB by the method A101 is similar to a subband of the LTE system in definition. However, the subband of the LTE system is a frequency bundle for a channel state information (CSI) related operation, and therefore the FRB may be distinguished from the subband. For example, a plurality of subbands may be defined within one FRB.

FIGS. 2a to 2e are diagrams illustrating FRB definition of an NR carrier according to an exemplary embodiment of the present invention.

Figure 2A:
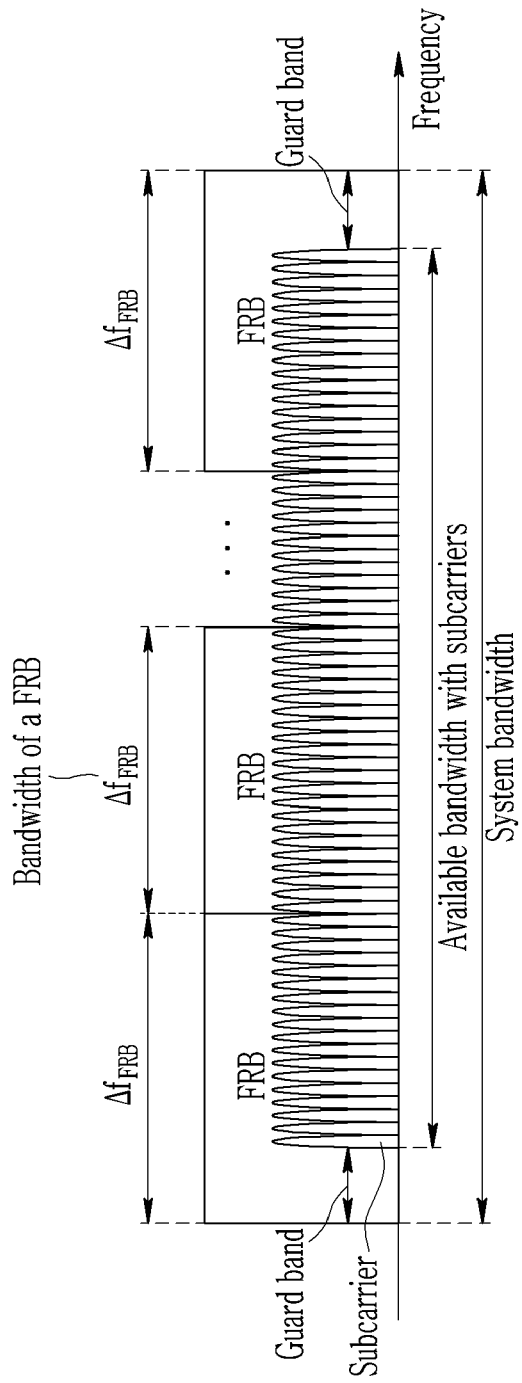
FIG. 2a, FIG. 2b, FIG. 2c, FIG. 2d, and FIG. 2e are diagrams illustrating FRB definition of an NR carrier according to an exemplary embodiment of the present invention.

FIG. 2a illustrates the method A100, and FIGS. 2b to 2e illustrate the method A101.

Figure 2B:
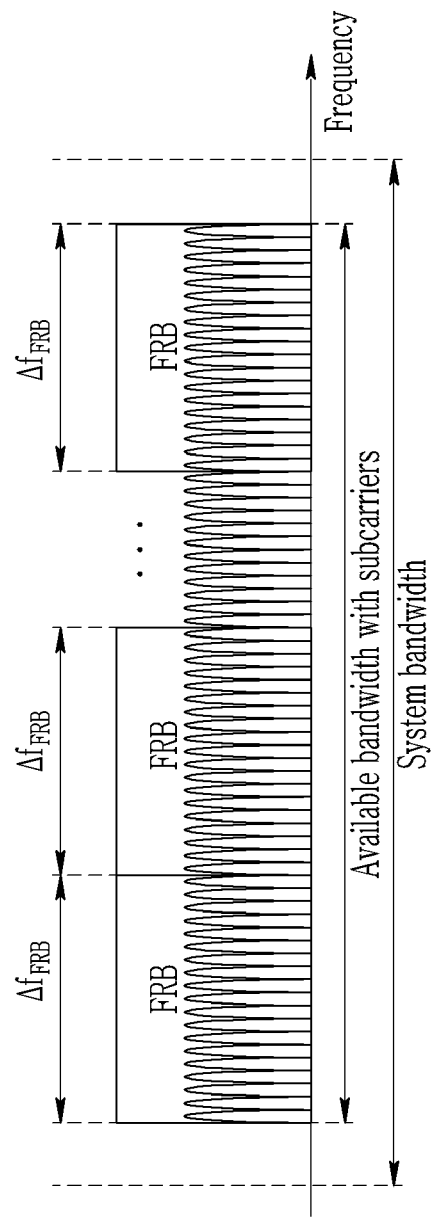
Figure 2C:
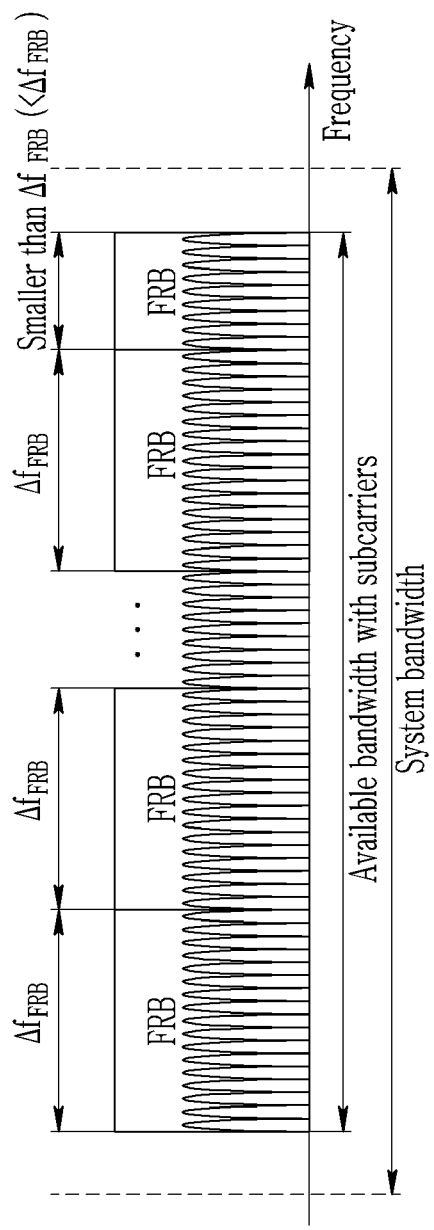
Figure 2D:
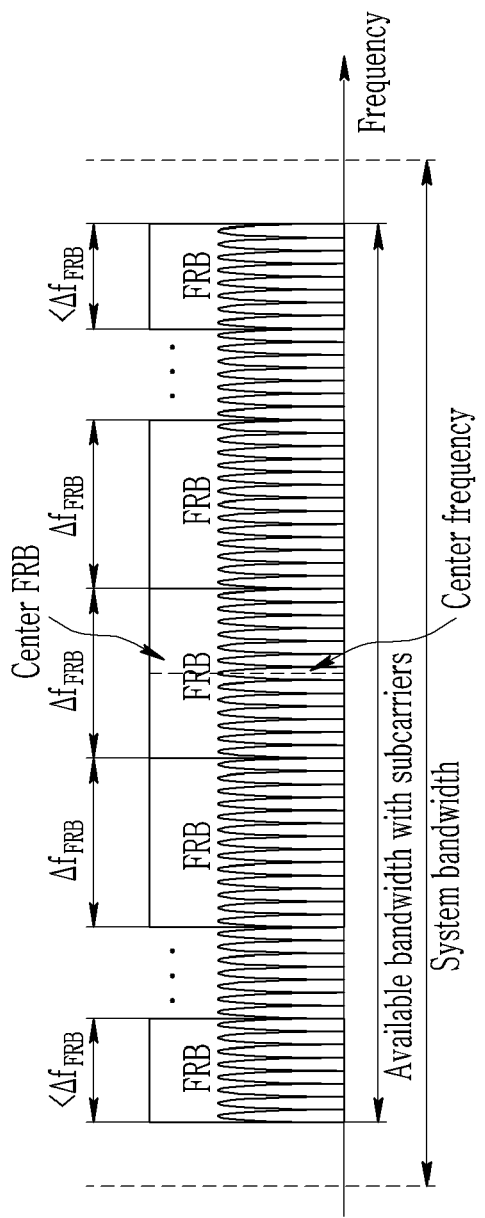
Figure 2E:
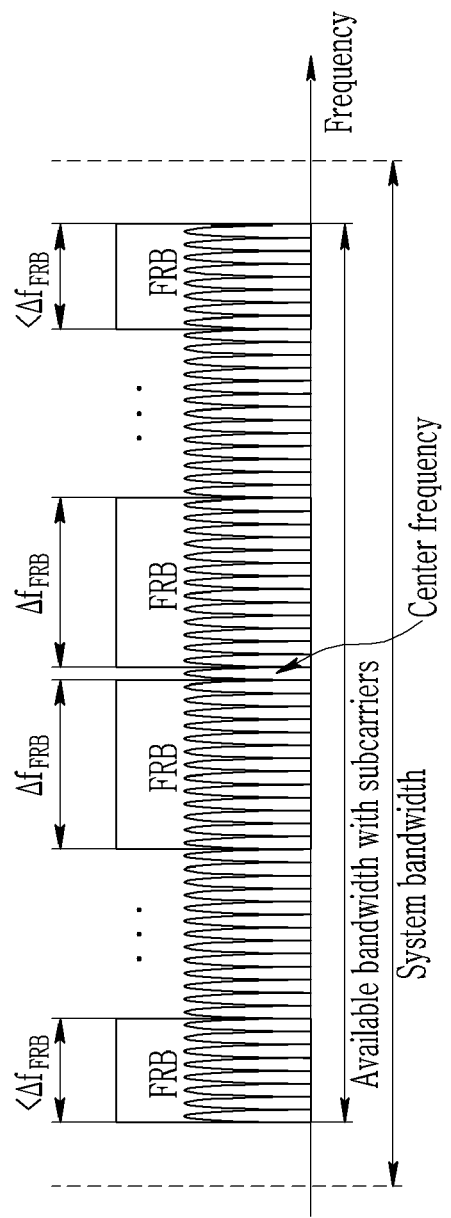

As illustrated in FIGS. 2a and 2b, all the FRBs may have the same bandwidth (e.g., $\Delta f_{FRB}$). Alternatively, as illustrated in FIGS. 2c to 2e, all the FRBs may have the same bandwidth, and the bandwidths of the first FRB and/or the final FRB existing at both ends of the system bandwidth may be smaller than each bandwidth (e.g., $\Delta f_{FRB}$) of the remaining FRBs. Alternatively, unlike this, all the FRBs may have the same bandwidth, and the bandwidths of the first FRB and/or the final FRB may be larger than each bandwidth (e.g., $\Delta f_{FRB}$) of the remaining FRBs.

FIG. 2c illustrates the case where similar to the subband composition of the LTE system, the FRB is sequentially allocated from an edge of available bandwidth and thus a final FRB of an opposite edge includes a smaller number of subcarriers than each of other FRBs.

FIGS. 2d and 2e illustrate the case where the FRBs are sequentially allocated from a center of the available bandwidth so that the FRBs are symmetrical to each other with respect to a center frequency. In detail, FIGS. 2d and 2e illustrate the case where the FRBs existing at both edges of the available bandwidth include a smaller number of subcarriers than other FRBs, respectively. In FIG. 2d, the number of FRBs is an odd number, and the FRBs (e.g., center FRB) that do not form a pair exists at the center of the system bandwidth. In FIG. 2e, the number of FRBs is an even number, and all the FRBs form a pair with respect to the center frequency. FIG. 2e illustrates the case where one direct current (DC) subcarrier exists at the center of the system bandwidth and the DC subcarrier is not included in the configuration of the FRB. However, FIG. 2e is only an example of the exemplary embodiment. Generally, a location of the DC subcarrier may not be the center of the system bandwidth, and the FRB may also be defined so that the DC subcarrier is included in the specific FRB.

In the case of the method A100, the bandwidth of the the FRB may be a divisor of the system bandwidth. For example, when the system bandwidth is 20 MHz, the NR carrier may consist of 4 FRBs having a bandwidth of 5 MHz. As the method as described below, when the FRB is used as a frequency base basic unit of the numerology configuration, the method A100 is applied to the second type NR carrier and thus the plurality of numerologies may have different system bandwidths. For example, when the second type NR carrier has the entire system bandwidth of 20 MHz, the system bandwidth of the first numerology and the system bandwidth of the second numerology may be set to be 20 MHz and 10 MHz, respectively. In this case, if the number of FRBs having a bandwidth of 5 MHz is four, the frequency region of the second numerology may be allocated through two consecutive FRBs. The terminal using the first numerology as the primary numerology may be configured with the two consecutive FRBs for the frequency region of the second numerology as the secondary numerology or a blank resource.

Meanwhile, in the case of the method A101, the bandwidth of the FRB may be an integer multiple of the system bandwidth. This is referred to as 'method A102'. Alternatively, the bandwidth of the FRB is an power of two multiple of 2 of the PRB bandwidth. This is referred to as 'method A103'.

As an example of the method A103, each FRB may be configured as 16 PRBs. In this case, like the LTE system, when one PRB consists of 12 subcarriers, one FRB includes 192 (=16*12) subcarriers.

If in the method A102 and the method A103, the number of PRBs per FRB is defined as P, it may be difficult for each of the FRBs to have the P PRBs. When the number of PRBs is not divided by P or smaller than P, some or all of the FRBs may consist of a smaller number of PRBs. For example, it is assumed that 26 PRBs exist in a system bandwidth of 5 MHz and P=16 by the method A103. In this case, if it is assumed that 3 FRBs are defined according to a principle of FIG. 1d, a first FRB, a second FRB, and a third FRB may each consist of 5, 16, and 5 PRBs. Alternatively, if it is assumed that two FRBs are defined according to a principle of FIG. 1e, the first FRB and the second FRB may each consist of 13 PRBs. Meanwhile, when the system bandwidth is small as illustrated, it may be inefficient to use the frequency resource segmented into several FRBs. Therefore, if the system bandwidth of the NR carrier is smaller than a specific value, a method in which the FRB is not defined exceptionally or one FRB occupies a full band may be considered. The specific value of the bandwidth may be different for each numerology.

Meanwhile, when the method A100 is used, generally, a boundary of the PRB and a boundary of the FRB are not aligned with each other, and therefore the number of PRBs may be different for each FRB and even the size of the guard band may be different for each FRB. This may reduce the frequency resource utilization efficiency or increase signaling overhead.

On the other hand, when the method A102 and the method A103 are used, the boundary of the PRB and the boundary of the FRB are aligned with each other, and therefore the number of PRBs may be equally defined for each FRB as far as possible and/or the size of the guard band may be equally defined for each FRB as far as possible. In the case of the first type NR carrier, for the definition of the FRB, the method A100 may be used or the method A101 to method A103 may be used. To use the above-mentioned advantages, the method A101 to method A103 may be used for the definition of the FRB.

[First Type NR Carrier]

In the first type NR carrier, the base numerology may be defined as numerology that all the terminals may commonly use within the NR carrier irrespective of the RRC connection state. That is, a specific signal or a specific channel within the NR carrier may be transmitted by at least the base numerology. Even if the terminal does not receive any numerology configuration information from the base station, the terminal may receive and/or transmit the specific signal (or channel) by default using the base numerology as the primary numerology.

For example, the first type NR carrier may always have the first signal set (first signal set for downlink) transmitted by the base numerology. The terminal that is not in the RRC connected state may use the first signal set (first signal set for downlink) to camp on a specific cell or try the initial access to a specific cell. Further, the first type NR carrier may always have a 2-1-th signal set transmitted by the base numerology. Alternatively, the base numerology may be defined as numerology used to transmit some of the 2-1-th signal set irrespective of the first signal set. In this case, the terminal that is not in the RRC connected state may not know what the base numerology of the corresponding cell (or carrier) is. For example, when the terminal that is in the RRC connected state does not receive a configuration of a separate numerology, the terminal may periodically monitor the PDCCH using the base numerology within the activated NR carrier. If the numerology of the first signal set and the 2-1-th signal set (e.g., the PDCCH) are different from each other, the terminal may acquire the numerology of the 2-1-th signal set (e.g., the PDCCH) in the process of receiving the first signal set for the initial access. Only one numerology may be used as the base numerology within one NR carrier.

The numerology used as the base numerology for each frequency band may be defined in advance. For example, the subcarrier spacing of 15 kHz may be used as the base numerology in a band of 3 GHz or less, the subcarrier spacing of 30 kHz may be used as the base numerology in a band of 3 to 6 GHz, and the subcarrier spacing of 120 kHz may be used as the base numerology in a band of 6 GHz or more. According to the scheme, the terminal tries cell search using the numerologies preset for each frequency band, thereby reducing the complexity for the cell search and the initial access. On the other hand, the numerology that may be used as the base numerology is not limited, and a method for arbitrarily selected, by a base station, numerology may be used. For example, the subcarrier spacing of 15 kHz and the subcarrier spacing of 30 kHz may be used as the base numerology in a band of 6 GHz or less. According to the scheme, the operator may select the base numerology according to the operating scenario to improve flexibility of technical specification but the terminal may try to receive the synchronization signal through the plurality of numerologies in the initial cell search which increases the complexity.

The terminal that is not in the RRC connected state may find out the base numerology in the initial access process to the corresponding carrier. For example, the terminal may find out the base numerology through the reception of the downlink synchronization signal. When the synchronization signal is transmitted through only the base numerology, the terminal may try to detect the synchronization signal for the plurality of numerologies and consider the numerology successfully receiving the synchronization signal as the base numerology.

On the other hand, when the synchronization signal is transmitted through several numerologies within one NR carrier, as the method for acquiring, by a terminal, base numerology, various methods may be considered. For example, the base station may transmit the base numerology information by carrying the base numerology information on the first signal set (e.g., synchronization signal or PBCH). Carrying the base numerology information on the first signal set includes all the methods capable of acquiring, by the terminal, base numerology information by receiving a first signal set. For example, the mapping (or sequence) for the downlink synchronization signal of the base numerology may be differently defined from the mapping (or sequence) for the downlink synchronization signal of the numerology different from the base numerology.

In the present specification, as the signaling that the base station may use to transmit control information to the terminal, physical layer signaling (e.g., control information of a physical layer control channel), medium access control (MAC) signaling (e.g., MAC protocol data unit (PDU) type control information, or MAC header type control information), RRC signaling (e.g., RRC control message, or information element (IE) type control parameter), or the like may be considered. Generally, higher layer signaling includes MAC signaling and RRC signaling. In particular, when the control signaling by the physical layer signaling or MAC signaling scheme is composed along with scheduling information for the corresponding terminal or is transmitted simultaneously therewith, a dynamic resource utilization may be used. As another method, a method for notifying configuration information using RRC signaling and dynamically controlling configuration information configured by RRC through physical layer signaling or MAC signaling may also be used.

The system bandwidth of the first type NR carrier may be defined by the base numerology. Alternatively, candidate values for the system bandwidth of the NR carrier may be defined by the base numerology. For example, when the system bandwidth supported by numerology A is 5, 10, 20 and 40 MHz, the system bandwidth of the NR carrier using the numerology A as the base numerology may be one of 5, 10, 20 and 40 MHz. If the numerology A is used in the system bandwidth wider than 40 MHz, the numerology supporting a wider system bandwidth may be used as the base numerology and the numerology A may be used as the sub numerology. The FRB may also be determined by the base numerology. This is illustrated in FIG. 3.

Figure 3:
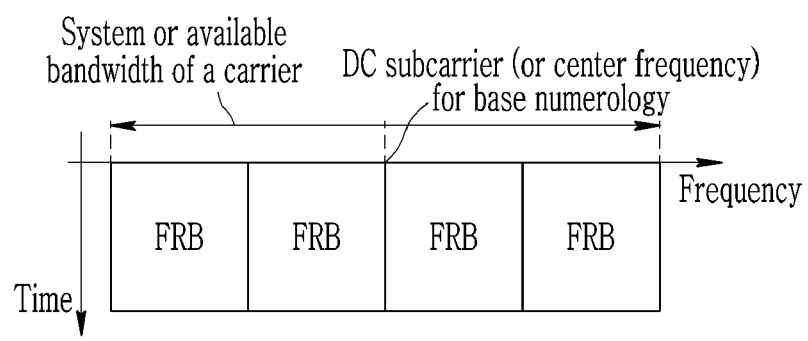
FIG. 3 is a diagram illustrating an NR carrier based on a base numerology according to an exemplary embodiment of the present invention.

FIG. 3 is a diagram illustrating an NR carrier based on a base numerology according to an exemplary embodiment of the present invention.

In detail, FIG. 3 illustrates the case where the system bandwidth of the carrier is defined by the base numerology and the system bandwidth (or available bandwidth) is divided into 4 FRBs. At this time, for the definition of the FRB, all of the method A100 to the method A103 may be used. For example, when the numerology A is used as the base numerology and the PRB of the base numerology consists of 12 subcarriers, each FRB may consist of 32 PRBs (i.e., 32*12=384 subcarriers) by the method A103.

Alternatively, the bandwidth of the FRB may also have the fixed value irrespective of the base numerology. For example, when the method A100 is used, the bandwidth of the FRB may always have a bandwidth of 5 MHz irrespective of the base numerology.

Meanwhile, the sub numerologies may be configured as the secondary numerology for the terminal. The terminal may receive a configuration of one or a plurality of secondary numerologies within one NR carrier. It may be assumed that the terminal uses the base numerology as the default operation for the configured FRBs from the base station to perform the transmission and reception. Thereafter, the terminal may receive the RRC message from the base station to receive the configuration of the secondary numerology for a specific FRB(s). For example, the terminal may assume that the base numerology is applied to the FRB(s) defined within the system bandwidth simultaneously with receiving the configuration of the system bandwidth (or frequency domain) of the NR carrier.

As another method, the terminal may not assume any default numerology for the remaining FRBs other than the FRB(s) to which the base numerology is transmitted statically. In this case, the terminal may perform the transmission using the corresponding numerology only after it configures the numerology from the base station.

Figure 4:
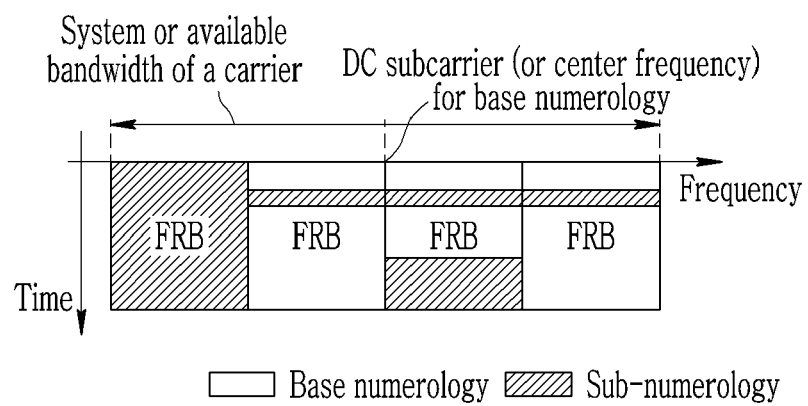
FIG. 4 is a diagram illustrating a coexistence of the base numerology and a sub numerology.

FIG. 4 is a diagram illustrating a coexistence of the base numerology and a sub numerology.

In detail, FIG. 4 illustrates the case where the base numerology and the sub numerology coexist within one NR carrier. FIG. 4 illustrates the case where the system bandwidth (or available bandwidth) is divided into 4 FRBs.

The unit in the frequency domain of the sub numerology configuration may be the FRB. In this case, the minimum unit for the configuration of all numerologies may be defined as one FRB. The scheme has an advantage in that the numerology and resource region may be configured by using the common FRB grid irrespective of the subcarrier spacing of the numerology. Alternatively, the minimum unit for the configuration of each numerology may be defined differently. For example, the minimum configuration unit may be increased in proportion to the subcarrier spacing of the numerology. As an example thereof, for the numerology A, the numerology B, and the numerology C of Table 1, 1, 2, and 4 adjacent FRBs may be defined as minimum configuration unit in the frequency domain, respectively. Alternatively, the minimum configuration unit of the base numerology may be one FRB, and the minimum configuration unit of the sub numerology(ies) having the subcarrier spacing larger than the subcarrier spacing of the base numerology may be increased in proportion to the subcarrier spacing. According to the scheme, the predetermined number of PRBs may always be used as the minimum unit in the frequency domain resource allocation irrespective of the configured numerology.

As illustrated in FIGS. 2c to 2e, when the FRB having the bandwidth smaller than the bandwidth of the general FRB is defined at an edge of the available bandwidth, transmitting or receiving a signal by applying a numerology different from a numerology of a FRB adjacent to the edge FRB may degrade spectrum efficiency. This my be more serious when the bandwidth of the edge FRB is very small (e.g., several PRBs). Therefore, the edge FRB may be limited to always have the same numerology as the numerology of the adjacent FRB. Alternatively, only when the bandwidth of the FRB is smaller than a specific threshold, the limitations may be applied.

The unit in the time domain of the sub numerology configuration may be a subframe or a slot. When the unit in the time domain of the numerology configuration is a slot, a length of the slot may be determined by the base numerology. For example, when a length of a slot of the numerology A is 1 ms, the sub numerology of the NR carrier using the numerology A as the base numerology may be set in a unit of 1 ms.

Alternatively, the unit (e.g., one OFDM symbol or a plurality of the OFDM symbols) smaller than the slot may be the minimum configuration unit of the time domain. The method may be suitable to support the URLLC transmission by the TDM method between the heterogeneous numerologies.

Alternatively, a plurality of slots may be the minimum configuration unit of the time domain. For example, the sub numerology is dynamically reconfigured every Z slots (however, Z is a natural number), and the reconfiguration may be valid for the Z slots.

A plurality of FRBs may be set to have the same sub numerologies. In this case, the plurality of FRBs may be continuous or discontinuous in the frequency domain. The sub numerology may be configured semi-statically or dynamically. The RRC signaling may be used for the semi-static configuration and the physical layer signaling or the MAC signaling may be used for the dynamic configuration. Different configuration methods may be applied to a region in which the control information is transmitted and a region in which data are transmitted. For example, the PDCCH region may be configured based on the semi-static configuration and the data region may be configured based on the dynamic configuration or the semi-static configuration.

Some of the plurality of FRBs may be defined as an anchor FRB. The anchor FRB may be defined as the FRB including a specific time-frequency resource. Here, in the specific time-frequency resource, all terminals expect that the base numerology will be used for signal transmission. For example, the first signal set (e.g., primary synchronization signal (PSS)/secondary synchronization signal (SSS), PBCH and PBCH-DMRS) to which the base numerology is applied may be periodically transmitted on the specific time-frequency resource of the anchor FRB. In addition, the PDCCH region in which the base numerology is used may periodically appear in the anchor FRB. In the case of the uplink, a physical uplink control channel (PUCCH) region in which the base numerology is used may periodically appear in the anchor FRB. The downlink anchor FRB and the uplink anchor FRB may be distinguished from each other and the frequency ranges thereof may be different from each other.

A relative location of the anchor FRB may be fixed within one carrier. Alternatively, the terminal itself may find out the location of the anchor FRB based on the predefined relationship between the anchor FRB and the specific signal (or specific channel). Alternatively, the location of the anchor FRB may be set by the base station. When the location of the anchor FRB is set by the base station, the location of the anchor FRB may be transmitted by the PBCH.

For forward compatibility, it is preferable to reduce the number of anchor FRBs. The number of anchor FRBs may be defined in one or two within one NR carrier. When the number of anchor FRBs and the location of the anchor FRB in the frequency domain are designed, the boundary between the FRBs and the location of the first signal set (first signal set for the downlink) may be considered.

Figure 5A:
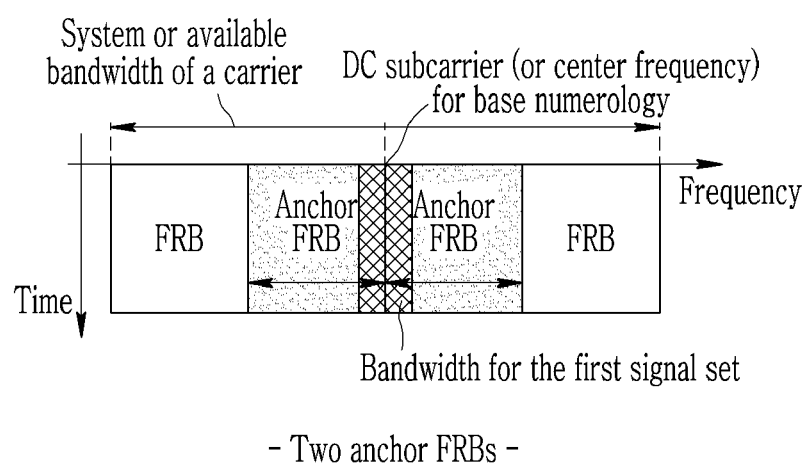
FIG. 5a, FIG. 5b, and FIG. 5c are diagrams illustrating a method for composing an anchor FRB according to an exemplary embodiment of the present invention.
Figure 5B:
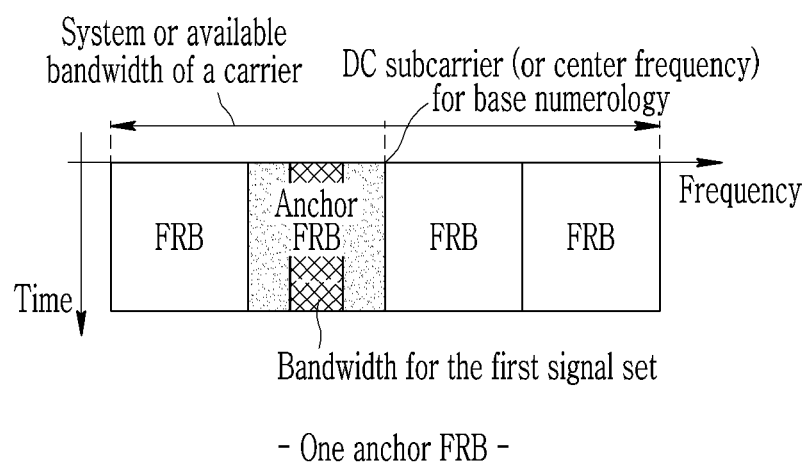
Figure 5C:
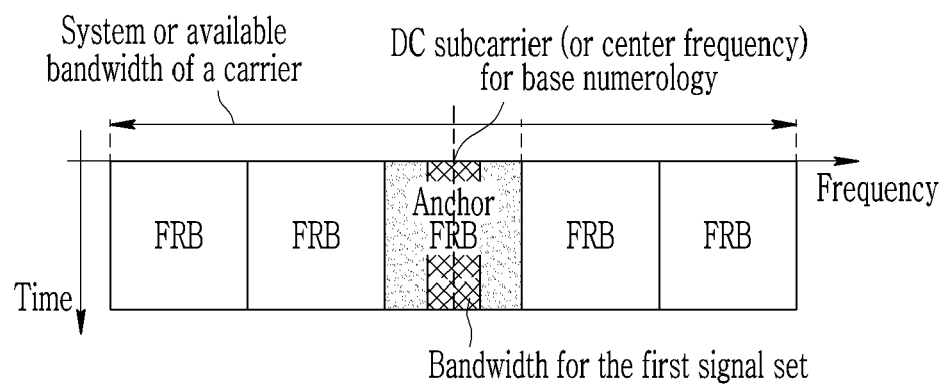

FIGS. 5a to 5c are diagrams illustrating a method for composing an anchor FRB according to an exemplary embodiment of the present invention. FIGS. 5a and 5b illustrate the case where the system bandwidth (or available bandwidth) is divided into 4 FRBs. FIG. 5c illustrates the case where the system bandwidth (or available bandwidth) is divided into five FRBs.

In detail, FIG. 5a illustrates the case where the boundary of the FRB is located at the center frequency of the carrier and the first signal set is periodically transmitted over two FRBs located at the center. In this case, the two FRBs located at the center may be defined as the anchor FRB.

FIG. 5b illustrates the case where the boundary of the FRB is located at the center frequency and the first signal set is periodically transmitted only within one FRB. In this case, one FRB to which the first signal set is transmitted may be defined as the anchor FRB.

FIG. 5c illustrates the case where as described above with reference to FIG. 2d, the center FRB that does not form a symmetry to other FRBs exists at the center of the bandwidth. In this case, when the first signal set is periodically transmitted in one FRB located at the center, one FRB located at the center may be defined as the anchor FRB.

According to the exemplary embodiments, the carrier may include both of a wideband carrier (e.g., system bandwidth of 100 MHz) and a narrowband carrier (e.g., system bandwidth of 10 MHz). In addition, according to the exemplary embodiments, the carrier may be a self-carrier composing the above-mentioned second type NR carrier.

The FRB may be used as a unit distinguishing a frequency resource, and may include all resource regions in the time domain.

On the other hand, one FRB may also be defined as a limited frequency resource and a limited time resource. For example, one FRB may include one or a plurality of PRBs and slots corresponding to numerology applied to the FRB. At this time, the length of the FRB in the time domain may be different for each numerology or may be common to all numerologies. For example, the length of the FRB in the time domain may be defined as a length including X slots of the base numerology, and the value may be applied to all the FRBs. Alternatively, the length of the FRB in the time domain may be defined as a fixed value (e.g., 10 ms) irrespective of the base numerology. When the length of the FRB in the time domain is finite, it may be assumed that the terminal does not transmit any signal out of the time period of the configured FRB. Alternatively, it may be assumed that the terminal uses the base numerology or the primary numerology out of the time period of the configured FRB. Alternatively, it may be assumed that the terminal uses the numerology configured in advance by the RRC signaling out of the time period of the configured FRB.

A method for applying only base numerology to the entire resource region of the anchor FRB may be considered. Alternatively, a method for statically applying base numerology only to some of a time-frequency resource region of an anchor FRB and applying sub numerology (i.e., secondary numerology of a terminal) to the remaining resource region may be considered. The first signal set and/or the 2-1-th signal set may be transmitted in some of the time-frequency resource region. In the case of the downlink anchor FRB, the PSS/SSS, PBCH, and PBCH-DMRS may be transmitted in some of the time-frequency resource region. To support the wideband URLLC transmission by the sub numerology, the latter method may be used. Alternatively, a method for scheduling only base numerology for the entire resource region of an anchor FRB and exceptionally puncturing some of time resources by a packet of sub numerology may be considered.

[Second Type NR Carrier]

In the case of the first type NR carrier, the frequency region may be defined by the base numerology. On the other hand, in the case of the second type NR carrier, the plurality of numerologies may form each self-carrier within one NR carrier. Generally, the entire frequency region of the second type NR carrier may not match the frequency region of each self-carrier. The entire frequency region of the second type NR carrier may be defined as a union of the frequency regions of self-carriers. If there are no limitations between the entire frequency region and the frequency region of the self-carriers, the distinction between the second type NR carrier and the self-carrier may be ambiguous.

Accordingly, even in the case of the second type NR carrier, the base numerology may be defined. The entire frequency range of the second type NR carrier may match the frequency range of the base numerology. For example, the second type NR carrier may consist of the first numerology occupying the first frequency region and the second numerology occupying the second frequency region. In this case, if the first numerology is used as the base numerology, the entire frequency region of the second type NR carrier may match the first frequency region and the second frequency region may be some of first frequency region. According to the method, the role of the base numerology is the same as the case of the first type NR carrier, and the first type NR carrier and the second type NR carrier may be distinguished by only whether the numerologies other than the base numerology may be used as the primary numerology.

Hereinafter, for convenience, even in the case of the second type NR carrier, numerology(ies) different from the base numerology is called the sub numerology. According to the method, the method for composing a FRB and an anchor FRB may be equally applied even to the second type NR carrier. In the case of the second type NR carrier, the bandwidth of the FRB may have the fixed value irrespective of the numerology. For example, the method A100 is used for the configuration of the FRB, and the bandwidth of the FRB may always be 5 MHz irrespective of the numerology. In addition, in the case of the second type NR carrier, the anchor FRB may exist for each self-carrier. Alternatively, the anchor FRB may exist at least for all numerologies used as the primary numerology of the terminal irrespective of the numerology type.

In the case of the second type NR carrier, the first signal set and/or the 2-1-th signal set may always be transmitted at least for all numerologies used as the primary numerology of the terminal irrespective of the numerology type. When the first signal set and/or the 2-1-th signal set are transmitted by a specific numerology, the terminal using the specific numerology as the secondary numerology may be configured with the existence of the signal set from the base station to find out the existence of the signal set.

[Subcarrier Grid]

Hereinafter, the consecutive OFDM subcarriers or the set of their frequency locations is called a 'subcarrier grid'. In the frequency corresponding to each grid point of the subcarrier grid defined in advance, the OFDM subcarrier may be transmitted. When the plurality of numerologies are used within one NR carrier, the subcarrier grid may be defined for each numerology. When the subcarrier spacings of the numerologies are different from each other by an exponentiation of 2, the subcarrier grid point of the numerology having the large subcarrier spacing may be aligned on the subcarrier grid point of the numerology having the small subcarrier spacing. That is, the former grid point and the latter grid point may have the same frequency value. This is illustrated in the FIG. 6, FIGS. 8a and 8b, FIGS. 9a and 9b, and FIG. 10. The subcarrier grid for each numerology may be defined in one or several within the system bandwidth (or available bandwidth other than the guard band in the system bandwidth) of the NR carrier. The OFDM modulation and demodulation may be performed for each subcarrier grid.

Figure 6:
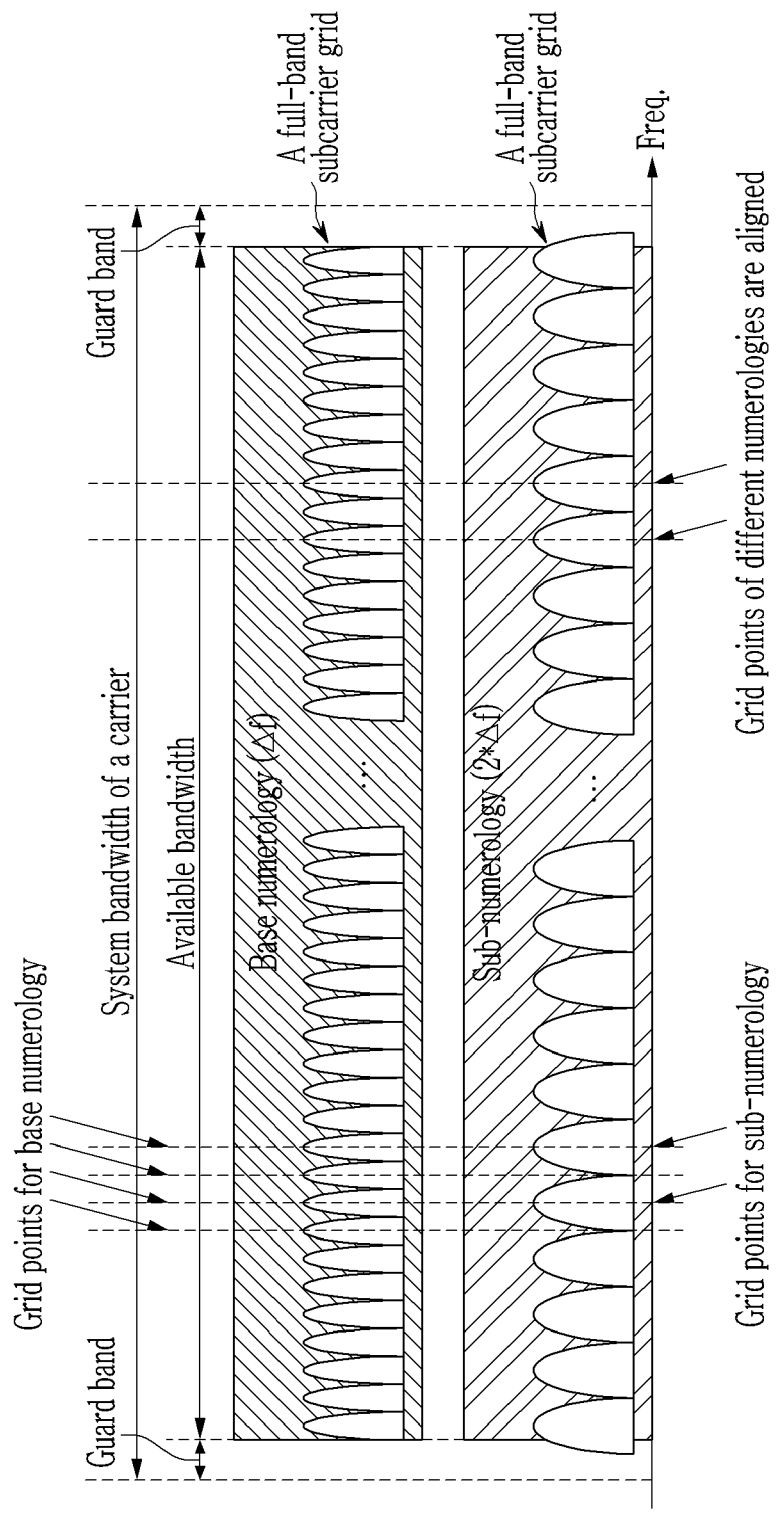
FIG. 6 is a diagram illustrating a subcarrier grid based on a method A110 according to an exemplary embodiment of the present invention.

A method that allows each numerology within an NR carrier to have one full-band subcarrier grid is called 'method A110'. FIG. 6 illustrates the method A110.

FIG. 6 is a diagram illustrating a subcarrier grid based on a method A110 according to an exemplary embodiment of the present invention.

In detail, FIG. 6 illustrates that the base numerology and the sub numerology having subcarrier spacing two times as large as subcarrier spacing (e.g., Δf) of the base numerology each have one full-band subcarrier grid. As illustrated in FIG. 6, the subcarrier grid point of the sub numerology may be aligned on the subcarrier grid point of the base numerology.

The method A110 has an advantage in that the terminal may perform the FFT/IFFT operations for each numerology only once irrespective of the configuration form of the numerology. When the method A110 is used, the center frequency of the subcarrier grid for a numerology may be the same for all numerologies and the bandwidth of the subcarrier grid for a numerology may be the same for all numerologies. When the DC subcarrier is defined for all numerologies, the location of the DC subcarrier may be the same for all numerologies. The method A110 may be more suitable for the first type NR carrier.

Figure 7A:
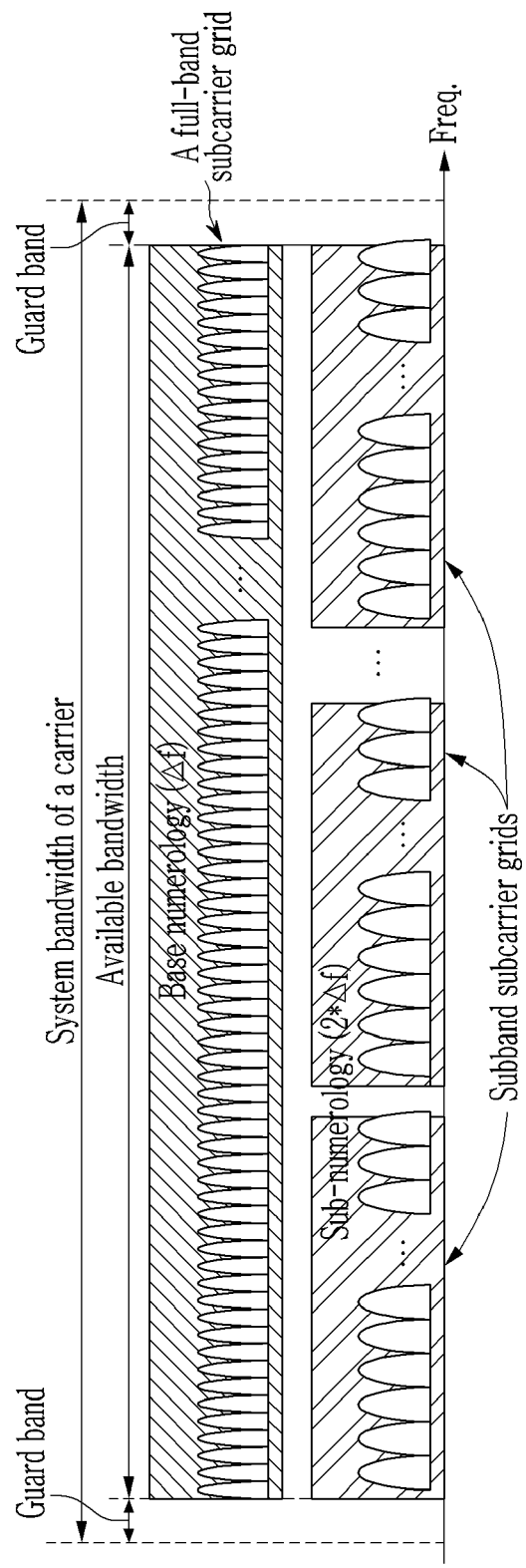
FIG. 7a and FIG. 7b are diagrams illustrating a subcarrier grid based on a method A111 according to an exemplary embodiment of the present invention.
Figure 7B:
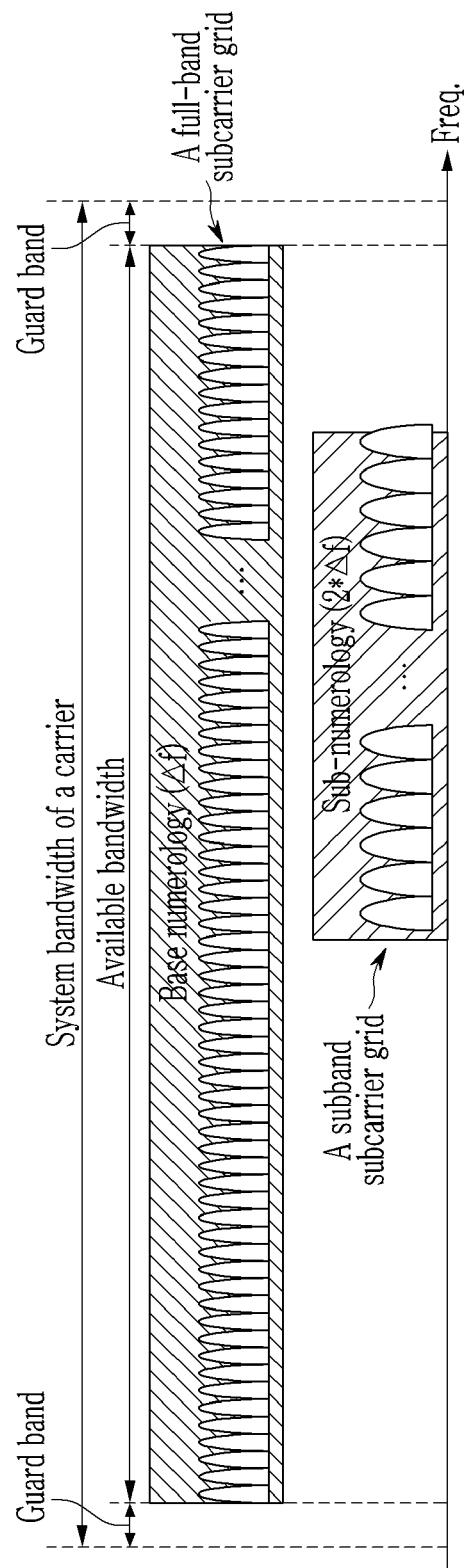

Meanwhile, the base numerology may have one full-band subcarrier grid, and the sub numerology may have one or a plurality of subband subcarrier grids. This is referred to as 'method A111'. FIGS. 7a and 7b illustrate the method A111.

FIGS. 7a and 7b are diagrams illustrating a subcarrier grid based on a method A111 according to an exemplary embodiment of the present invention.

In detail, FIG. 7a illustrates the case where a sub numerology has a plurality of subband subcarrier grids and FIG. 7b illustrates the case where a sub numerology has one subband subcarrier grid. FIGS. 7a and 7b illustrate the case in which the subcarrier spacing of the sub numerology is two times as large as the subcarrier spacing (e.g., Δf) of the base numerology.

When the method A111 is used, the subcarrier grid of the sub numerology may be defined within each FRB. For example, when the NR carrier consists of 4 FRBs, the subcarrier grids for each sub numerology may be up to four.

Alternatively, when the method A111 is used, the size of the subcarrier grid of the sub numerology may be defined as the smallest bandwidth including all the frequency regions configured by the sub numerology. One subband subcarrier grid for the sub numerology may include the full band. When the sub numerology is configured in unit of a FRB in the frequency domain, the subcarrier grid of the corresponding sub numerology may be defined within a plurality of consecutive FRBs. The method may be more suitable for the second type NR carrier.

When the method A111 is used, the subcarrier grids of the sub numerology may be designed so that the spacing between the subcarriers belonging to different grids is an integer multiple of the base subcarrier spacing for the corresponding numerology. By this, the interference between the subcarrier grids may be removed.

Even when the method A111 is used, the subcarrier grid point of the numerology having the large subcarrier spacing may be aligned on the subcarrier grid point of the numerology having the small subcarrier spacing.

Meanwhile, the method for defining a DC subcarrier and using the DC subcarrier as a null subcarrier may lower the implementation complexity of the OFDM receiver. In the LTE system, in the case of the downlink, the DC subcarrier exists at the center frequency of the carrier, and in the case of the uplink, the DC subcarrier does not exist. In the case of the NR carrier, the presence or absence of the DC subcarrier may be defined for each numerology type. This is referred to as 'method A120'.

As the detailed method for the method A120, method A121, method A122, and method A123 may be used.

The method A121 is a method that uses the DC carrier for the transmission of the base numerology and does not use the DC subcarrier for the transmission of the sub numerology.

The method A122 is a method that uses the DC subcarrier for both of the transmission of the base numerology and the transmission of the sub numerology.

The method A123 is a method that does not use the DC subcarrier for both of the transmission of the base numerology and the transmission of the sub numerology.

When the DC subcarrier for nulling is not defined in the technical specification, the terminal may handle the noise around the DC in implementation.

When the DC subcarrier for nulling exists in a numerology, the DC subcarrier may be defined for each subcarrier grid at the center frequency of the frequency region occupied by each of the subcarrier grids belonging to the corresponding numerology. Alternatively, the location of the DC subcarrier may not be defined in the technical specification in advance, the base station nulls any specific subcarrier, and the nulled specific subcarrier may be used for the DC subcarrier of the terminal.

Figure 8B:
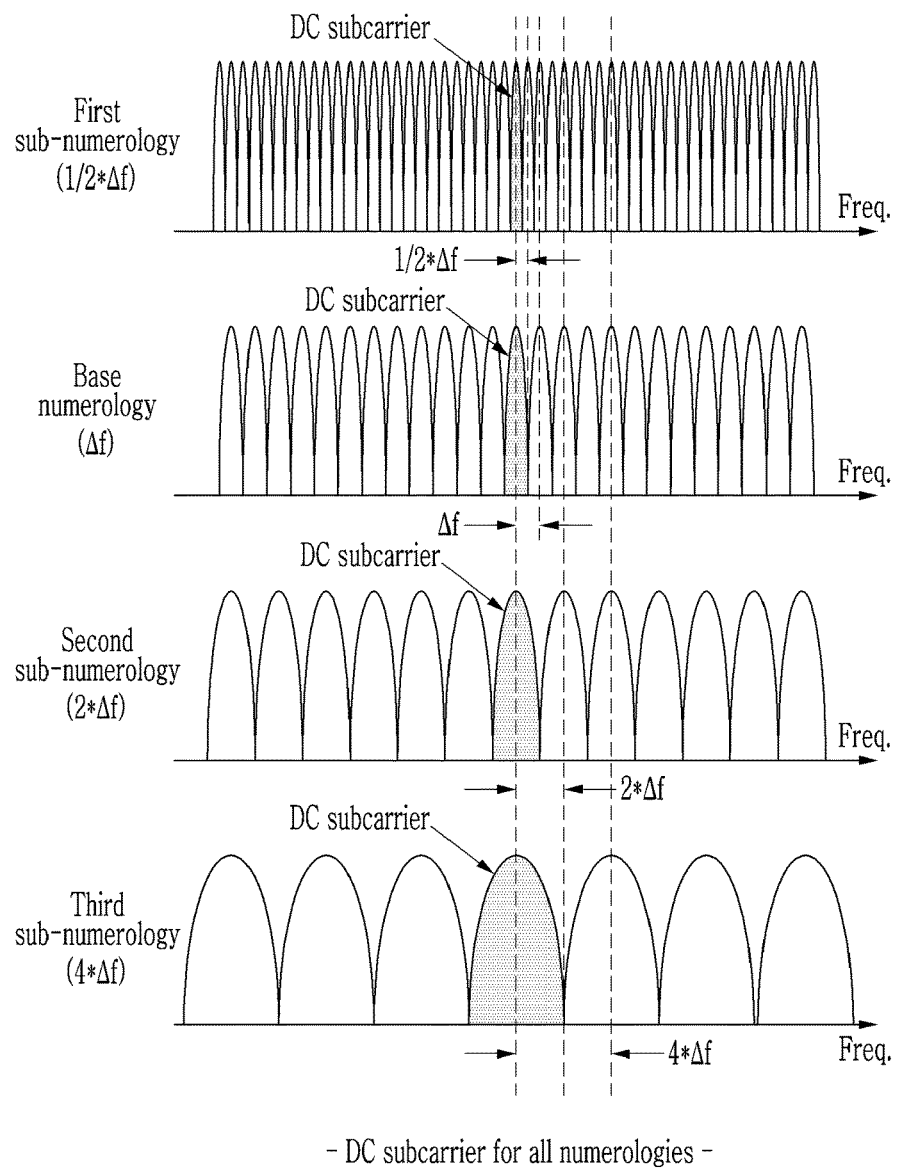

FIGS. 8a and 8b illustrate the method A121 and the method A122.

FIGS. 8a and 8b are diagrams a disposition of a DC subcarrier based on a method A121 and a method A122 according to an exemplary embodiment of the present invention.

In detail, in FIGS. 8a and 8b, the case where the method A110 is used and the base numerology and the sub numerologies have the same center frequency is assumed.

FIGS. 8a and 8b illustrate one base numerology and 3 sub numerologies (first sub numerology, second sub numerology, third sub numerology). The subcarrier spacing of the first sub numerology is 0.5 times as large as the subcarrier spacing (e.g., Δf) of the base numerology, the subcarrier spacing of the second sub numerology is two times as large as the subcarrier spacing (e.g., Δf) of the base numerology, and the subcarier spacing of the third sub numerology is four times as large as the subcarrier spacing (e.g., Δf) of the base numerology.

FIG. 8a illustrates the case in which by the method A121, the DC subcarrier exists only in the base numerology and does not exist in the sub numerologies. That is, the DC subcarrier is used only for the transmission of the base numerology (i.e., transmission based on the base numerology representing a plurality of numerologies).

FIG. 8b illustrates the case in which by the method A122, the DC subcarrier exists both in the base numerology and the sub numerologies. That is, the DC subcarrier is used to transmit all numerologies (i.e., transmission based on all numerologies).

Meanwhile, in the NR system, the disposition of the DC subcarriers of the downlink and the uplink may be the same.

For example, in the case of both of the downlink and the uplink, the method A121 may be used or the method A122 may be used. When the method A121 or the method A122 is also applied to the uplink, one problem exists. In the case of the LTE uplink, there is no DC subcarrier. Accordingly, the DC subcarrier is disposed in the NR uplink carrier, and thus it may be difficult to coexist with 'LTE in-band narrowband (NB)—Internet of things (IoT) carrier'. On the other hand, the DC subcarrier is used even for the transmission of the uplink, and therefore when the low-cost node other than the base station receives the uplink signal, the implementation complexity of the receiver may be lowered.

Meanwhile, the disposition of the DC subcarriers of the downlink and the uplink may also be designed independently. For example, the method A121 or the method 122 may be applied to the downlink and the method A123 may be applied to the uplink. By this, in the case of both of the uplink and the downlink, the NR carrier is easy to coexist with the LTE NB-IoT carrier.

[PRB]

Hereinafter, a method for configuring a PRB on a frequency base will be mainly described. In the NR carrier, the PRB may also be defined as a set of M (however, M is a natural number) consecutive subcarriers in the frequency domain. There is no intersection between the PRBs, and a sum of the PRBs may include all the available subcarriers.

The PRB of the NR carrier may be defined for each numerology. Hereinafter, the PRB of the base numerology is referred to as 'base PRB'. For example, when the numerology A of Table 1 is used as the base numerology, the base PRB of the corresponding carrier may consist of 12 subcarriers and a bandwidth of 180 kHz like the case of the subcarrier spacing of 15 kHz for the LTE system. All the base PRBs may have the same number of subcarriers. For this purpose, a total number of subcarriers of each NR carrier may be an integer multiple of 'the number of subcarriers per base PRB'.

Figure 9A:
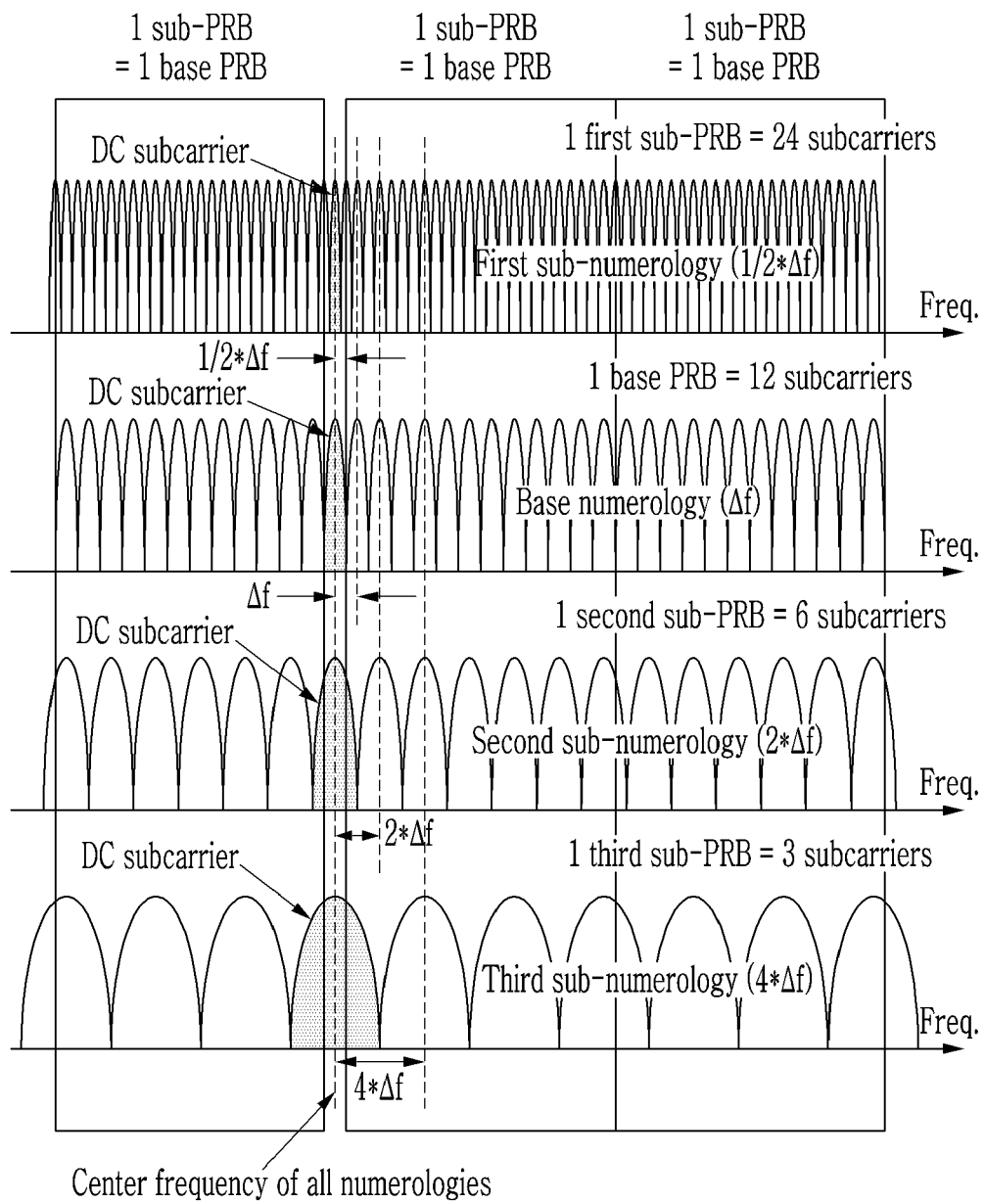
FIG. 9a and FIG. 9b are diagrams illustrating a PRB definition based on a method A130 according to an exemplary embodiment of the present invention.
Figure 9B:
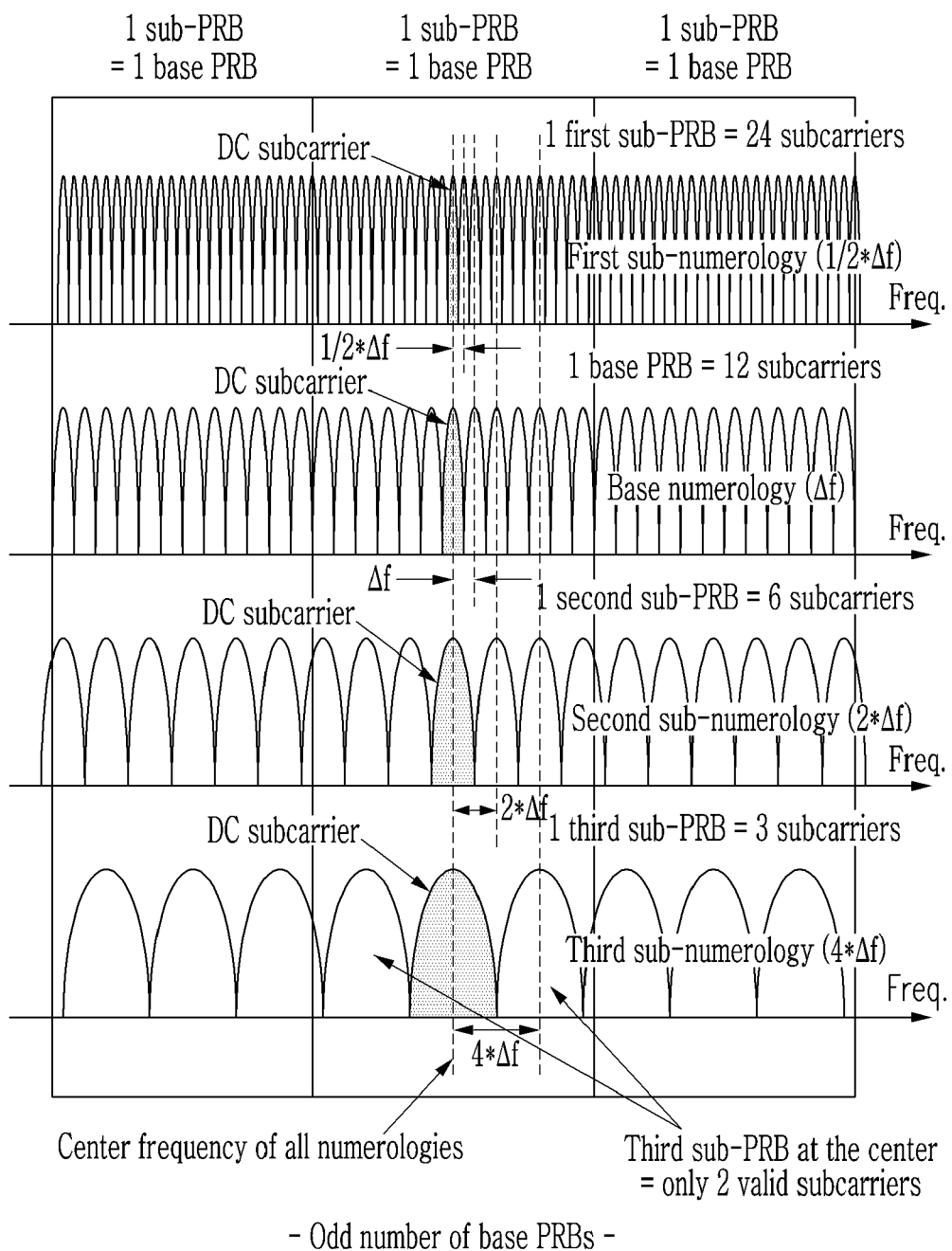

Hereinafter, the PRB of the sub numerology is referred to as 'sub PRB'. The sub PRB may have the same bandwidth as the base PRB. This is referred to as 'method A130'. FIGS. 9a and 9b illustrate the method A130.

FIGS. 9a and 9b are diagrams illustrating a PRB definition based on a method A130 according to an exemplary embodiment of the present invention.

In detail, FIGS. 9a and 9b illustrate the case where the base PRB consists of 12 subcarriers. FIG. 9a illustrates the case where there are even number of PRBs within one carrier and FIG. 9b illustrates the case where there are odd number of PRBs within one carrier. FIGS. 9a and 9b illustrate one base numerology and 3 sub numerologies (first sub numerology, second sub numerology, third sub numerology). FIGS. 9a and 9b illustrate the case in which by the method A122, the DC subcarrier exists both in the base numerology and the sub numerologies.

If it is assumed that the subcarrier spacing of the base numerology is $\Delta f$, each of the subcarrier spacing of the first sub numerology, the subcarrier spacing of the second sub numerology, and the subcarrier spacing of the third sub numerology is $0.5*\Delta f$, $2*\Delta f$, and $4*\Delta f$. Here, $\Delta f$ may be 15 kHz.

By the method A130, the sub PRBs have the same bandwidth as the base PRB. Accordingly, each of the PRBs (i.e., first sub PRB, second sub PRB, and third sub PRB) of the first sub numerology, the second sub numerology, and the third sub numerology has 24, 6 and 3 subcarriers. In addition, in FIGS. 9a and 9b, a method in which the boundaries between the PRBs are aligned with each other with respect to numerologies is used.

As illustrated in FIG. 9b, when the base PRB is an odd number (i.e., when there is one center PRB), the center PRB of the third sub numerology does not have 3 available subcarriers but has only two available subcarriers.

Meanwhile, if it is assumed that a fourth sub numerology having subcarrier spacing of $8*\Delta f$ is added and the fourth sub numerology may be used for the same carrier, the PRB (i.e., fourth sub PRB) of the fourth sub numerology arithmetically has 1.5 subcarriers by the method A130. As a result, it may be difficult that the all the sub PRBs are configured to have an integer number of subcarriers.

To solve the above problem, when the base PRB for the NR carrier consists of 12 subcarriers, a method for limiting a maximum value of subcarrier spacing for sub numerology to $4*\Delta f$ may be used. In other words, if it is assumed that the base PRB consists of M (however, M is a natural number) subcarriers and each of the subcarrier spacing of the base numerology and the subcarrier spacing of the sub numerology is $\Delta f$ and $N*\Delta f$ (however, N is a natural number), a method for limiting a use of numerology and making N into a divisor of M may be used. The method does not exclude the use of the sub numerology having the subcarrier spacing (e.g., $1/N*\Delta f$) smaller than the subcarrier spacing of the base numerology.

Figure 10:
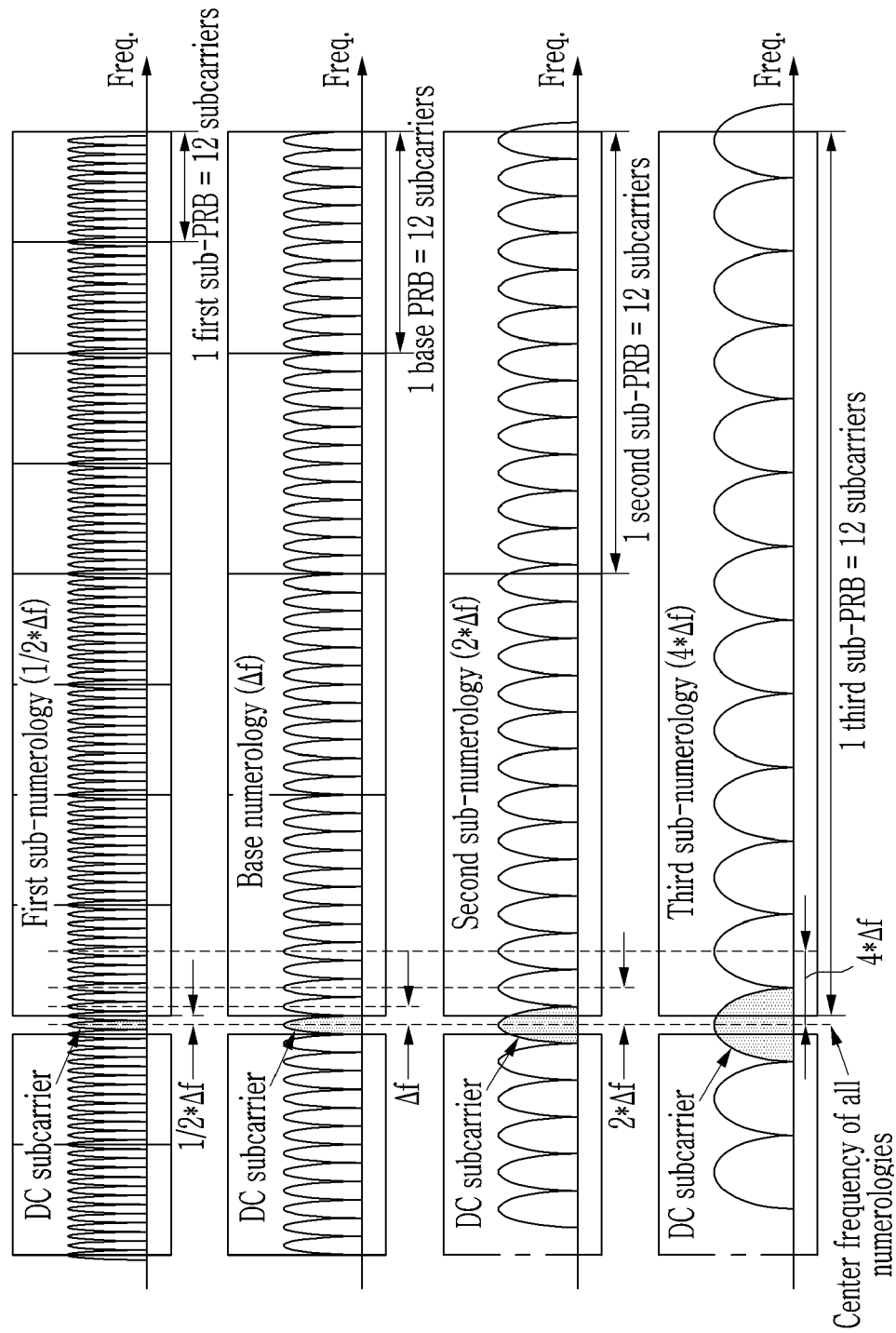
FIG. 10 is a diagram illustrating a PRB definition based on a method A132 according to an exemplary embodiment of the present invention.

On the other hand, the PRB of the sub numerology may have a bandwidth different from the base PRB. This is referred to as 'method A131'. In detail, the PRB bandwidth may be defined to be proportional to the subcarrier spacing of the corresponding numerology. In other words, 'the number of subcarriers per PRB' for all numerologies may be equally defined. This is referred to as 'method A132'. FIG. 10 illustrates the method A132.

FIG. 10 is a diagram illustrating a PRB definition based on a method A132 according to an exemplary embodiment of the present invention.

In detail, in FIG. 10, the same set of numerologies as the set of numerologies illustrated in FIGS. 9a and 9b is considered. FIG. 10 illustrates one base numerology and three sub numerologies (first sub numerology, second sub numerology, third sub numerology). FIG. 10 illustrates the case in which by the method A122, the DC subcarrier exists both in the base numerology and the sub numerologies.

As illustrated in FIG. 10, the base PRB and the PRBs (i.e., each of the first sub PRB, second sub PRB, and third sub PRB) of the first sub numerology to the third sub numerology each consists of 12 subcarriers. Further, the bandwidth of the first sub PRB to the third sub PRB is 0.5 times, two times, and four times as large as the bandwidth of the base PRB, respectively. In FIG. 10, a method allowing a boundary between sub PRBs to be aligned to a boundary between base PRBs is also used. In this case, the PRB bandwidth of numerologies have a difference in $2^N$ times (however, N is an integer) from each other, and therefore, as illustrated in FIG. 10, a nested structure may be satisfied. That is, one PRB having the subcarrier spacing of $2*\Delta f$ may occupy the frequency range of the two consecutive PRBs having the subcarrier spacing of $\Delta f$, and one PRB having the subcarrier spacing of $4*\Delta f$ may occupy the frequency range of the two consecutive PRBs having the subcarrier spacing of $2*\Delta f$. Further, one PRB having the subcarrier spacing of $\Delta f$ may occupy the frequency range of the two consecutive PRBs having the subcarrier spacing of $\frac{1}{2}*\Delta f$. For example, the number (e.g., 12) of subcarriers belonging to the PRB to which the base numerology among the plurality of numerologies is applied may be equal to the number of subcarriers belonging to the PRB to which the first sub numerology is applied, and the boundary having the PRB to which the base numerology is applied may be aligned to the boundary having the PRB to which the first sub numerology is applied. In detail, at least one (for example, subcarrier No. 0) of the subcarriers belonging to the PRB to which the base numerology is applied may be aligned to at least one (for example, subcarrier No. 0) of the subcarriers belonging to the PRB to which the first sub numerology is applied. In FIG. 12, a peak of the subcarrier means the location of the subcarrier, the alignment of the subcarriers belonging to the heterogeneous numerologies means the alignment of the peaks belonging to the heterogeneous numerologies. The physical channel (or physical signal) using the so defined PRB may be generated and transmitted by the base station.

However, the bandwidth of the first sub PRB is smaller than the bandwidth of the base PRB, and therefore all the boundaries between the sub PRBs may not be aligned to the boundary between the base PRBs. A method for aligning PRB boundaries across the numerologies as far as possible reduces the number of cases for the numerology configuration and the guard band configuration, thereby simplifying the signaling.

In FIG. 10, the case where the explicit DC subcarrier is defined in each numerology is assumed. However, as described above, a method for aligning boundaries between PRBs of heterogeneous numerologies may be used irrespective of the presence or absence of the DC subcarrier.

The above-mentioned methods A130 to A132 are methods that the PRB bandwidths for each numerology have a fixed value. Meanwhile, the method in which the base station sets the PRB bandwidth for the terminal may be used. As the most flexible method for this, there is a method in which the base station sets the PRB bandwidths of all numerologies. However, the method generally increases the signaling overhead to the terminal. In addition, when the bandwidth information of the base PRB is transmitted through the PBCH, there is a problem in that the PBCH resource region needs to be wide. As another method, there is a method in which a bandwidth of a base PRB has a fixed value and a base station may set a bandwidth of a sub PRB. In this case, the bandwidth of the sub PRB and the bandwidth of the base PRB may have the relationship of the integer multiple to each other. As described above, when the PRB bandwidth is variable, a method for configuring a resource supporting the same may be complicated.

Meanwhile, in the case of the LTE system, the number of PRBs may be an even number or an odd number according to the system bandwidth of the carrier. When the number of PRBs is an odd number, one center PRB exists. Similarly, even the NR system may support both of even PRBs and odd PRBs. However, if it is assumed that the number of PRBs is an odd number and one center PRB exists, when one FRB is scheduled to be located at the center of the bandwidth as illustrated in FIG. 2d, the center FRB may have odd PRBs. Therefore, it is impossible that the FRB bandwidth consists of even PRBs while being the same for all FRBs. That is, it is impossible that the principle and the method A103 of FIG. 2d are used simultaneously. In addition, when the FRB is configured as illustrated in FIG. 2e, one center PRB may not be included in any one of the FRBs. Further, as illustrated in FIG. 9b, the central PRB may have a different number of subcarriers than the number of subcarriers of other PRBs.

To solve the above-mentioned problem, the number of base PRBs for the NR carrier may always be an even number irrespective of the base numerology and the system bandwidth. That is, the number of base PRBs included in one NR carrier may be an even number. When the number of PRBs is an even number, the center frequency of the NR carrier may be located at a boundary between two PRBs located in the middle. For example, the LTE carrier having the system bandwidth of 5 MHz has 25 PRBs. At this time, if it is assumed that the numerology has the subcarrier spacing of 15 kHz in the same system bandwidth (e.g., 5 MHz) and the 'the number of subcarriers per PRB' is 12, as a method for allowing an NR carrier to have even PRBs, there are a method for defining 24 PRBs obtained by subtracting one PRB from 25 PRBs and a methodf for defining 26 PRBs obtained by adding one PRB to 25 PRBs. In the latter case, if the bandwidths of all the PRBs have the same size as before, the size of the guard band needs to be reduced, which may be possible or impossible according to the characteristics of the NR waveform. As a method for defining even PRBs without reducing the size of the guard band, there is a method for defining a PRB so that the number of subcarriers of some of the PRBs is different from the number of subcarriers of each of other PRBs. For example, one or two PRBs of the PRBs at both ends adjacent to the system guard band may consist of a smaller number of subcarriers or a larger number of subcarriers than the number of subcarriers of each of other PRBs. In the above-mentioned example in which the system bandwidth of 5 MHz and the subcarrier spacing of 15 kHz are used, a total number of subcarriers are equally maintained, and two PRBs at both ends adjacent to the guard band among the 26 PRBs may include six subcarriers. That is, at least one among the even number of base PRBs included in one NR carrier may have a bandwidth smaller than that of each of the remaining PRBs.

Figure 11:
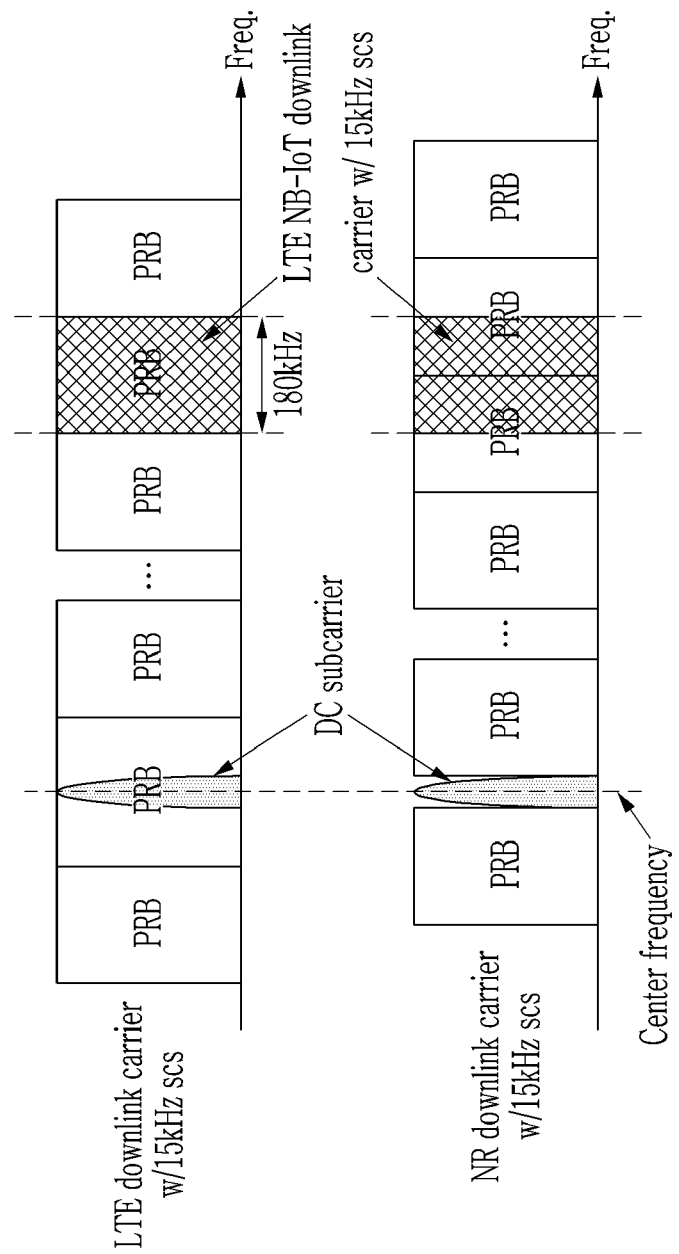
FIG. 11 is a diagram a coexistence with LTE NB-IoT when the number of PRBs of an NR carrier is an even number according to an exemplary embodiment of the present invention.

FIG. 11 is a diagram illustrating a coexistence with LTE NB-IoT when the number of PRBs of an NR carrier is an even number according to an exemplary embodiment of the present invention. In FIG. 11, the subcarrier spacing of the LTE DL carrier is 15 kHz and the subcarrier spacing for the NR DL carrier is 15 kHz.

When the NR carrier coexists with the 'LTE in-band NB-IoT carrier', if the system bandwidth of the NR carrier is one of 3 MHz, 5 MHz, and 15 MHz of the existing LTE, as illustrated in FIG. 11, the LTE NB-IoT DL carrier (e.g., occupying a bandwidth of 180 kHz) may be disposed over two PRBs of the NR DL carrier. Accordingly, when the resource allocation in a unit of a PRB is used, an additional resource loss by one PRB may occur. The problem that the frequency resource region of the LTE NB-IoT carrier is not aligned in one NR PRB may occur in the case where the boundary of the LTE PRB and the boundary of the NR PRB are not aligned with each other. The above problem may be solved by a method for semi-statically configuring a frequency region where an NB-IoT is configured as a blank resource on which a signal is not transmitted and allocating a resource only to the remaining region of the PRB including the blank resource. That is, the data transmission of the PRB including the blank resource may be rate-matched around the blank resource. The configuration information of the blank resource may be broadcast through the SIB or may be transmitted to the terminal by the RRC signaling. Alternatively, the above-mentioned problem may be solved by adjusting the size of the PRB bandwidth if the PRB bandwidth is configurable.

According to the exemplary embodiments described above, it is assumed that the DC subcarrier is not included in any PRB. Meanwhile, a method for configuring a PRB so that a DC subcarrier is included in the PRB may be used. This is referred to as 'method A133'.

The method A133 is a method that includes the DC subcarrier in 'the number of subcarriers per PRB'. Accordingly, when 'the number of subcarriers per PRB' for a specific numerology is regularly composed, a sum of the number of DC subcarriers and the number of subcarriers other than the DC subcarrier is constant for each PRB.

Figure 12A:
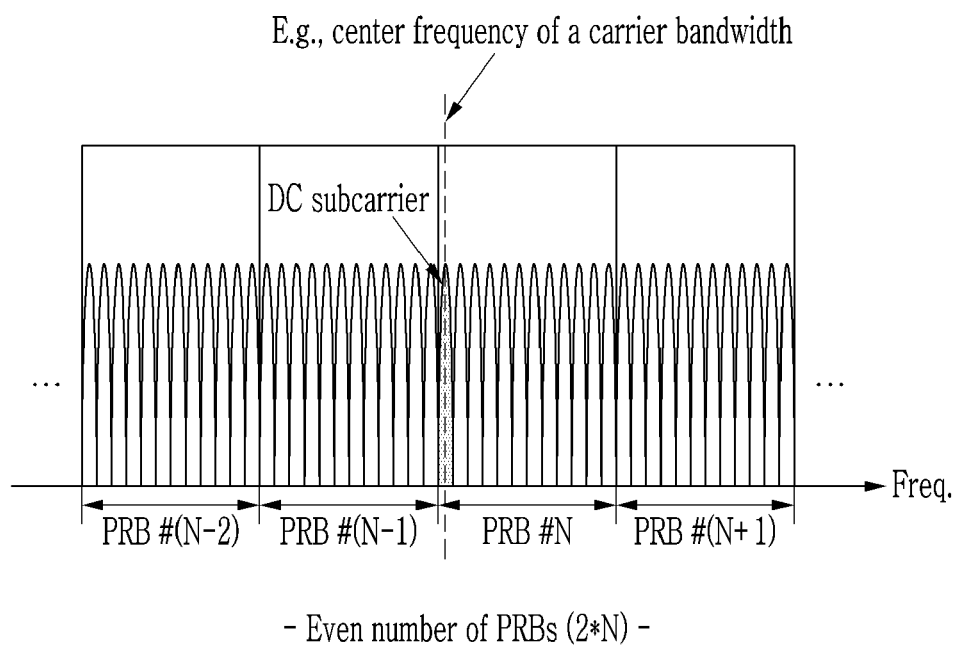
FIG. 12a and FIG. 12b are diagrams illustrating a PRB composition based on a method A133 according to an exemplary embodiment of the present invention.
Figure 12B:
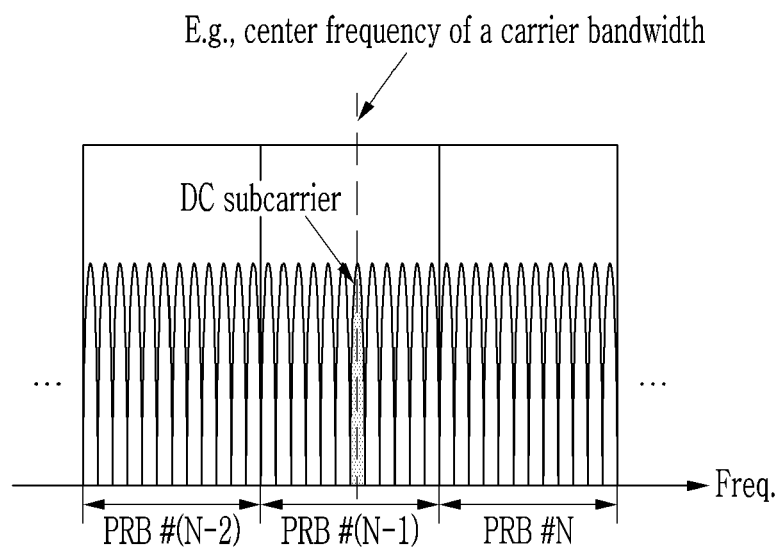

FIGS. 12a and 12b are diagrams illustrating a PRB composition based on a method A133 according to an exemplary embodiment of the present invention.

In detail, FIGS. 12a and 12b illustrate the case where one DC subcarrier exists at the center of the carrier bandwidth and one DC subcarrier is included in a specific PRB.

FIG. 12a illustrates the case where if there are a total of 2*N (however, N is a natural number) PRBs (e.g., PRB No. 0, PRB No. 1, . . . , PRB No. (2*N−1)), the PRB No. N includes one DC subcarrier. FIG. 12b illustrates the case where if there are a total of (2*N+1) (however, N is a natural number) PRBs (e.g., PRB No. 0, PRB No. 1, . . . , PRB No. (2*N)), the PRB No. N−1 includes one DC subcarrier. In FIGS. 12a and 12b, the case where each PRB consists of the same number (e.g., 12) of subcarriers irrespective of whether each PRB includes the DC subcarrier is assumed. When the method A133 is used, the DC subcarrier may be transmitted at the fixed location. For example, as illustrated in FIGS. 12a and 12b, the DC subcarrier may be transmitted at a regular center of the carrier bandwidth.

Meanwhile, when the plurality of numerologies are used within the NR carrier, the method A133 may be applied to each numerology.

Figure 13:
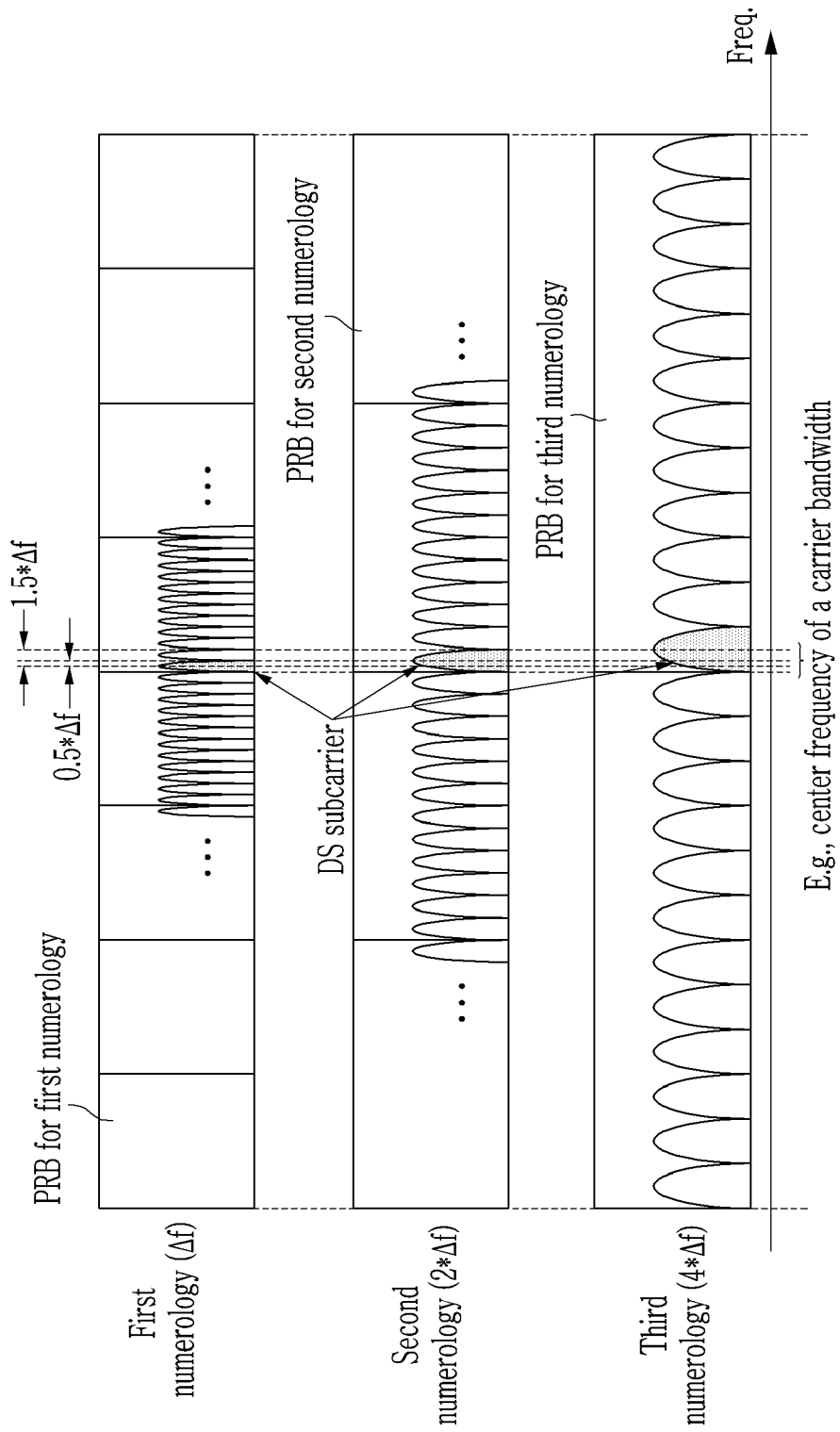
FIG. 13 is a diagram illustrating a method for composing a PRB based on the method 133 for each of a plurality of numerologies according to an exemplary embodiment of the present invention.

FIG. 13 is a diagram illustrating a method for composing a PRB based on the method 133 for each of a plurality of numerologies according to an exemplary embodiment of the present invention. FIG. 13 illustrates three numerologies (e.g., first numerology, second numerology, and third numerology). In FIG. 13, the case where the first numerology has the subcarrier spacing of Δf, the second numerology has the subcarrier spacing of 2*Δf, and the third numerology has the subcarrier spacing of 4*Δf is assumed.

In detail, FIG. 13 illustrates the case where the method A132 for PRB bandwidth scaling between the numerologies is used and the PRB boundary is aligned between the numerologies.

As illustrated in FIG. 13, when the locations of the DC subcarriers for each numerology are fixed at the regular center of the carrier bandwidth, the DC subcarriers for each numerology may be included in one of two center PRBs. In this case, unlike the exemplary embodiments of FIGS. 8a to 10, the frequency locations of the DC subcarriers for the numerologies are not the same and a slight offset (e.g., 0.5*Δf-1.5*Δf) may exist therebetween. Further, the subcarrier grid points of the numerologies may not be aligned with each other between the numerologies. That is, as illustrated in FIG. 13, the subcarrier grid point (i.e., frequency values of subcarriers) of the numerology (e.g., second numerology) having the large subcarrier spacing is not aligned on the subcarrier grid point of the numerology (e.g., first numerology) having the small subcarrier spacing, and there is an offset corresponding to a half of the subcarrier grid point spacing for the latter (e.g. first numerology). This is a feature that is distinguished from the exemplary embodiments of FIGS. 8a to 10 described above.

When the method A133 is used, a plurality of DC subcarriers may be defined for one NR carrier and one numerology. This may be useful when the system intends to simultaneously support the terminals having various bandwidth capabilities through one NR carrier.

Figure 14:
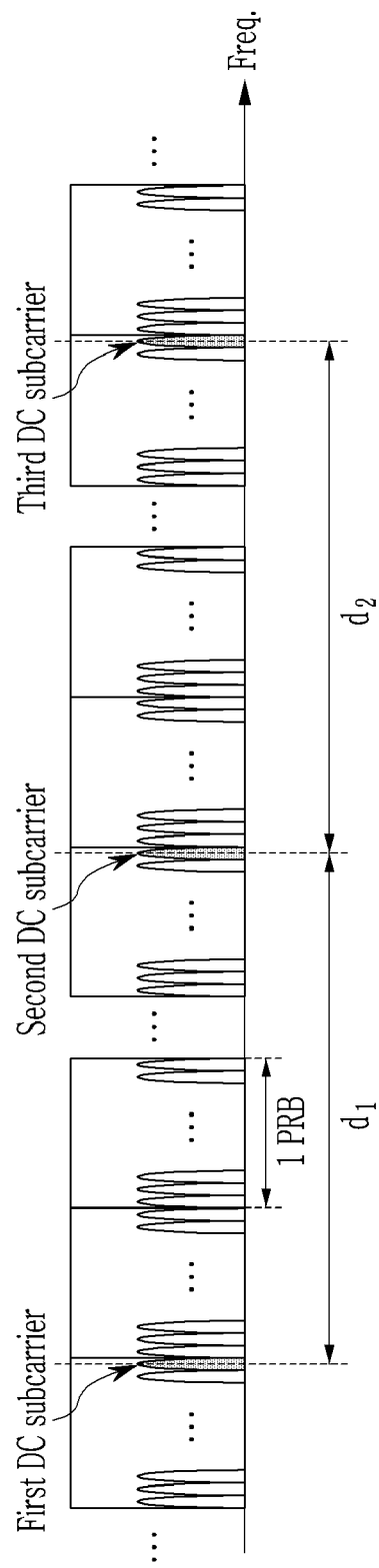
FIG. 14 is a diagram illustrating a method for transmitting a plurality of DC subcarriers based on the method A133 according to an exemplary embodiment of the present invention.

FIG. 14 is a diagram illustrating a method for transmitting a plurality of DC subcarriers based on the method A133 according to an exemplary embodiment of the present invention.

In detail, FIG. 14 illustrates the case where the method A133 for one NR carrier and one numerology is applied to a plurality of DC subcarriers and the plurality of DC subcarriers are included in the PRBs.

In FIG. 14, 3 DC subcarriers (for example, first DC subcarrier, second DC subcarrier, and third DC subcarrier) are assumed. A frequency distance between the first DC subcarrier and the second DC subcarrier is defined as $d_1$, and a frequency distance between the second DC subcarrier and the third DC subcarrier is defined as $d_2$. The frequency locations of the DC subcarriers and the relative frequency distances (e.g., $d_1$, $d_2$) therebetween may be defined in the technical specification in advance. In this case, the DC subcarriers may be disposed at regular intervals in the frequency domain. That is, all the frequency distances between two neighboring DC subcarriers may be equal (e.g., $d_1=d_2$). Alternatively, the frequency distances between the two neighboring DC subcarriers may be equal to or larger than the frequency bandwidth size occupied by one synchronization signal sequence. This may be required for each DC subcarrier for the synchronization signal transmission. Simultaneously with or separately from this, the frequency distance between the two neighboring DC subcarriers may be an integer multiple of the PRB bandwidth as illustrated in FIG. 14.

Meanwhile, the frequency locations of the DC subcarriers and the relative frequency distance therebetween are variable, and the base station selects any one or a plurality of subcarriers, and the selected subcarrier(s) may also be used for the DC subcarrier.

Alternatively, a set of the subcarriers that may be used as the DC subcarrier is defined in advance, the base station selects one or a plurality of subcarriers from the subcarriers included in the set, and the selected subcarrier (s) may also be used for the DC subcarrier.

Alternatively, a location of one of the plurality of DC subcarriers is fixed and the locations of the remaining DC subcarriers may be variable. Here, one DC subcarrier having the fixed location may exist at the center of the carrier bandwidth. Here, the locations of the remaining DC subcarriers having the varying locations may be arbitrarily determined by the base station.

Meanwhile, when the plurality of DC subcarriers exist in one NR carrier, some of the plurality of DC subcarriers are defined at a fixed location not to be included in any PRB and the method A133 may also be applied to the remaining DC subcarriers. For example, when one numerology has a plurality of DC subcarriers, one of the DC subcarriers to which the method A133 is not applied exists at the center of the carrier bandwidth and the remaining DC subcarriers to which the method A133 is applied may be allocated at the frequency location different from the center of the carrier bandwidth.

Meanwhile, when the method A133 is used, even if the locations of the DC subcarriers within the carrier bandwidth are not defined in advance, the terminal may acquire the locations of the DC subcarriers in the process of receiving the downlink synchronization signal. For example, the specific subcarrier (e.g., one subcarrier located at the center of the frequency region) among the subcarriers constituting the frequency region to which the sequence of the downlink synchronization signal is mapped may be defined as the DC subcarrier. Therefore, even if the downlink synchronization signal is transmitted from any frequency region within the carrier bandwidth, the terminal may acquire the location of the DC subcarrier according to the above rule while succeeding to receive the synchronization signal. In this case, if it is assumed that the synchronization signal is transmitted by the base numerology, the terminal may acquire the location of one DC subcarrier among one or a plurality of DC subcarriers for the base numerology. If the terminal needs to find out locations of other DC subcarriers of the same numerology or the DC subcarriers of other numerology(ies), the terminal is configured with the corresponding location information from the base station or the terminal searches for the synchronization signal using the corresponding numerology like the above-mentioned method, thereby acquiring the location of the DC subcarrier. In view of the receiving complexity of the terminal, the former method is more effective.

Meanwhile, when the method A133 is used, if the location of the same DC subcarrier is assumed, the offset (e.g., $\Delta f$) may occur between the boundary of the LTE PRB and the boundary of the NR PRB. Accordingly, the problem that the frequency resource region of the LTE NB-IoT carrier disposed within the NR carrier bandwidth is not aligned in one NR PRB may occur similarly. To solve the problem, the above-mentioned method may be equally used.

Figure 15:
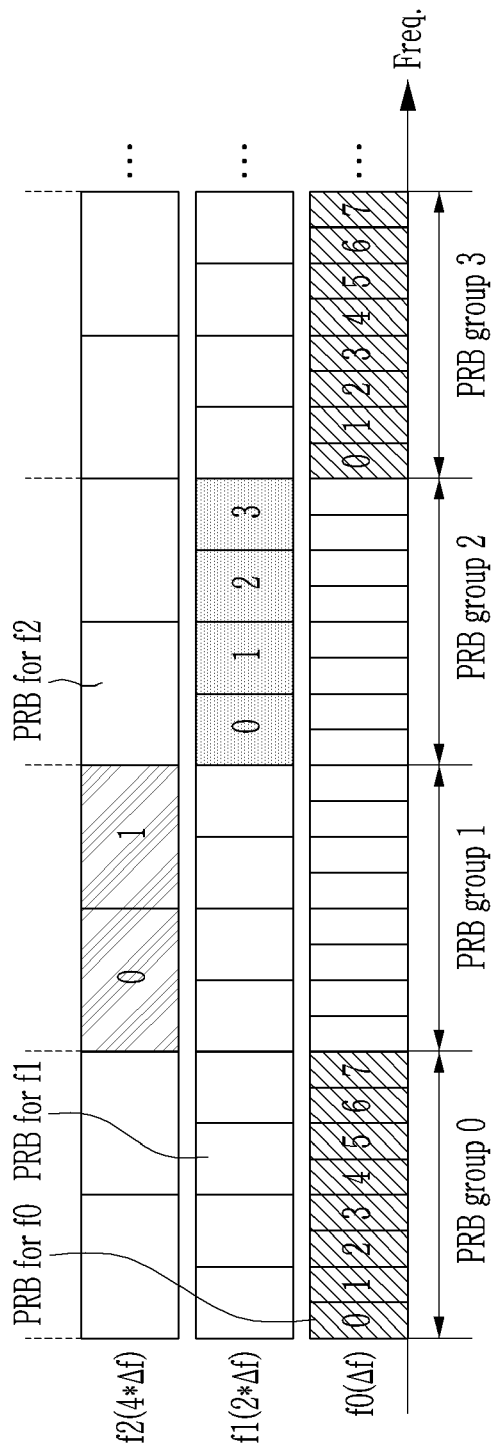
FIG. 15 is a diagram illustrating PRB numbering on each numerology according to an exemplary embodiment of the present invention.

FIG. 15 is a diagram illustrating PRB numbering on each numerology according to an exemplary embodiment of the present invention.

In detail, FIG. 15 illustrates the case where the PRB bandwidth of the multiple numerology is defined by the method A132 and the nested structure (e.g., nested structure illustrated in FIG. 10) is applied among the PRB grids of the multiple numerology.

The subcarrier spacing of f1 is two times as large as that of f0, and the subcarrier spacing of f2 is four times as large as that of f0. Accordingly, the PRB bandwidth for numerology f1 is two times as large as the PRB bandwidth for numerology f0, and the PRB bandwidth for numerology f2 is four times as large as the PRB bandwidth for numerology f0. One of 3 numerologies (for example, f0, f1, and f2) may be defined as the base numerology.

By the method A102, one FRB consists of integer consecutive PRBs in the frequency domain. In FIG. 15, it is assumed that one PRB group consists of one FRB, and one FRB includes 8 PRBs for the numerology f0. This is equivalent to the case where one PRB group includes 4 PRBs for the numerology f1 and the case where one PRB group includes two PRBs for the numerology f2. That is, the number of PRBs included in the PRB group may be determined according to the numerology applied to the PRB group.

In FIG. 15, it is assumed that PRB group No. 0 to PRB group No. 3 correspond to FRB No. 0 to FRB No. 3, respectively. The PRB group number is only a cell-specific number for distinguishing the PRB groups and PRB group number(s) different therefrom may be allocated to the terminal. In addition, generally one PRB group may be configured as one or a plurality of FRBs.

The terminal may use only one numerology to transmit or receive a signal within one PRB group. For example, the terminal may use only the numerology f0 within the PRB group No. 0 and the PRB group No. 3, use only the numerology f2 within the PRB group No. 1, and use only the numerology f1 within the PRB group No. 2. In the case of the downlink PRB group, a signal that the terminal receives using the single numerology may at least include the PDCCH and the PDSCH and may further include reference signals (e.g., DMRS, CSI-RS). In the case of the uplink PRB group, a signal that the terminal transmits using the single numerology may at least include the PUCCH and the PUSCH and may further include reference signals (e.g., DMRS, sounding reference signal (SRS)).

In this case, the PRB number may be defined within each PRB group. This is referred to as 'method A134'. As illustrated in FIG. 15, since 8 PRBs for the numerology f0 exist within the PRB group No. 0, the 8 PRBs (consecutive PRBs in the frequency domain) may be numbered as PRB No. 0 to PRB No. 7. In addition, since 8 PRBs for the numerology f0 exist within the PRB group No. 3, the 8 PRBs may be numbered by PRB No. 0 to PRB No. 7. For example, when the base station uses the plurality of PRB groups (e.g., PRB group No. 0 and PRB group No. 3 to which the same numerology f0 is applied) configured for the terminal through the same downlink control information (DCI) to allocate a resource to the terminal, an index allocated to the first PRB (or last PRB) included in the PRB group No. 0 to which the numerology f0 is applied may be the same as an index allocated to the first PRB (or last PRB) among 8 PRBs included in the PRB group No. 3 to which the numerology f0 is applied. In addition, since 2 PRBs for the numerology f2 exist within the PRB group No. 1, the 2 PRBs may be numbered as PRB No. 0 and PRB No. 1. In addition, since 4 PRBs for the numerology f1 exist within the PRB group No. 2, the 4 PRBs may be numbered as PRB No. 0 to PRB No. 3.

Alternatively, the PRB number may be defined within all or some of the PRB groups corresponding to each numerology. This is referred to as 'method A135'. According to the method A134, the PRB group No. 3 illustrated in FIG. 15 has PRB No. 0 to PRB No. 7. On the other hand, according to the method A135, the PRB group No. 3 may have PRB No. 8 to PRB No. 15 subsequent to the PRB number of the PRB group No. 0. For example, when the base station uses the plurality of PRB groups (e.g., PRB group No. 0 and PRB No. 3 to which the same numerology f0 is applied) configured for the terminal through the same DCI to allocate a resource to the terminal, indices allocated to 8 PRBs included in the PRB group No. 3 may be based on the index allocated to the last PRB among the 8 PRBs included in the PRB group No. 0.

By the PRB number representing the PRB within the PRB group or a PRB bundle number representing a bundle of PRBs within the PRB group (and/or PRB group number representing the PRB group), the base station may allocate a data transmission resource (e.g., PDSCH resource, PUSCH resource) to a terminal in unit of a PRB (or unit of a PRB bundle). This is referred to as 'method A136'. In the case of the method A136, the use of the PRB number representing the PRB within the PRB group for the data resource allocation may mean that the scheduling information included in the DCI explicitly includes the PRB number(s) or the scheduling information included in the DCI is generated based on the PRB number(s). In the latter case, the terminal may acquire the scheduled PRB number(s) within the PRB group based on the scheduling information of the DCI. In the method A136, the use of the PRB group number representing the PRB group may have the same meaning described above.

For example, the first terminal may be configured to use the numerology f0 within the PRB group No. 0 and the PRB group No. 3. For the terminal, the base station may schedule PRB No. 0 to PRB No. 3 within the PRB group No. 0 as the data transmission region. In detail, the base station may configure at least one PRB group (e.g., PRB group No. 0) for the terminal, configure at least one numerology (e.g., numerology f0) for the at least one PRB group (e.g., PRB group No. 0) among a plurality of numerologies for the terminal, and schedule at least one PRB (e.g., PRB No. 0, 1, 2, and 3) among a plurality of PRBs included in the at least one PRB group (e.g., PRB group No. 0) for the terminal. When the base station configures a plurality of PRB groups for the same terminal, different numerologies may also be applied to the plurality of PRB groups configured for the terminal. In this case, the base station may transmit the PRB number(s) or the PRB bundle number(s) (and/or PRB group number(s)) as the scheduling information of the PDSCH (or PUSCH) to the terminal through the physical layer signaling (e.g., downlink control information (DCI)). In this case, as described above, the transmission of the PRB number(s) may mean that the scheduling information included in the physical layer signaling (e.g., DCI) explicitly includes the PRB number(s). For example, the resource allocation information of the DCI in the frequency domain may include a bitmap in unit of a PRB. Alternatively, the transmission of the PRB number may mean that the scheduling information included in the physical layer signaling (e.g., DCI) is generated based on the PRB number(s). For example, the resource allocation information of the DCI in the frequency domain includes the bitmap in unit of a PRB bundle, and a PRB bundle may consist of a plurality of consecutive PRBs. For example, when one PRB bundle is configured as two PRBs, the PRB No. 0 and the PRB No. 1 within the PRB group No. 0 are defined as the PRB bundle No. 0 and the PRB No. 2 and the PRB No. 3 within the PRB group No. 0 may be defined as the PRB bundle No. 1. In this case, the base station may inform that the PRB bundle No. 0 and the PRB bundle No. 1 within the PRB group No. 0 are scheduled to the terminal through the DCI and the terminal may know that the PRB No. 0 to the PRB No. 3 within the PRB group No. 0 are scheduled through the received DCI. Meanwhile, the PRB group number may also be configured for the terminal through the higher layer signaling (e.g., RRC signaling or MAC control element (CE)). The PRB group number may mean the PRB group index, the PRB number may mean the PRB index, and the PRB bundle number may mean the PRB bundle index. Here, the PRB group number transmitted to the terminal by the base station does not necessarily have to be 0, but may be a number allocated terminal-specifically (e.g., UE-specifically).

As another example, the second terminal may be configured to use the numerology f1 within the PRB group No. 2. For the terminal, the base station may schedule PRB No. 2 to PRB No. 3 within the PRB group No. 2 as the data transmission region. In this case, the base station may transmit the PRB number(s) or the PRB bundle number(s) (and/or PRB group number(s)) to the terminal through the physical layer signaling. Here, the PRB group number transmitted to the terminal by the base station does not necessarily have to be 2, but may be a number allocated terminal-specifically (e.g., UE-specifically). The terminal may receive the information from the base station, and transmit or receive data through the numerology configured for the corresponding PRB group. As described above, when the frequency region in which a specific numerology is used is limitedly configured and the resource within the configured frequency region is allocated to the terminal, the number of PRBs used for the scheduling is decreased compared to the case when the numerology can be used within the entire system bandwidth. From that, the signaling overhead for allowing the base station to inform the resource allocation information in unit of a PRB (or unit of a PRB bundle) to the terminal may be reduced. In particular, unlike the LTE system, the NR system needs to support a very wide system bandwidth (for example, up to 400 MHz), and therefore when an amount of traffic to be transmitted is not large, limiting the frequency region used for the scheduling may be of great help.

Figure 16:
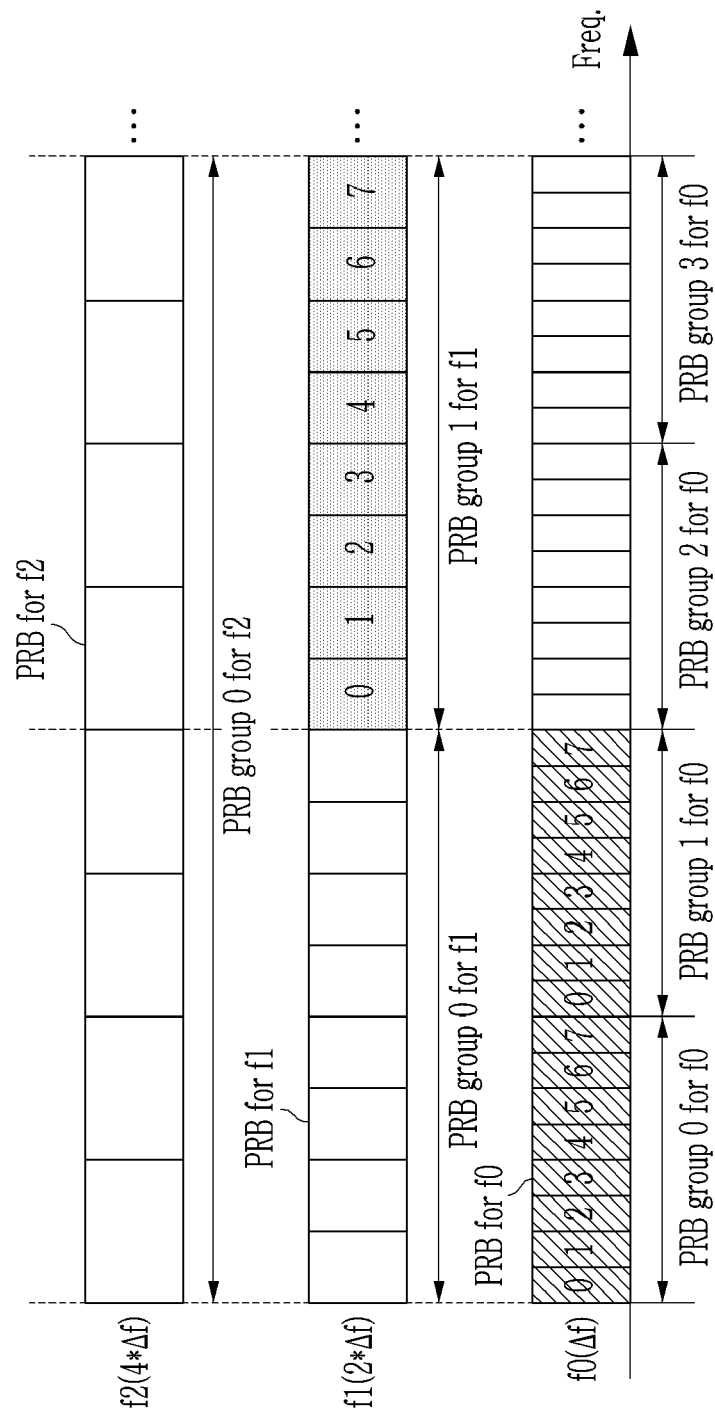
FIG. 16 is a diagram illustrating PRB numbering on each numerology according to another exemplary embodiment of the present invention.

FIG. 16 is a diagram illustrating PRB numbering on each numerology according to another exemplary embodiment of the present invention.

The exemplary embodiment illustrated in FIG. 16 is similar to the exemplary embodiment illustrated in FIG. 15. However, FIG. 16 illustrates the case where the bandwidths of the PRB group are differently defined for each numerology.

That is, one PRB group may be defined by K (however, K is a natural number) consecutive PRBs in the frequency domain irrespective of the numerology. For example, in FIG. 16, one PRB group includes 8 consecutive PRBs. For example, the number of PRBs included in the PRB group No. 0 to which the numerology f0 is applied is equal to the number of PRBs included in the PRB group No. 1 to which the numerology f1 is applied.

Accordingly, the bandwidth of the PRB group for the numerology f1 is two times as large as the bandwidth of the PRB group for the numerology f0, and the bandwidth of the PRB group for the numerology f2 is four times as large as the bandwidth of the PRB group for the numerology f0. FIG. 16 illustrates the PRB groups (e.g., PRB group No. 0 to PRB group No. 3) for the numerology f0, the PRB groups (e.g., PRB group No. 0 and PRB group No. 1) for the numerology f1, and the PRB group (e.g., PRB group No. 0) for the numerology f2. In this case, FIG. 16 illustrates that the method A134 may also be identically applied.

For example, 8 PRBs exist in PRB group No. 0 and PRB group No. 1 for the numerology f0, respectively, and therefore the 8 PRBs may be numbered as PRB No. 0 to PRB No. 7. Further, the 8 PRBs exist in the PRB group 1 for the numerology f1 and therefore the 8 PRBs may be numbered as PRB No. 0 to PRB No. 7. The base station may allocate the data transmission resource to the terminal in unit of a PRB (or unit of a PRB bundle), and according to the method A136, may signal the PRB number(s) within the PRB group or the PRB bundle(s) number within the PRB group (and/or PRB group number(s)) to the terminal.

Meanwhile, to appreciate the frequency diversity gain in the transmission of the data channel, frequency hopping may be applied to an NR PDSCH or a physical uplink shared channel (PUSCH). Here, the frequency hopping means that the data channel allocated to the terminal is temporally transmitted through different requency resource regions. The frequency hopping of the NR PDSCH or the NR PUSCH may be performed by a predetermined pattern in unit of a PRB (or unit of a PRB bundle).

In addition, as described above, when the multiple numerology is used within one carrier and regions in which each numerology is used are separated for each numerology, the frequency hopping may be limited to be performed only within the resource region where the same numerology is configured. For example, when the numerology is configured as illustrated in FIG. 15, the frequency hopping may be applied between the frequency resource of the PRB group No. 0 and the frequency resource of the PRB group No. 3. That is, some or all of the PRBs belonging to the data channel configured in one terminal may exist in the PRB group No. 0 at time t1 and the PRB group No. 3 at time t2. However, according to the above-mentioned rule, the frequency hopping may not be applied between the frequency resource of the PRB group No. 0 and the frequency resource of the PRB group No. 1 and the frequency hopping may not be applied between the frequency resource of the PRB group No. 0 and the frequency resource of the PRB group No. 2.

As described above, the PRB group may be distinguished from the FRB. For example, the FRB is defined by the above-mentioned method A100 to method A103, and one PRB group may correspond to one or a plurality of FRBs. According to the above-mentioned definition, it can be assumed that the PRB group is a set of the consecutive PRBs in the frequency domain for the allocated numerology. In this case, according to the method A101 to method A103, one PRB group may consist of one FRB or consecutive FRBs in the frequency domain. Meanwhile, when the method A100 is used, one PRB group may also consist of one FRB or consective FRBs in the frequency domain.

However, when the method A100 is used, unlike the method A101 to method A103, the boundary of the FRB in the frequency domain is not aligned with a PRB boundary, but may be located on a specific PRB. That is, an FRB may include an integer number of PRBs and may additionally include one or two partial or fractional PRBs. Accordingly, when the method A100 is used, the PRB group may be defined as full PRBs existing within one or a plurality of consecutive FRBs. That is, the PRB group may consist of one or a plurality of FRBs. In this case, the terminal may consider only the full PRBs within the corresponding region as the PRB group.

Figure 17A:
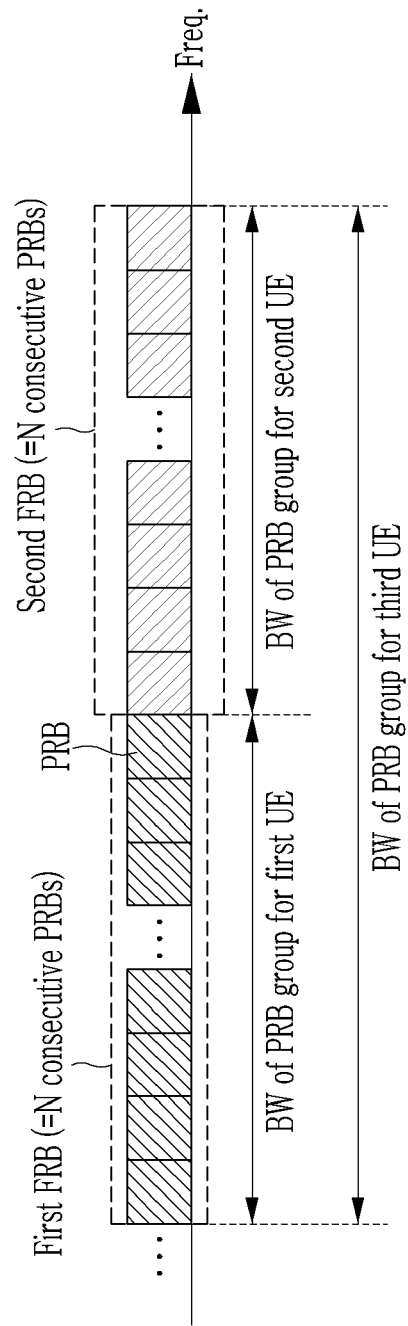
FIG. 17a and FIG. 17b are diagrams illustrating a method for composing a PRB group for a terminal according to an exemplary embodiment of the present invention.
Figure 17B:
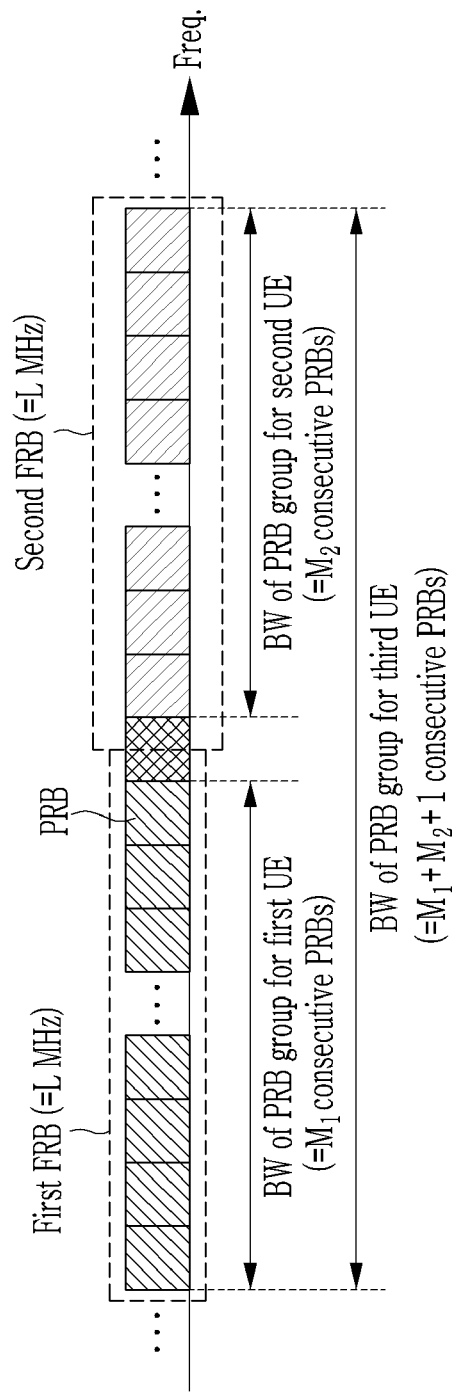

FIGS. 17a and 17b are diagrams illustrating a method for composing a PRB group to a terminal according to an exemplary embodiment of the present invention. In detail, FIGS. 17a and 17b illustrate some of the frequency region within the system bandwidth.

FIG. 17a illustrates the case where the FRB is defined by the method A101. One FRB consists of N (however, N is a natural number) consecutive PRBs. In this case, according to the above-mentioned method, the terminal may be configured with one or a plurality of FRBs as the PRB group. That is, as illustrated in FIG. 17a, the base station may configure a first FRB as the PRB group for a first terminal (e.g., first UE), configure a second FRB as the PRB group for a second terminal (e.g., second UE), and configure the first FRB and the second FRB as the PRB group for a third terminal (e.g., third UE). Accordingly, the first terminal (e.g., first UE) may consider N PRBs constituting the first FRB as the PRB group, the second terminal (e.g., second UE) may consider N PRBs constituting the second FRB as the PRB group, and the third terminal (e.g., third UE) may consider 2*N PRBs constituting the first FRB and the second FRB as the PRB group.

FIG. 17b illustrates the case where the FRB is defined by the method A100. One FRB is composed of consecutive RBs whose length is L [MHz] in the frequency domain(however, L is a divisor of a size of the system bandwidth). In FIG. 17b, it is assumed that the first FRB includes $M_1$ full PRBs and the second FRB includes $M_2$ full PRBs. In this case, according to the above-mentioned method, the terminal may be configured with one or a plurality of FRBs as the PRB group. That is, as illustrated in FIG. 17b, the base station may configure a first FRB as the PRB group for a first terminal (e.g., first UE), configure a second FRB as the PRB group for a second terminal (e.g., second UE), and configure the first FRB and the second FRB as the PRB group for a third terminal (e.g., third UE). Accordingly, the first terminal (e.g., first UE) may consider the $M_1$ full PRB included in the first FRB as the PRB group, the second terminal (e.g., second UE) may consider the $M_2$ full PRBs included in the second FRB as the PRB group, and the third terminal (e.g., third UE) may consider $M_1+M_2+1$ full PRBs included in the first FRB and the second FRB as the PRB group.

Meanwhile, a plurality of PRB groups may be configured for the terminal. The plurality of PRB groups may be considered for various use examples. In this case, the frequency regions for the plurality of PRB groups configured for the terminal may need to overlap with each other.

Meanwhile, data transmitted to the terminal through the PDSCH may be classified into common data and terminal-specific (e.g., UE-specific) data. The common data are data that a plurality of terminals may commonly receive, and may be, for example, system information, a paging message, and the like. The PDSCH for transmitting the common data may be generally scheduled by the common control information (e.g., DCI). That is, the plurality of terminals may receive the same DCI, and may decode the common data by the reception of the same PDSCH corresponding thereto.

According to the above-mentioned method, the base station may configure the PRB group for the terminal and allocate the PDSCH or PUSCH resource using the PRB index (or PRB number) defined within the PRB group. When a plurality of terminals are configured withdifferent PRB groups, the terminals may be operated in different frequency regions or may assume different PRB indices for the same PRB. Accordingly, when the data to be transmitted through the PDSCH or the PUSCH are the common data, there may be the problem in that the plurality of terminals may differently interpret the resource allocation information of the DCI for the common PDSCH. Accordingly, it may be difficult for the base station to transmit the common data to the plurality of terminals having different PRB group configurations through the common PDSCH.

To solve the above problem, the PRB group for the common data transmission may be separately configured for the terminal. That is, the base station may configure each of the PRB group (hereinafter, 'common PRB group') for the common data transmission and the PRB group (hereinafter, 'terminal-specfic PRB group') for the terminal-specific (e.g., UE-specific) data transmission for the terminal. In this case, the common data may be basically transmitted in the common PRB group. However, a method for permitting terminal-specific data to be transmitted in a common PRB group may be used. Up to one common PRB group may be configured for the terminal.

Alternatively, the common PRB group may not be defined separately, some of the PRBs within a specific PRB group configured for the terminal may be configured as a sub group, and the PRB index may be separately defined only for the PRBs configured as the sub group. For example, when the terminal is configured with a PRB group consisting of 32 consecutive PRBs, some (e.g., 16 PRBs) of 32 PRBs may be configured as a sub group and the PRBs configuring the sub group may have indices from 0 to 15. When the common frequency region exists among the PRB groups of the terminals, the sub group may be identically configured for the plurality of terminals within the common frequency region. The base station may use the PRB indices from 0 to 15 to allocate the resource of the PDSCH including the common data to the terminal.

Meanwhile, the region in which each numerology is used may be defined to be used on the entire system bandwidth without being divided into the unit of FRB or PRB group. Even in this case, the 'location and boundary between the PRBs' for each numerology may have the fixed nested structure as described above. In this case, however, as illustrated in FIG. 18, the PRB numbers (e.g., PRB No. 0, PRB No. 1, and PRB No. 2, . . . ) for each numerology (for example, f0, f1, and f2) may need to be defined within the entire system bandwidth or the entire operating bandwidth of the terminal.

Figure 18:
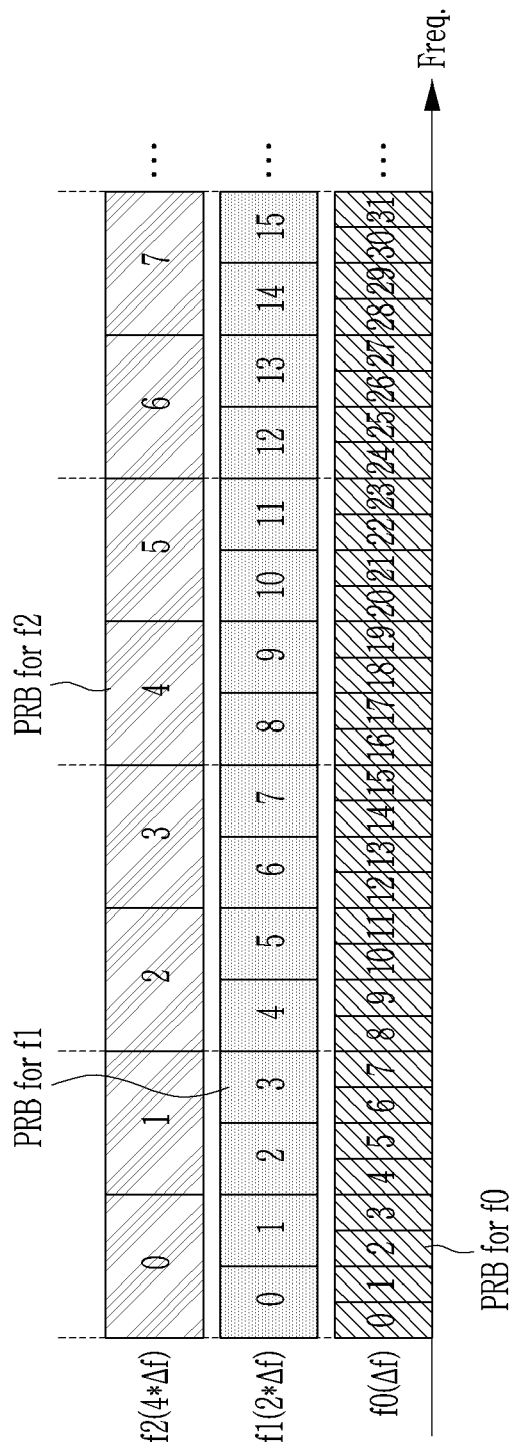
FIG. 18 is a diagram illustrating full-band PRB numbering according to an exemplary embodiment of the present invention.

FIG. 18 is a diagram illustrating full-band PRB numbering according to an exemplary embodiment of the present invention. In FIG. 18, the subcarrier spacing of the numerology f1 is two times as large as that of the numerology f0, and the subcarrier spacing of the numerology f2 is four times as large as that of the numerology f0. The PRB bandwidth for the numerology f1 is two times as large as the PRB bandwidth for the numerology f0, and the PRB bandwidth for the numerology f2 is four times as large as the PRB bandwidth for the numerology f0.

The base station may use the full-band PRB numbers to schedule data for the terminal through the desired frequency region and the desired numerology. In this case, the frequency region of the control channel may be configured based on a smaller unit than the case in which the concept of the FRB or PRB group is used. For example, the frequency region of the NR PDCCH in which the first numerology is used may be configured using the PRB of the first numerology as the minimum unit. Referring to FIG. 18 as an example, the NR PDCCH may use the numerology f0 and occupy the frequency region of PRB No. 8 to PRB No. 23 for the numerology f0. When the NR carrier supporting the multiple numerologies is used, the uplink control channel and the downlink control channel may also be transmitted by the multiple numerologies.

Meanwhile, in the LTE system, a concept of a virtual resource block (VRB) is used. The VRB means a logical RB when the base station performs the resource allocation, which is mapped to the physically consecutive PRBs according to a predetermined mapping rule. In the present specification, the term PRB is used as the meaning of the RB without distinguishing the concept of the PRB and the VRB. If the PRB and the VRB are distinguished from each other in the NR system, the PRB described in the present specification may mean the PRB of the LTE or the VRB of the LTE according to the content described in the present specification. In detail, in the content described in the present specification, if the PRB is used as a unit when the resource allocation of the base station is performed, the PRB may be interpreted as the VRB. For example, the PRB illustrated in FIGS. 15 and 16 may be interpreted as the VRB, and the VRB may be mapped to the PRB having the actual physical meaning according to the predefined mapping rule.

Meanwhile, the NR system needs to support the terminals having various transmission bandwidth capabilities within one carrier. That is, the terminal that may use the entire system bandwidth of the NR carrier and the terminal that may use only a portion of the system bandwidth of the NR carrier may coexist. The terminal needs to report its own transmission bandwidth capability to the base station. The base station receives a report of the transmission bandwidth capability in the process of establishing the RRC connection with the terminal and may set the operating frequency bandwidth of the terminal within the NR carrier based thereon. In this case, to facilitate the configuration, the base station may inform the terminal of the system bandwidth and the center frequency of the NR carrier. A time point when the base station transmits information about the system bandwidth and the center frequency to the terminal may be no later than a time point when the base station configures the operating frequency bandwidth for the terminal.

For example, the terminal may acquire the center frequency location and the system bandwidth information by receiving the downlink synchronization signal and/or the broadcasting information during the initial access. In this case, the terminal may acquire the base numerology information together, and therefore acquire the PRB grid (e.g., a total number of PRBs, the number of subcarriers per PRB, the location of the PRB boundary, and the like) of the base numerology. In addition, if the configuration information of the FRB or the configuration information of the PRB group is defined, the terminal may find out the configuration information of the FRB or the configuration information of the PRB group based on the configuration information of the PRB grid. Accordingly, the base station may configure a desired frequency region as the operating frequency bandwidth of the terminal within the system bandwidth, and the terminal may find out which location the frequency region configured for the terminal belongs from the system perspective. The terminal may perform a transmission of control information, a transmission of data, a transmission of a pilot, the time-frequency synchronization and beam management, RRM measurement and RRM report, CSI measurement, CSI report, and the like, within the configured operating frequency band. If link performance is poor within the operating frequency band (e.g., when radio link failure (RLF) occurs), the terminal may perform a fallback operation. In detail, the terminal may transmit or receive signals (for example, initial access signal and initial access channel) from a region outside the operating frequency region and again perform synchronization and beam acquisition or again transmit PRACH. In this case, the base station may reconfigure the operating frequency band for the terminal.

[Guard Band]

When the heterogeneous numerologies are multiplexed by the FDM within one NR carrier, to relieve the interference between the heterogeneous numerologies, the guard band may be inserted. Basically, no signal is transmitted in the guard band, but if necessary, a narrowband signal of the NR system or a separate system from the NR system may also be transmitted in the guard band. For example, the LTE NB-IoT carrier may be transmitted in the guard band.

As described above, when the numerology is configured in the frequency domain using one or a plurality of FRBs as the basic unit, the FRB may be a reference for the setting of the guard band. For example, the guard band may be inserted into both ends of the frequency region occupied by each FRB. Hereinafter, a method for setting a guard band between numerologies using an FRB as a base unit within an NR carrier will be described.

First of all, a set of the FRBs in which the guard band can be set may be defined. Method A140 and method A141 are methods that divide the FRB into an anchor FRB and a non-anchor FRB.

In detail, the method A140 is a method that the guard band can be set for all the FRBs including the anchor FRB and the method A140 provide the most flexible resource configuration method. However, the method A140 has a disadvantage in that whenever the setting of the guard band for the anchor FRB is changed, the terminal that is already using the anchor FRB for the transmission needs to be reconfigured with a valid frequency resource region for the anchor FRB.

The method A141 is a method that the guard band can be set only for the remaining FRBs other than the anchor FRB among the FRBs, and has an advantage in which the valid resource regions of the anchor FRB are not changed.

The method A140 and the method A141 may be applied to both of the first type NR carrier and the second type NR carrier. In the case of the second type NR carrier, as described above, several anchor FRBs may exist. In this case, the guard band may not be defined for all the anchor FRBs.

The method A142 and the method A143 are methods that distinguish the FRB using the configured numerology type.

In detail, the method A142 is a method that the guard band can be set only for the FRB configured as the sub numerology. Similar to the method A141, the method A142 has a disadvantage in which the available resource regions of the FRB configured as the base numerology is not changed. In particular, this helps the terminal using the base numerology as the primary numerology to monitor the PDCCH used by the base numerology. However, in the case of the second type NR carrier, the terminal using the sub numerology as the primary numerology may exist and therefore the method A142 may be applied to the first type NR carrier.

The method A143 is a method that the guard band can be set only for the FRB configured as the base numerology. The method A143 may efficiently allocate the PRB of the sub numerology.

Meanwhile, when a plurality of numerologies are multiplexed by the TDM within one FRB, the guard band may be differently defined or set for each numerology.

Meanwhile, when the guard band is set between two FRBs in which two different numerologies are used, the guard band may generally be set only for any one of the two FRBs. For example, the guard band may be set only for the FRB in which the numerology having the smaller subcarrier spacing is used. This is referred to as 'method A144'. As another example, the guard band may be set only for the FRB in which the numerology having the larger subcarrier spacing is used. This is referred to as 'method A145'.

The method A144 and the method A145 may be used by being combined with the method A140 to the method A143. For example, if it is assumed that the method A144 and the method A141 are combined with each other, the method A144 may be applied to the remaining FRBs other than the anchor FRB among the FRBs. As another example, if it is assumed that the method A144 and the method A142 are combined with each other, the method A144 is applied to the setting of the guard band between the FRBs configured as the sub numerology and if one of the two neighboring heterogeneous numerologies is the base numerology, according to the method A142, the guard band may be set for the FRB configured as the sub numerology.

Figure 19A:
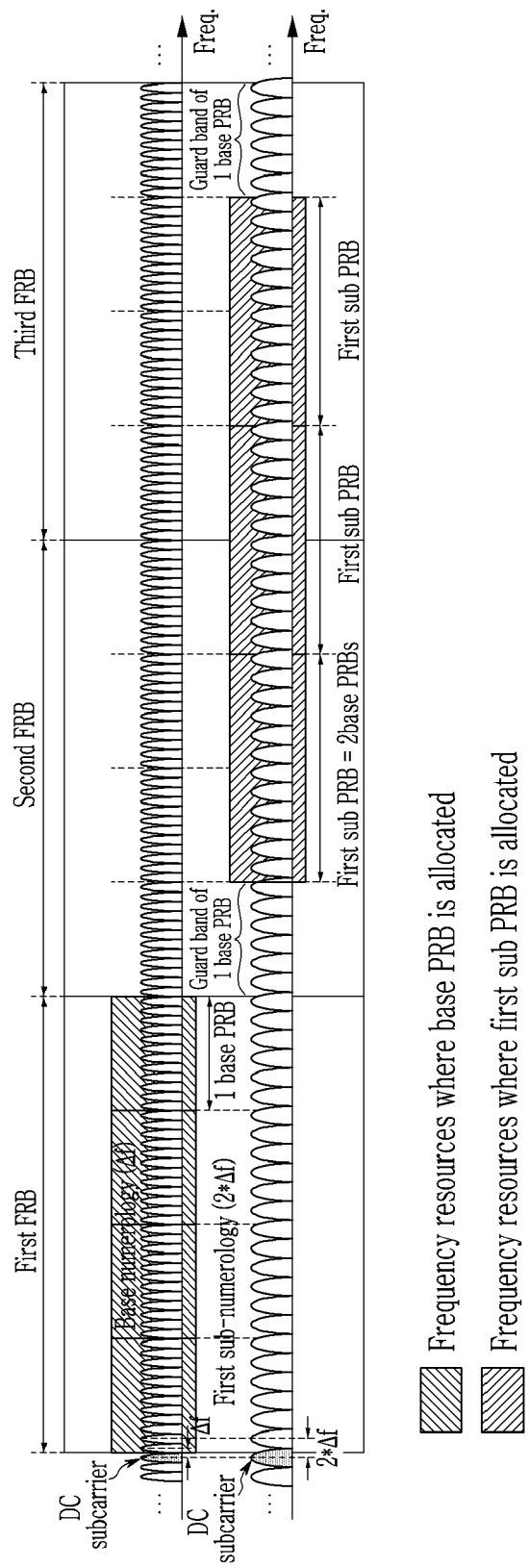
FIG. 19a, FIG. 19b, and FIG. 19c are diagrams illustrating a method for configuring a numerology and a guard band based on a method A140 or a method A142 according to an exemplary embodiment of the present invention.
Figure 19B:
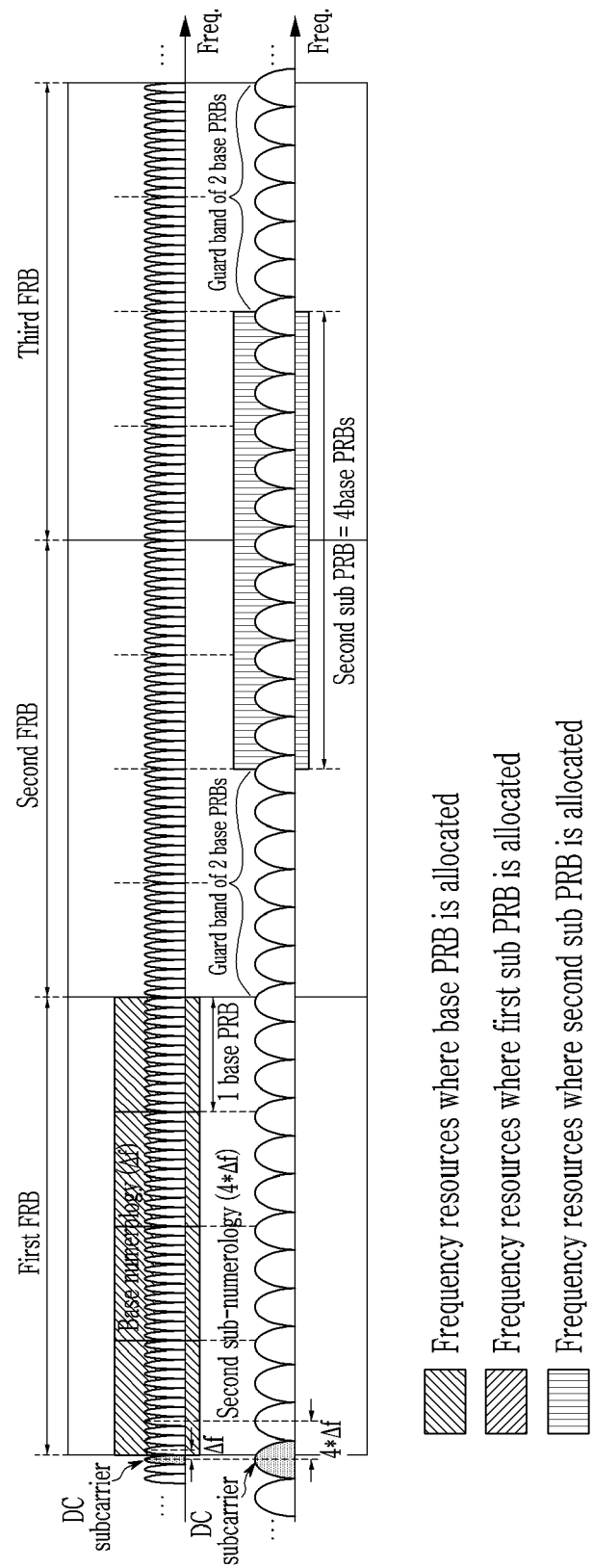
Figure 19C:
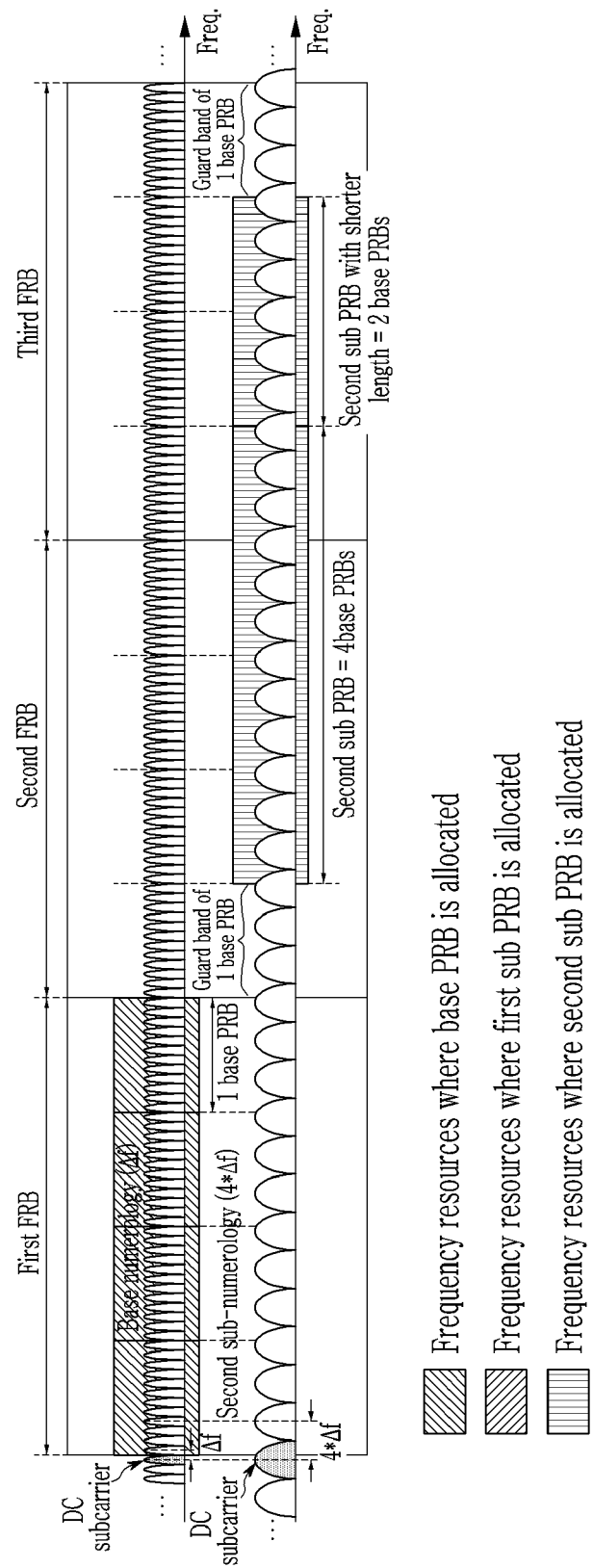

FIGS. 19a to 19c illustrate the method A142.

FIGS. 19a to 19c are diagrams illustrating a method for configuring numerology and a guard band based on a method A140 or a method A142 according to an exemplary embodiment of the present invention.

In detail, FIGS. 19a to 19c illustrate that two heterogeneous numerologies are multiplexed by the FDM within the NR carrier and the guard band is set between the numerologies.

In FIGS. 19a to 19c, it is assumed that the subcarrier grids for each numerology are defined by the method A110, the center frequency location of the numerology is the same for all the numerologies, and the location of the DC subcarrier of the numerology is the same for all the numerologies.

In FIGS. 19a to 19c, it is assumed that one FRB consists of 4 base PRBs by the method A103 and the PRB of the numerology consists of 12 subcarriers for all numerologies by the method A132. The composition of the FRB illustrated in FIGS. 19a to 19c may be suitable for the first type NR carrier as described above.

In FIGS. 19a to 19c, it is assumed that the base numerology is applied to the first FRB and the sub numerology is applied to the second FRB and the third FRB.

As the method A142 is used, the first FRB to which the base numerology is applied does not have the guard band. Accordingly, all of the 4 base PRBs belonging to the first FRB may be used for transmission.

On the other hand, the guard band is inserted into the second FRB and the third FRB. Since the same numerology is applied to the second FRB and the third FRB, the guard band may not be set in a direction of the boundary between the second FRB and the third FRB and the guard band may be inserted in opposite directions of the second FRB and the third FRB, respectively. In FIGS. 19a to 19c, if the first FRB is considered as the anchor FRB, it may be interpreted that the method A140 is used.

In FIG. 19a, the subcarrier spacing of the first sub numerology is two times as large as the subcarrier spacing (e.g., $\Delta f$) of the base numerology, and the first sub PRB that is the PRB of the first sub numerology consists of two base PRBs. Accordingly, as illustrated in FIG. 19a, among 8 base PRBs belonging to the second FRB and the third FRB, the first base PRB may be configured as the guard band, the second base PRB to the seventh base PRB may be configured as 3 first sub PRBs, and the last base PRB may be configured as the guard band.

In FIGS. 19b and 19c, the subcarrier spacing of the second sub numerology is four times as large as the subcarrier spacing (e.g., $\Delta f$) of the base numerology, and the second sub PRB that is the PRB of the second sub numerology consists of four base PRBs. Accordingly, as illustrated in FIG. 19b, among 8 base PRBs belonging to the second FRB and the third FRB, two first base PRBs may be configured as the guard band, the third base PRB to the sixth base PRB may be configured as 1 second sub PRBs, and the last two base PRB may be configured as the guard band.

Alternatively, as illustrated in FIG. 19c, among 8 base PRBs belonging to the second FRB and the third FRB, the first base PRB may be configured as the guard band, the second base PRB to the seventh base PRB may be configured as two second sub PRBs, and the last base PRB may be configured as the guard band. Here, the number of base PRBs allocated as the second sub PRB is 6 but is not a multiple of 4. Accordingly, a $1^{st}$ second sub PRB among two second sub PRBs consists of four base PRBs, but a $2^{nd}$ second sub PRB (i.e., last second sub PRB) consists of two (=mod 6 and 4) base PRBs.

The exemplary embodiments of FIGS. 19a and 19b are generalized as follows. That is, if the subcarrier spacing of the base numerology is $\Delta f$, the size of the guard band for the FRB to which the sub numerology having the subcarrier spacing of $N*\Delta f$ (however, N is a natural number) is applied may be defined as a bandwidth for $\log_2 N$ base PRBs. This is referred to as 'method A150'. In detail, the method A150 may be generalized as follows. That is, the size of the guard band for the corresponding FRB may be defined as $\log_2 N$ PRBs based on the PRB corresponding to the numerology configured in the FRB. However, the problem of the method is that when the difference between the subcarrier spacings is large, the guard band is set to be excessively wide.

Alternatively, the exemplary embodiments of FIGS. 19a and 19c are generalized as follows. That is, the size of the guard band for the FRB to which the sub numerology is applied may be defined to have a fixed value at all times. This is referred to as "method A151'. The exemplary embodiments of FIGS. 19a and 19c correspond to the case where the size of the guard band is defined as 1 base PRB.

When the method A151 is used, as illustrated in FIG. 19c, the bandwidth of the specific sub PRB (for example, last sub PRB) may be smaller than that of other sub PRBs, respectively. Alternatively, the size of the guard band for the corresponding FRB may be defined as N PRBs based on the PRB corresponding to the numerology configured in the FRB. This is referred to as 'method A152'. For example, N may be fixed to be 1.

Meanwhile, the guard band for the FRB to which the numerology having the subcarrier spacing smaller than that of the base numerology is applied may be one base PRB or one PRB for the corresponding sub numerology. The former is referred to as 'method A153' and the latter is referred to as 'method A154'. For example, it is assumed that one PRB consists of 12 subcarriers, and the FRB (the former FRB) to which the base numerology having a subcarrier spacing of 15 kHz is applied and the FRB (the latter FRB) to which the sub numerology having a subcarrier spacing of 7.5 kHz is applied are adjacent to each other. According to the method A153, the guard band by 180 kHz (=12*15 kHz) may be inserted into the latter FRB or according to the method A154, the guard band by 90 kHz (=12*7.5 kHz) may be inserted into the latter FRB.

Alternatively, the guard band for the FRB to which the numerology having the subcarrier spacing smaller than that of the base numerology is applied may be a plurality of base PRBs or a plurality of PRBs for the corresponding sub numerology.

The method A153 and the method A154 may be used by being combined with the method A150 and the method A151. For example, the base numerology and/or the sub numerology having a subcarrier spacing larger than that of the base numerology may be applied with the method A151, and the sub numerology having a subcarrier spacing having smaller than that of the base numerology may be applied with the method A153 or the method A154.

In the exemplary embodiments of FIGS. 19a to 19c, the case in which the method A103 is applied to the FRB configuration is assumed. Each FRB consists of an integer number of PRBs. Accordingly, in the configuration of the guard band, the method A140 to the method A143 may be used, and the guard band may be configured in unit of an integer multiple of a PRB.

However, when the method A100 is applied to the FRB composition, it may difficult to use the method A140 to the method A143.

Figure 20A:
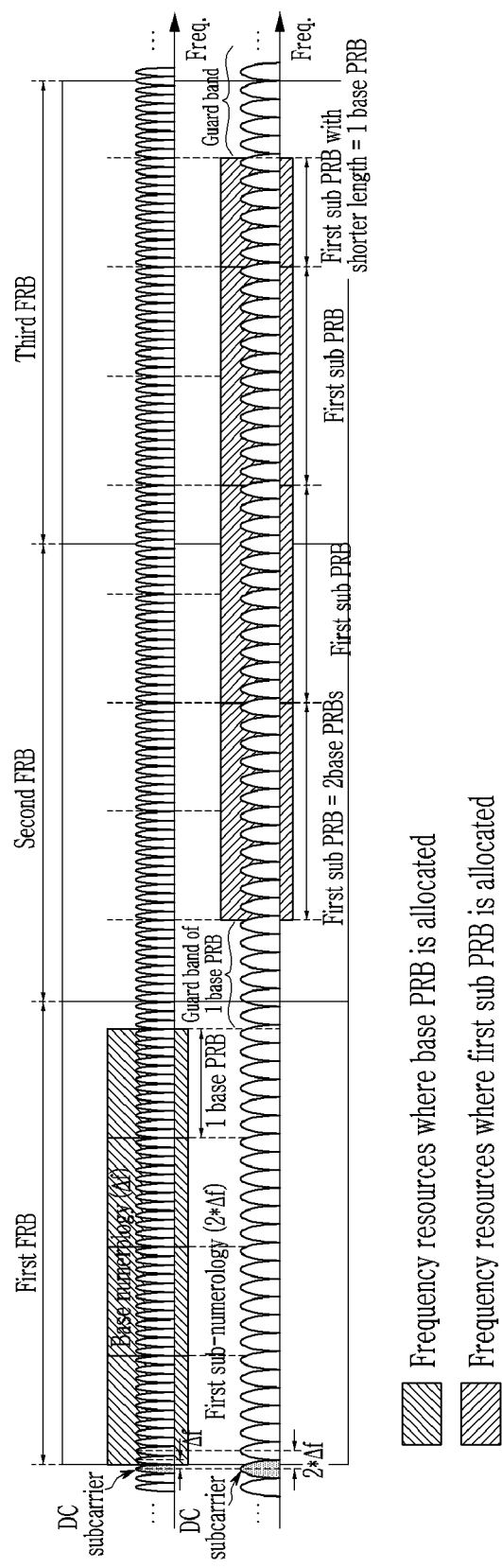
FIG. 20a and FIG. 20b are diagrams illustrating a FRB composition, a numerology configuration, a guard band configuration based on a method A100 according to an exemplary embodiment of the present invention.
Figure 20B:
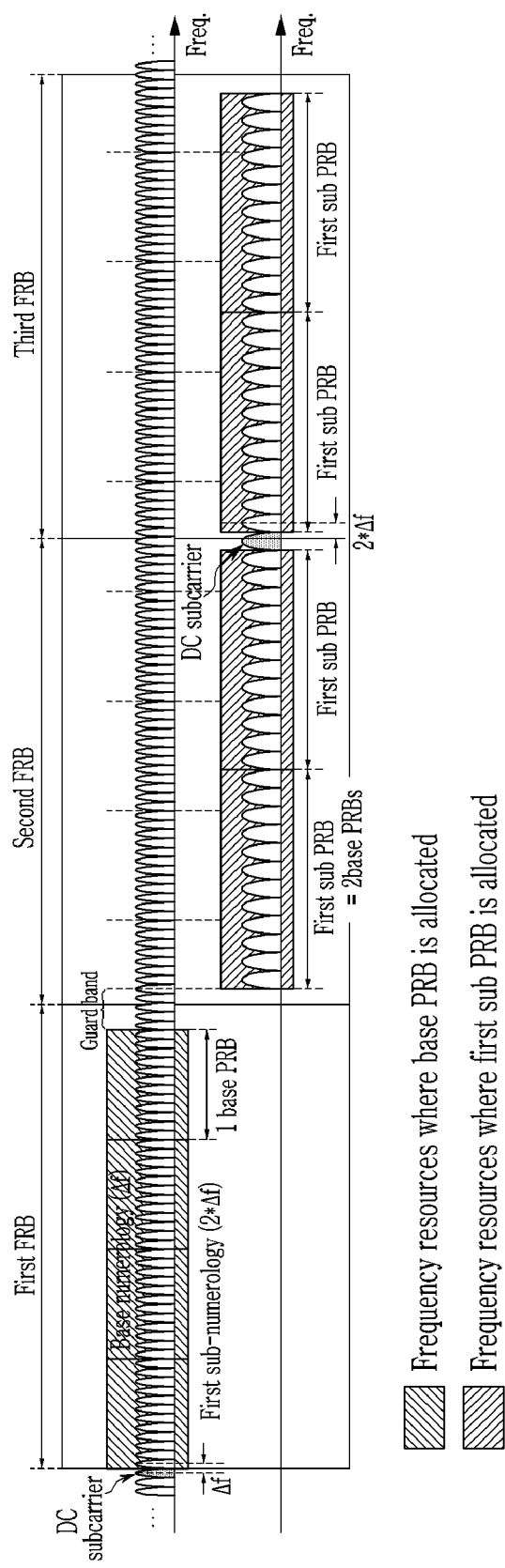

FIGS. 20a and 20b are diagrams illustrating an FRB composition, a numerology configuration, a guard band configuration based on a method A100 according to an exemplary embodiment of the present invention.

In detail, FIGS. 20a and 20b illustrate the case where heterogeneous numerologies coexist within one carrier by the FDM.

In the exemplary embodiments of FIGS. 20a and 20b, the case in which the FRB is defined by the method A100 is assumed. Accordingly, each FRB does not consist of the integer number of PRBs but subcarrier(s) excluded from the PRB may exist in each FRB. For example, 51 subcarriers exist in the first FRB illustrated in FIG. 20a, in which 48 of 51 subcarriers consist of four base PRBs and the remaining 3 subcarriers remain without constituting the PRB. The remaining subcarrier(s) excluded from the PRB composition may be generated at a boundary between the FRBs to which different numerologies are applied. In this case, the remaining subcarrier(s) may be used as the guard band between the heterogeneous numerologies.

In the exemplary embodiments of FIGS. 20a and 20b, the case where the base numerology is configured in the first FRB, the first sub numerology is configured in the second FRB and the third FRB, and the base PRB and the first sub PRB each consist of 12 subcarriers by the method A132 is assumed. The subcarrier spacing of the first sub numerology is two times as large as the subcarrier spacing (e.g., Δf) of the base numerology, and the first sub PRB (PRB of the first sub numerology) consists of two base PRBs.

In the exemplary embodiment of FIG. 20a, the case where the subcarrier grid is defined by the method A110, the center frequency location of the numerology is the same for all the numerologies, and the location of the DC subcarrier of the numerology is the same for all the numerologies is assumed. 7 base PRBs included in the frequency regions of the second FRB and the third FRB are used as 4 first sub PRBs. The remaining subcarriers excluded from the PRB composition are configured as the guard band. In this case, similar to the exemplary embodiment of the present invention, the number of base PRBs within the frequency regions of the second FRB and the third FRB are not divided by 2. Accordingly, 3 first sub PRBs each have 12 subcarriers, and the remaining 1 first sub PRB has 6 subcarriers. If all the sub PRBs are configured to have the same bandwidth, the remaining 1 first sub PRB is not defined and the frequency region for the remaining 1 first sub PRB may be used as the guard band.

In the exemplary embodiment of FIG. 20b, the case where the subcarrier grid is defined by the method A111, the frequency region of the subcarrier grid is different for the base numerology and the sub numerology, and the location of the DC subcarrier is different for the base numerology and the sub numerology is assumed. In this case, the first sub PRB is not defined by the base PRB, and is independently defined on a separate subcarrier grid. FIG. 20b illustrates the case where 4 first sub PRBs are defined within the frequency regions of the second FRB and the third FRB. FIG. 20b illustrates the case where the DC subcarrier of the first sub numerology is located at a center of the frequency regions of the second FRB and the third FRB. However, if the number of carrier raster points is considered to be flexible, it may be difficult for the DC subcarrier to be located at the center of the frequency regions of the second FRB and the third FRB.

The above methods are a method for defining presence or absence of a guard band, a size of the guard band, and/or a location of the guard band in advance. Meanwhile, the guard band may be variably configured by the base station, and the information on the guard band may be signaled to the terminal. In addition, one or plural methods (e.g., method A140 to method A154) for configuring a guard band may be defined in the technical specification, and one or a plurality of the methods (e.g., method A140 to method A154) for configuring a guard band may be signaled to the terminal.

[PDCCH Resource Region]

The PDCCH of the LTE system is transmitted in the full band within an effective section of a system bandwidth. Meanwhile, in the case of the NR system, one carrier needs to support a plurality of numerologies or have forward compatibility, and therefore the PDCCH resource region needs to be limited to a specific region in the frequency domain as well as the time domain in some cases. For this purpose, a PDCCH block may be defined.

The PDCCH block is a time-frequency resource to which one or a plurality of PDCCHs may be transmitted. The PDCCH block may consist of X FRBs and Y OFDM symbols. If one PDCCH block consists of a plurality of FRBs, the FRBs may be continuous or discontinuous in the frequency domain. Alternatively, the PDCCH block may consist of Z PRBs and Y OFDM symbols. If one PDCCH block consists of a plurality of PRBs, the PRBs may be continuous or discontinuous in the frequency domain.

In this case, a PDCCH search space may be defined for each PDCCH block. The PDCCH block may repeatedly appear every predetermined periodicity within the FRB(s) occupied by the PDCCH block. For example, the PDCCH block may exist in every subframe within the corresponding FRB(s). That is, the subframe of the NR system may be defined as periodicity at which the PDCCH resource region appears. In this case, the location of the OFDM symbol where the PDCCH block starts may be the same in every subframe. As a result, the terminal may periodically monitor the PDCCH block, but may transmit or may not transmit a signal in each PDCCH block.

To lower the PDCCH monitoring complexity of the terminal, the base station may configure the time resource region (e.g., other service transmission section), in which the PDCCH is not transmitted, for the terminal, and the terminal may skip the PDCCH monitoring within the configured section. In the case of the LTE system, the PDCCH region (PDCCH region of the full band) existing in each subframe may correspond to 1 PDCCH block. However, the NR carrier may have a plurality of FRBs and therefore a plurality of PDCCH blocks may exist in the frequency domain.

Figure 21:
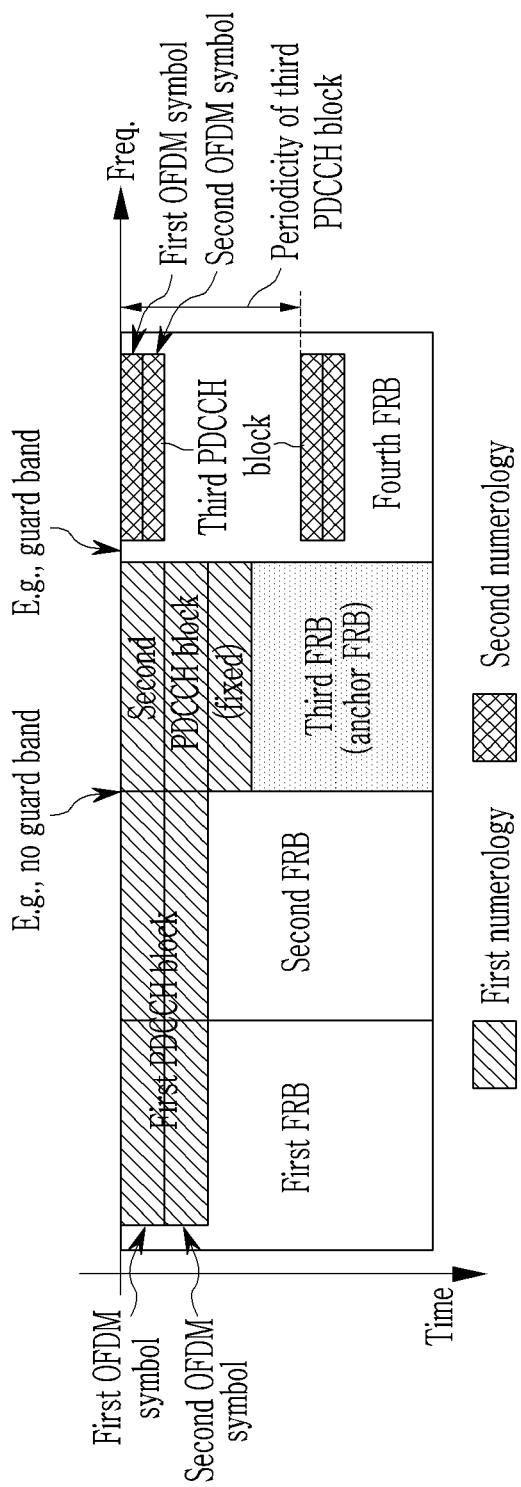
FIG. 21 is a diagram illustrating a PDCCH block disposition according to an exemplary embodiment of the present invention.

FIG. 21 illustrates a method for disposing a PDCCH block in an NR carrier.

FIG. 21 is a diagram illustrating a PDCCH block disposition according to an exemplary embodiment of the present invention.

In detail, FIG. 21 illustrates the case where 3 PDCCH blocks (e.g., first PDCCH block, second PDCCH block, and third PDCCH block) are disposed in 4 FRBs (e.g., first FRB, second FRB, third FRB, and fourth FRB).

The first PDCCH block is configured in the first FRB and the second FRB (i.e., X=2), the second PDCCH block is configured in the third FRB (i.e., X=1), and the third PDCCH block is configured in the fourth FRB (i.e., X=1).

The first PDCCH block consists of 2 consecutive OFDM symbols (i.e., Y=2), the second PDCCH block consists of 3 consecutive OFDM symbols, (i.e., Y=3), and the third PDCCH block consists of 2 consecutive OFDM symbols (i.e., Y=2).

In the exemplary embodiment of FIG. 21, the case where the first numerology is applied to the first PDCCH block and the second PDCCH block and the second numerology is applied to the third PDCCH block is assumed. Each PDCCH block may be repeatedly disposed according to the predetermined periodicity (e.g., subframe) on the time base. If the OFDM symbol length of the second numerology is shorter than that of the first numerology, the disposition periodicity of the third PDDCH block in the time domain may be shorter than that of each of the remaining PDCCH blocks.

The guard band may be inserted into both ends or one end of the frequency region occupied by the PDCCH block. In this case, the method for inserting a guard band may be identically used. In the exemplary embodiment of FIG. 21, the same numerology is applied to the first PDCCH block and the second PDCCH block and therefore the guard band is not configured between the first PDCCH block and the second PDCCH block. In the exemplary embodiment of FIG. 21, the heterogeneous numerology is applied between the second PDCCH block and the third PDCCH block and therefore the guard band is configured between the second PDCCH block and the third PDCCH block. In addition, since the exemplary embodiment of FIG. 21 assumes that the method A141 is used, the second PDCCH block existing in the third FRB that is the anchor FRB completely occupies the bandwidth of the third FRB without the guard band.

Figure 22:
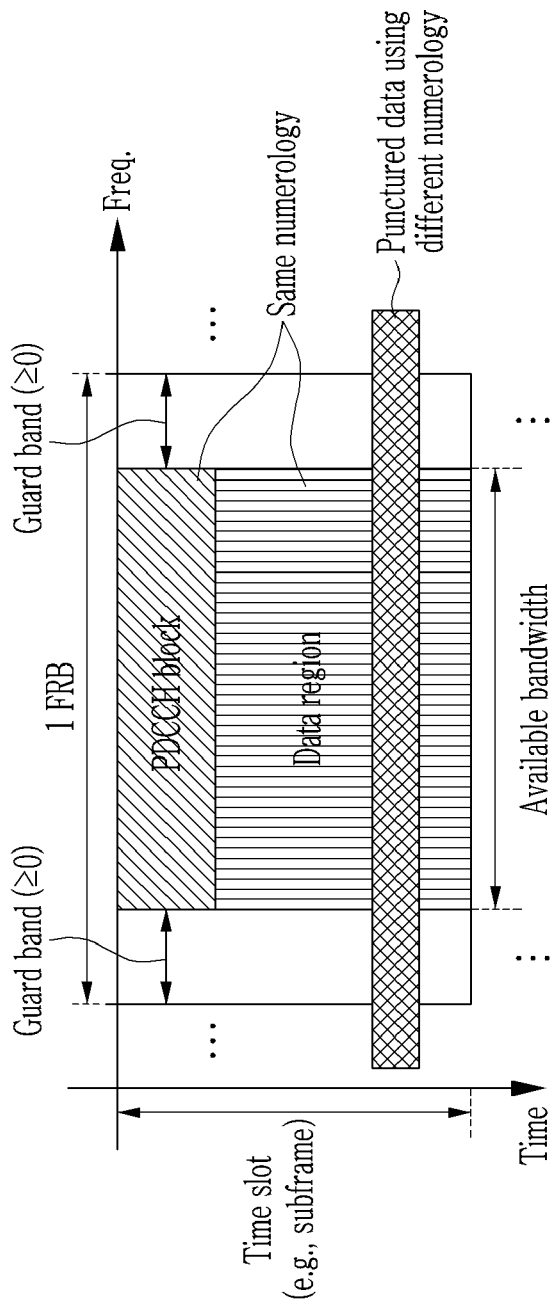
FIG. 22 is a diagram illustrating a relationship between a PDCCH block and a data region according to an exemplary embodiment of the present invention.

FIG. 22 is a diagram illustrating a relationship between a PDCCH block and a data region according to an exemplary embodiment of the present invention. In FIG. 22, a time slot for the PDCCH block and data region may be a subframe.

As illustrated in FIG. 22, the bandwidth (for example, available bandwidth) occupied by the PDCCH block may be the same as the bandwidth occupied by the data region within the corresponding FRB(s). That is, for each FRB, the same guard band may be applied to the PDCCH region and the data region.

FIG. 22 illustrates the case where the PDCCH block is configured within one FRB. The same numerology may be applied to the data region corresponding to the PDCCH block and the PDCCH block within the same FRB. Alternatively, the same numerology may be applied to the data region corresponding to the PDCCH block and the PDCCH block for at least same subframe within the same FRB. However, as illustrated in FIG. 22, the possibility that the signal transmitted through other numerologies may puncture the PDCCH region of the FRB or the data region of the FRB is not excluded. If the bandwidth occupied by the data area in the FRB or the set of FRBs consists of a plurality of PRBs, according to the method, even the PDCCH region may consist of a plurality of PRBs. In the data region, uplink, downlink, and sidelink data may be transmitted.

On the other hand, if different numerologies are applied to the PDCCH region and the data region within the same FRB, different guard bands may be applied to the PDCCH region and the data region. For example, the same numerology as the numerology for the same time region of the adjacent FRB is applied to the PDCCH region in any FRB, and thus the guard band is not placed in the PDCCH region, and a numerology different from the numerology for the same time domain of the adjacent FRBs is applied and thus the guard band may be placed in the data region.

Meanwhile, one PDCCH block may include only the anchor FRB(s) or only the FRB(s) that is not the anchor. This is referred to as 'method A162'. Alternatively, the PDCCH block consisting of at least anchor FRB(s) may be defined within the NR carrier. This is referred to as 'method A163'.

If the terminal knows only the anchor FRB, the methods (e.g., method A162 and method A163) may use the PDCCH block that is localized to and defined in the anchor FRB to receive the downlink control information. If the plurality of anchor FRBs for one numerology are present, one PDCCH block may also be defined to include all the anchor FRBs and the PDCCH block may also be defined for each anchor FRB. The former method may widen the bandwidth of the PDCCH block to increase a frequency diversity gain. If the anchor FRB for each numerology exists, the method A162 and the method A163 may be used for each numerology.

Meanwhile, the PDCCH block within the anchor FRB may be fixedly allocated regardless of whether the base station configures the PDCCH block. Hereinafter, the PDCCH block is referred to as 'fixed PDCCH block' having the above features within the anchor FRB. If the fixed PDCCH block is defined, when the terminal that is not in the RRC connected state initially accesses the NR carrier, the terminal may use the fixed PDCCH block to receive the downlink control information. The terminal may periodically monitor the fixed PDCCH block within the anchor FRB according to the predetermined periodicity (for example, every subframe of the primary numerology).

Meanwhile, if the PDCCH block consists of only the anchor FRB(s), it may be difficult to ensure the sufficient PDCCH search space due to the limitation of the bandwidth. To solve the above problem, a configuration method for allowing a base PDCCH block including an anchor FRB to further include an FRB not an anchor may be used. In this case, the information for the frequency resource region of the base PDCCH block may be signaled from the base station to the terminal that is in the RRC connected state. The terminal that is not in the RRC connected state may receive the first signal set to know the information for the frequency resource region of the base PDCCH block prior to performing the PDCCH monitoring.

Meanwhile, the PDCCH block in the FRB(s) that is not an anchor may be configured for the terminal by the base station. The configuration information of the PDCCH block may be transmitted as the broadcasting information or the RRC parameter. In detail, the configuration information (e.g., resource location and/or numerology) of the PDCCH block may be explicitly or implicitly signaled from the base station to the terminal. As an example of the latter implicit signaling, the terminal may receive the signaling of the numerology configuration information of the FRB(s) that is not an anchor and then derive the PDCCH block configuration information in the corresponding FRB(s) according to the predefined relationship with the signaled numerology configuration. For example, in the exemplary embodiment of FIG. 21, if it is assumed that the PDCCH block in which the first numerology is used exists every predetermined periodicity within the first FRB and the second FRB based on the configuration after the terminal receives the configuration of the first numerology of the first FRB and the second FRB, the terminal may perform the PDCCH monitoring. The location of the PDCCH block configured in the FRB(s) in the time domain that is not the anchor may be defined by the location of the fixed PDCCH block in the time domain described above.

Meanwhile, as described in the exemplary embodiment of FIG. 18, the case where all the numerologies may be used in the full band without distinguishing the FRB (or PRB group) may be considered. In this case, the numerology of the data region may be dynamically configured by the base station and the numerology of the control region may be fixedly configured in the terminal in advance.

Figure 23:
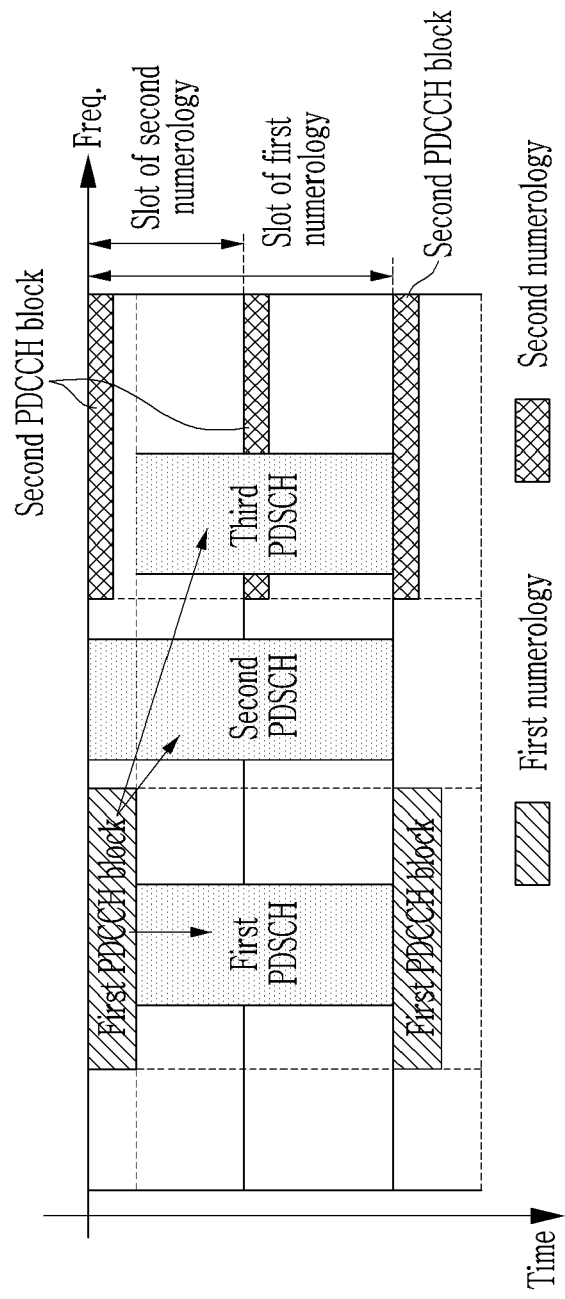
FIG. 23 is a diagram illustrating a PDCCH block disposition according to another exemplary embodiment of the present invention.

FIG. 23 is a diagram illustrating a PDCCH block disposition according to another exemplary embodiment of the present invention.

In detail, FIG. 23 illustrates the case where the first PDCCH block using the first numerology and the second PDCCH block using the second numerology are configured within one NR carrier. Here, the first numerology may be used as the base numerology, and the first PDCCH block may be fixedly transmitted at all times. In FIG. 23, a time slot for the second numerology may be shorter than that of the first numerology.

The terminal may receive a configuration of all or some of the PDCCH blocks. For example, if the terminal monitors the first PDCCH block, the terminal receives the downlink control information transmitted on the first PDCCH block, and thus may receive the scheduling of the PDSCH (e.g., first PDSCH, second PDSCH, and third PDSCH) within the operating bandwidth of the terminal. The first PDSCH is transmitted within the frequency region in which the first PDCCH block is transmitted. The second PDSCH is transmitted within the frequency region in which the PDCCH block is not configured. The third PDSCH is transmitted within the frequency region in which the second PDCCH block is transmitted.

In this case, a starting position of the PDSCH may be different according to the frequency region in which the PDSCH is scheduled. For example, the second PDSCH in the above example may be scheduled from a time earlier than the first PDSCH and the third PDSCH as many as the number of OFDM symbols occupied by the first PDCCH block. As described above, the OFDM symbol location where the data channel transmission starts may be different according to the frequency region in which the data channel is scheduled. Accordingly, if the base station schedules the data channel through the downlink control information (DCI) for the terminal, the base station may transmit the OFDM symbol number which becomes the starting position of the corresponding data channel.

Meanwhile, as described above, the PDCCH search space may be defined for each PDCCH block. In this case, a method (the former method) for defining a PDCCH search space over the whole PDCCH block and a method (the latter method) for defining a PDCCH search space separated for each OFDM symbol configuring a PDCCH block may be used. The former method is referred to as 'method A170' and the latter method is referred to as 'method A171'.

If the PDCCH block consists of a plurality of OFDM symbols, the method A170 has one wide PDCCH search space, and the method A171 has a plurality of narrow PDCCH search spaces.

If the method A170 is used, the terminal needs to previously know the number of OFDM symbols (i.e., value of Y or information corresponding to the value of Y) occupied by the PDCCH block prior to receiving the PDCCH block. The base station may inform the terminal of the value of Y in a method like the LTE system. For example, the base station may inform the terminal of the value of Y using a separate channel (hereinafter, referred to as PCFICH) like a physical control format indicator channel (PCFICH).

On the other hand, even if the method A171 is used, the terminal does not know the value of Y, the PDCCH reception may be at least attempted in the search space for the first OFDM symbol among the OFDM symbols belonging to the PDCCH block. Therefore, in this case, the value of Y may be transmitted to the terminal by more various methods. For example, the PCFICH is defined every OFDM symbol configuring the PDCCH block, and the base station may inform the terminal of whether the PDCCH block includes the next OFDM symbol through each PCFICH. In each OFDM symbol, the PCFICH may be multiplexed with the PDCCH through the FDM. Alternatively, the base station may inform the terminal of whether the PDCCH block includes the next OFDM symbol through the PDCCH of each OFDM symbol configuring the PDCCH block. For this purpose, a dedicated DCI format for transmitting a 1 bit payload indicating whether the PDCCH block includes the next OFDM symbol may be defined.

Alternatively, a cyclic redundancy check or a scrambling identifier (ID) that is applied to the PDCCH may be distinguished according to whether the PDCCH block includes the next OFDM symbol. In this case, if the terminal receives the PDCCH, the terminal may perform blind decoding on a plurality of CRCs (or a plurality of scrambling identifiers) to know whether the PDCCH block includes the next OFDM symbol.

If the above-mentioned methods are used, the PCFICH or the DCI is not defined in the last OFDM symbol configuring the PDCCH block or the terminal may not perform the blind decoding on the last OFDM symbol configuring the PDCCH block. The length in the time domain may be different in every PDCCH block, and therefore the PCFICH or the DCI may be defined for each PDCCH block. Meanwhile, even when the method A171 is used, like the method A170, the terminal may first acquire the value of Y by receiving the PCFICH prior to receiving the PDCCH block.

The method A170 and the method A171 may be used in combination. For example, the first OFDM symbol of the OFDM symbols belonging to the PDCCH block configures one PDCCH search space, and the remaining OFDM symbols of the OFDM symbols belonging to the PDCCH block may configure another one PDCCH search space. In this case, in the case of the PDCCH block including the PDCCH common search space, the PDCCH search space on at least first OFDM symbol may include the PDCCH common search space. In this case, the value of Y may be transmitted through the PDCCH common search space on the first OFDM symbol.

In the PDCCH block, a reference signal (RS) or other control channels may also be transmitted. For example, the PDCCH block may include a demodulation RS (DMRS) used to decode the PDCCH, a physical hybrid automatic repeat request indicator channel (PHICH), a PCFICH, a header signal, or the like.

[First Signal Set]

As described above, the first signal set may include a downlink synchronization signal, PBCH, BRS, and/or uplink PRACH. In this case, for the frequency resource region in which the first signal set to which the base numerology is applied in the NR carrier is transmitted, method A180, method A181, or method A182 may be applied.

The method A180 is a method for including a center frequency (i.e., a center of the subcarrier grid for the base numerology) of an NR carrier in a frequency resource region in which a first signal set to which a base numerology is applied is transmitted. According to the method A180, the frequency region in which the first signal set is transmitted is fixed, and therefore there may be a limitation in the numerology configuration and the resource configuration in the corresponding frequency region. However, the reception complexity for the first signal set of the terminal is low and the low-cost terminal (e.g., LTE, MTC terminal, NR mMTC terminal) capable of receiving only a narrow bandwidth may use the base numerology to be connected to the same NR carrier.

The method A181 is a method for including one or a plurality of predefined carrier raster points in a frequency resource region in which a first signal set to which a base numerology is applied is transmitted. If the method A181 is used, a set of the carrier raster points includes the center frequency of the NR carrier.

The method A182 is a method for including one or a plurality of predefined carrier raster points in a frequency resource region in which a first signal set to which a base numerology is applied is transmitted. If the method A182 is used, a set of the carrier raster points does not include the center frequency of the NR carrier.

According to the method A181 and the method A182, if the frequency resource region in which the first signal set to which the base numerology is applied is transmitted includes the plurality of carrier raster points, a plurality of first signal sets may be transmitted in the frequency resource region. According to the method A181 and the method A182, the location of the center frequency or the location of the DC subcarrier may be transmitted through the transmission of the first signal set. In this case, if all of the plurality of first signal set includes the DC subcarrier, as described above, each DC subcarrier may not be included in any PRB or may be included in any one of the PRBs according to the method A133.

According to the method A181, if the first signal set is transmitted at the center of the bandwidth, the first signal set may include the DC subcarrier, and if the first signal set is transmitted in the frequency domain other than the center of the bandwidth, the first signal set may not include the DC subcarrier. In this case, when the terminal receives the synchronization signal, both of the case where the DC subcarrier is included in the synchronization signal and the case where the DC subcarrier is not included in the synchronization signal need to be assumed. Therefore, the reception complexity may be increased. To solve the above problem, if the first signal set is transmitted in the frequency region other than the center of the bandwidth, the method for including one subcarrier serving to perform a virtual DC subcarrier in a synchronization signal and using the one subcarrier as a null subcarrier while at least synchronization signal is transmitted may be considered. According to the method, the terminal may receive the synchronization signal using the same receiver regardless of the frequency region in which the synchronization signal is transmitted.

On the other hand, if a plurality of first signal sets to which the same numerology is applied within one NR carrier exist, only some of the plurality of first signal set may be used the initial access of the terminal. That is, the first signal set(s) used for the initial access and the first signal set(s) not used for the initial access may be distinguished from each other. The same numerology may be the base numerology. That is, the first signal set(s) used for the initial access and the first signal set(s) not used for the initial access may be transmitted by the base station through the same numerology (e.g., base numerology).

In detail, the sequence (or the sequence set) of the downlink synchronization signal used for the initial access and the sequence (or the sequence set) of the downlink synchronization signal not used for the initial access may be defined differently. That is, if the base station generates and transmits the downlink synchronization signal used for the initial access, the sequence (or the sequence set) for the initial access may be different from the sequence (or the sequence set) of the downlink synchronization signal used as purposes different from the initial access.

If the downlink synchronization signal consists of the PSS and the SSS, the terminal may first receive the PSS and then receive the SSS, such that the above-mentioned method may be enough to be applied to the PSS. That is, the PSS used for the initial access and the PSS not used for the initial access may be distinguished from each other by different sequences (or the sequence set), and the SSS used for the initial access and the SSS not used for the initial access may not be distinguished from each other. Meanwhile, if the environment of the radio channel is poor, even if the base station transmits the PSS not used for the initial access, the terminal may successfully detect the PSS and may misunderstand it as the PSS used for the initial access. In this case, it may be helpful to apply the above-mentioned method to both of the PSS and the SSS. That is, the possibility that both of the PSS and the SSS not used for the initial access are wrongly detected simultaneously is relatively lower than the possibility that the terminal wrongly detects the PSS not used for the initial access.

For example, if the downlink synchronization signal (e.g., PSS) is generated by m-sequence, a sequence length of the synchronization signal used for the initial access and a sequence length of the synchronization signal not used for the initial access are the same, but different polynomials may be applied for the sequence generation. That is, the base station may use different polynomials to generate the synchronization signal for the initial access and the synchronization signal not used for the initial access.

Alternatively, if the downlink synchronization signal (e.g., PSS) is generated by m-sequence, a sequence of the synchronization signal used for the initial access and a sequence of the synchronization signal not used for the initial access have the same length and are generated by the same polynomial, but different cyclic shift values may be applied for the two sequences. That is, the base station may use different cyclic shift values to generate the synchronization signal for the initial access and the synchronization signal not used for the initial access.

Alternatively, different resource mapping may be applied to the downlink synchronization signal used for the initial access and the downlink synchronization signal not used for the initial access Here, different resource mappings may include a different number of resource elements to which the sequence is mapped, a different arrangement of resource elements, and/or different OFDM symbol locations. According to the method, since terminal assumes only the sequence (and/or resource mapping) of the synchronization signal used for the initial access and searches the synchronization signal, the terminal is highly likely to receive the synchronization signal used for the initial access and attempt the initial access based on the received synchronization signal. On the other hand, the terminal is less likely to receive the synchronization signal not used for the initial access and wrongly attempt the initial access based on the received synchronization signal.

The number of synchronization signals used for the initial access and/or the frequency location is fixed and the number of synchronization signals not used for the initial access and/or the frequency location may be variable. For example, only 1 downlink synchronization signal is used for the initial access of the terminal, and 1 downlink synchronization signal used for the initial access of the terminal may be fixedly located at the center of the carrier bandwidth.

The synchronization signal used for the initial access is fixedly transmitted at all times, and the synchronization signal not used for the initial access may be configured for the terminal by the base station if necessary. If the NR carrier consists of the plurality of numerologies, the above-mentioned methods may be applied to each numerology.

Meanwhile, if the first signal set consists of more than two kinds of signals (or channels), each signal (or channel) may be transmitted in different frequency regions. For example, the downlink synchronization signal and the PBCH may be multiplexed by the FDM. Alternatively, the downlink synchronization signal and the PBCH may be transmitted in the same frequency band or the PRACH may be transmitted in the frequency band different therefrom. In this case, the method A180 or the method A182 may be applied only to some of the signal (or channel) configuring the first signal set. For example, the method A180 to the method A182 may be applied only to the downlink synchronization signal, and the resource region of the remaining signal (or channel) constituting the first signal set may be defined by the relationship with the resource region for the downlink synchronization signal and may be configured by the base station.

Meanwhile, for the type of numerology used for the transmission of the first signal set in the first type NR carrier, the method A183 and the method A184 may be applied.

The method A183 is a method for transmitting a first signal set only through a base numerology. According to the method A183, all the terminals need to use the base numerology (i.e., primary numerology) for the reception (and/or transmission) of the first signal set. Accordingly, even the terminal for transmitting data using the secondary numerology may have to use the base numerology for the synchronization acquisition, the broadcasting information acquisition, the beam acquisition and beam estimation, the random access, or the like. If the terminal supports the case where the primary numerology and the secondary numerology are simultaneously used in parallel, the complexity of the transceiver of the terminal may be increased.

The method A184 is a method for transmitting a first signal set through a base numerology and transmitting some or all of first signal sets through a sub numerology as well. To support the initial access using the secondary numerology of the terminal, all signals (or channels) constituting the first signal set may have to be transmitted through the sub numerology as well. For example, if the first signal set consists of the downlink synchronization signal, the PBCH, the BRS, and the PRACH, all the elements of the first signal set may be transmitted through the base numerology and the sub numerology. On the other hand, if the initial access of the terminal may be made only through the primary numerology and the secondary numerology needs to be used for the time-frequency synchronization tracking of the terminal that is in the RRC connected state, or the like, only some of the first signal sets may be transmitted through the sub numerology. For example, if it is assumed that the first signal set consists of the downlink synchronization signal, the PBCH, and the PRACH, the downlink synchronization signal may be transmitted through the base numerology and the sub numerology and the PBCH and the PRACH may be transmitted only through the base numerology.

If the method A184 is used, some or all of the first signal sets may be transmitted for all sub numerologies configured in the NR carrier, or may be transmitted for some of the sub numerologies configured in the NR carrier. The first signal set used by the base numerology is fixedly transmitted at all times and the first signal set used by the sub numerology may be transmitted or may not be transmitted according to the configuration of the base station.

According to the method A184, the terminal may use only one sub numerology to receive (and/or transmit) both of the first signal set and the second signal set, and therefore the method A184 may have the transmitting/receiving complexity lower than that of the method A183. On the other hand, the first signal set needs to be transmitted through different numerologies several times, and therefore the overhead of the control signal may be increased. In addition, as the plurality of numerologies are applied for the transmission of the synchronization signal, the amount of information to be transmitted to the terminal through the synchronization signal may be increased or the synchronization signal design may be complicated. Further, the case where the first signal sets by the heterogeneous numerologies are transmitted on the same time period is assumed. If the number of transceiver units (TXRUs) of the base station is small, when the transmission beam of the first signal set is formed, it may be difficult for beams in other directions for each numerology to be accurately formed.

Meanwhile, if the method A184 is used in the first type NR carrier and all the first signal sets are also transmitted through the sub numerology, there is the probability that the terminal may use the corresponding sub numerology to initially access the NR carrier. In this case, a method for using, by a terminal, a sub numerology not to permit an initial access may be considered. That is, the first signal set(s) used for the initial access and the first signal set(s) that is not used for the initial access may be transmitted by the base station through different numerologies (e.g., base numerology, sub numerology). For this purpose, it may be defined to distinguish the synchronization signal for the base numerology and the synchronization signal for the sub numerology. For example, the sequence of the synchronization signal, the resource element mapping, or the like may be differently defined for the base numerology and the sub numerology. The terminal may know the distinguished element in advance and detects only the synchronization signal corresponding to the base numerology to perform the initial access through the base numerology.

On the other hand, in the case of the first type NR carrier, the method for using, by a terminal, a sub numerology to perform an initial access may be considered. In this case, the terminal needs to know whether the numerology used for the initial access by the terminal is the base numerology or the sub numerology. The terminal may acquire the numerology type information by receiving the downlink signal (or channel) of the first signal set. For example, the mapping (or sequence) of the downlink synchronization signal may be differently defined for the base numerology and the sub numerology and the terminal may attempt the blind detection on the plurality of mappings (or sequence) when receiving the synchronization signal. As another example, the numerology type information may be transmitted through the PBCH. When the numerology acquired by the terminal during the initial access is the sub numerology, the terminal may use the sub numerology acquired during the initial access as the primary numerology until receiving a configuration of other numerologies from the base station to perform the next procedures and operations (e.g., PDCCH monitoring, data and pilot transmitting/receiving, CSI/RRM measurement and report).

Meanwhile, in the case of the second type NR carrier, as described above, it is allowed that the terminal uses the sub numerology to perform the initial access. In this case, the terminal needs not to know whether the numerology used for the initial access by the terminal is the base numerology or the sub numerology. The terminal may use the numerology acquired during the initial access as the primary numerology until receiving a configuration of other numerologies from the base station to perform the next procedures and operations (e.g., PDCCH monitoring, data and pilot transmitting/receiving, CSI/RRM measurement and report).

Figure 24:
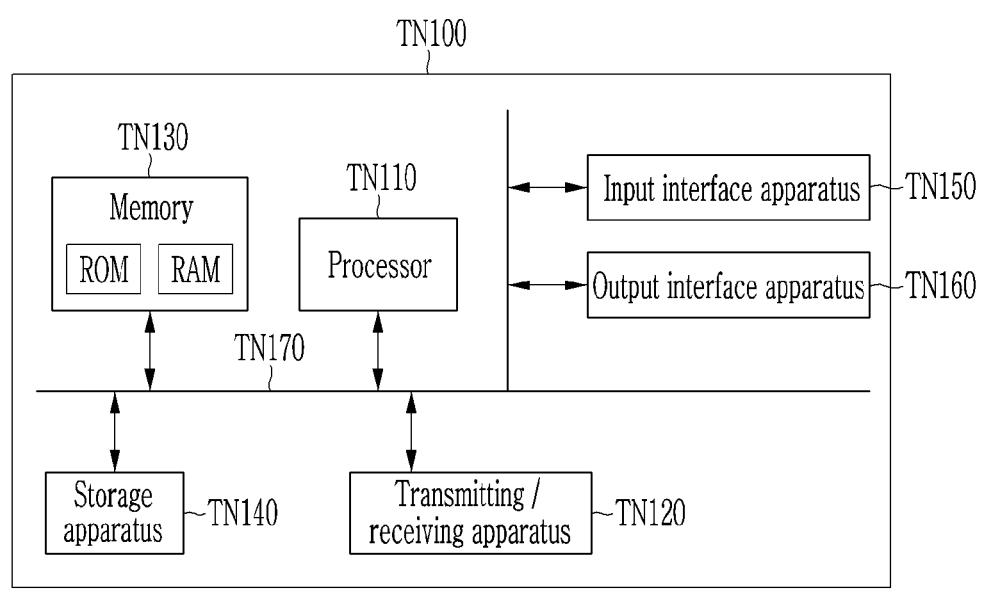
FIG. 24 is a diagram illustrating a computing apparatus according to an exemplary embodiment of the present invention.

FIG. 24 is a diagram illustrating a computing apparatus according to an exemplary embodiment of the present invention. A computing device TN100 of FIG. 24 may be a base station or a terminal, or the like that are described in the present specification. Alternatively, the computing device TN100 of FIG. 24 may be a wireless device, a communication node, a transmitter, or a receiver.

In the exemplary embodiment of FIG. 24, the computing device TN100 may include at least one processor TN110, a transmitting/receiving apparatus TN120 connected to a network to perform communication, and a memory TN130. Further, the computing device TN100 may further include a storage apparatus TN140, an input interface apparatus TN150, an output interface apparatus 160, or the like.

Components included in the computing device TN100 may be connected to each other by a bus TN170 to communicate with each other.

The processor TN110 may run a program command that is stored in at least one of the memory TN130 and the storage apparatus TN140. The processor TN110 may mean a central processing unit (CPU), a graphics processing unit (GPU), or an exclusive processor that performs the methods according to the exemplary embodiments of the present invention. The processor TN110 may be configured to implement the procedures, the functions, and the methods described with reference to the exemplary embodiment of the present invention. The processor TN110 may control each of the components of the computing device TN100.

The memory TN130 and the storage apparatus TN140 may each store various information associated with the operation of the processor TN110. The memory TN130 and the storage apparatus TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal. Further, the computing device TN100 may have a single antenna or multiple antennas.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

The invention claimed is:

1. A method for resource allocation by a base station, the method comprising:
configuring frequency regions each of which includes resource block(s) (RB(s)) to which a numerology is applied, and the numerology for each of the frequency regions to a terminal;
transmitting to the terminal information indicating a position of a boundary of the RB(s) constituting each of the frequency regions;
performing the resource allocation for a data channel, the resource allocation including a step of determining a frequency region index indicating a first frequency region among the frequency regions, and a step of determining resource allocation information indicating at least one RB among RB(s) constituting the first frequency region based on RB index(es) defined within the first frequency region; and
transmitting to the terminal downlink control information (DCI) including scheduling information, the scheduling information including the frequency region index and the resource allocation information,
wherein the numerology is defined by a subcarrier spacing and a cyclic prefix length, the frequency regions belong to a same carrier, and the frequency regions are or are not overlapped with each other within a bandwidth of the same carrier.

2. The method according to claim 1, wherein the RB(s) constituting the first frequency region are contiguous in a frequency domain.

3. The method according to claim 1, wherein the frequency regions and the numerology for each of the frequency regions are configured to the terminal through a radio resource control (RRC) signaling.

4. The method according to claim 1, further comprising transmitting to the terminal a physical downlink shared channel (PDSCH), wherein the scheduling information includes scheduling information for the PDSCH, and the PDSCH is transmitted on the at least one RB indicated by the resource allocation information.

5. The method according to claim 1, further comprising receiving from the terminal a physical uplink shared channel (PUSCH), wherein the scheduling information includes scheduling information for the PUSCH, and the PUSCH is received on the at least one RB indicated by the resource allocation information.

6. The method according to claim 1, wherein the scheduling information is transmitted to the terminal through a physical downlink control channel (PDCCH).

7. The method according to claim 1, wherein the at least one RB indicated by the resource allocation information is indicated to the terminal in a form of a bitmap wherein each bit of the bitmap corresponds to one of contiguous RB(s) constituting the first frequency region.

8. A method for resource allocation by a terminal, the method comprising:
being configured by a base station with frequency regions each of which includes resource block(s) (RB(s)) to which a numerology is applied, and the numerology for each of the frequency regions;
receiving from the base station information indicating a position of a boundary of the RB(s) constituting each of the frequency regions; and
receiving from the base station downlink control information (DCI) including scheduling information, the scheduling information including a frequency region index indicating a first frequency region among the frequency regions and resource allocation information indicating at least one RB among RB(s) constituting the first frequency region, and the resource allocation information being determined based on RB index(es) defined within the first frequency region, wherein the numerology is defined by a subcarrier spacing and a cyclic prefix length, the frequency regions belong to a same carrier, and the frequency regions are or are not overlapped with each other within a bandwidth of the same carrier.

9. The method according to claim 8, wherein the RB(s) constituting the first frequency region are contiguous in a frequency domain.

10. The method according to claim 8, wherein the frequency regions and the numerology for each of the frequency regions are configured to the terminal through a radio resource control (RRC) signaling.

11. The method according to claim 8, further comprising receiving from the base station a physical downlink shared channel (PDSCH), wherein the scheduling information includes scheduling information for the PDSCH, and the PDSCH is received on the at least one RB indicated by the resource allocation information.

12. The method according to claim 8, further comprising transmitting to the base station a physical uplink shared channel (PUSCH), wherein the scheduling information includes scheduling information for the PUSCH, and the PUSCH is transmitted on the at least one RB indicated by the resource allocation information.

13. The method according to claim 12, wherein the scheduling information is received from the base station through a physical downlink control channel (PDCCH).

14. The method according to claim 8, wherein the at least one PRB indicated by the resource allocation information is indicated to the terminal in a form of a bitmap wherein each bit of the bitmap corresponds to one of contiguous RB(s) constituting the first frequency region.

* * * * *